(12) United States Patent
Zhang et al.

(10) Patent No.: US 11,519,560 B2
(45) Date of Patent: Dec. 6, 2022

(54) SYSTEM AND METHOD FOR CORROSION DETECTION

(71) Applicant: TRANSCANADA PIPELINES LIMITED, Calgary (CA)

(72) Inventors: Shenwei Zhang, Calgary (CA); Shahani Nileeka Kariyawasam, Calgary (CA); Zijian Yan, Calgary (CA); Guoxiong Huang, Calgary (CA); Mohammad Al-Amin, Calgary (CA)

(73) Assignee: TRANSCANADA PIPELINES LIMITED, Calgary (CA)

( * ) Notice: Subject to any disclaimer, the term of this patent is extended or adjusted under 35 U.S.C. 154(b) by 902 days.

(21) Appl. No.: 16/116,581

(22) Filed: Aug. 29, 2018

(65) Prior Publication Data

US 2019/0271441 A1    Sep. 5, 2019

Related U.S. Application Data

(60) Provisional application No. 62/637,356, filed on Mar. 1, 2018.

(51) Int. Cl.
| | |
|---|---|
| *F17D 5/06* | (2006.01) |
| *G01M 3/28* | (2006.01) |
| *G01N 17/02* | (2006.01) |
| *G01N 17/00* | (2006.01) |

(52) U.S. Cl.
CPC ............. *F17D 5/06* (2013.01); *G01M 3/2815* (2013.01); *G01N 17/006* (2013.01); *G01N 17/02* (2013.01)

(58) Field of Classification Search
CPC .... F17D 5/06; F17D 5/00; F17D 5/02; G01M 3/2815; G01M 3/28; G01N 17/006; G01N 17/02; G06F 30/00
USPC ........................................................ 703/9, 6
See application file for complete search history.

(56) References Cited

U.S. PATENT DOCUMENTS 6,000,277 A * 12/1999 Smith ....................... F17D 5/00
73/37

OTHER PUBLICATIONS

Choi, J.B. et al., "Development of Limit Load Solutions for Corroded Gas Pipelines", Jan. 2, 2003, International Journal of Pressure Vessels and Piping 80, Elsevier Science Ltd. (Year: 2003).*

(Continued)

*Primary Examiner* — Cedric Johnson
(74) *Attorney, Agent, or Firm* — Norton Rose Fulbright Canada LLP

(57) ABSTRACT

An improved mechanism for evaluation of degradation criticality is described. Corresponding apparatuses, systems, methods, and computer readable media are provided. The evaluation of corrosion criticality is utilized to estimate a failure pressure of a pipeline that is subject to structural degradation (e.g., metal loss corrosion). The evaluation, in some embodiments, is utilized with a specific tool configured for controlling or otherwise regulate pipeline operations responsive to the estimated failure pressure. The evaluation is a specific technical process whereby multiple failure paths through anomalies (structural defects arising from degradation features) are utilized in concert to determine an estimated failure pressure. The failure pressure, in some embodiments, is used to control actuation of one or more valve regulator features or to guide excavation.

33 Claims, 60 Drawing Sheets

(56) References Cited

OTHER PUBLICATIONS

Wilkowski, Dr. Gery M., et al., "Development Towards a Novel Approach for Assessment of Corroded Pipe",Sep. 26-30, 2016, Proceedings of the 2016 11th International Pipeline Conference, ASME. (Year: 2016).*

Teran, G. et al., "Failure Pressure Estimations for Pipes with Combined Corrosion Defects on the External Surface: A Comparative Study", Oct. 12, 2017, International Journal of Electrochemical Science. (Year: 2017).*

Xu, Luyao et al., "A Direct Assessment of Failure Pressure of High-Strength Steel Pipelines with Considerations of the Synergism of Corrosion Defects, Internal Pressure and Soil Strain", 2013, Corrosion Conference and Expo, NACE International. (Year: 2013).*

Zhou Wenxing et al., "Failure Pressure Ratios and Implied Reliability Levels for Corrosion Anomalies on Gas Transmission Pipelines", Sep. 26-30, 2016, Proceedings of the 2016 11th International Pipeline Conference, IPC2016, ASME. (Year: 2016).*

Kiefner, J.F. et al., "Continued Validation of RSTRENG", Dec. 20, 1996, Pipeline Research Council International, Inc. (Year: 1996).*

DNV-GL, "Corroded Pipelines", Recommended Practice, May 2017. (Year: 2017).*

V. Chauhan, J. Brister and M. Dafea. A review of methods for assessing the remaining strength of corroded pipelines. Report prepared for US Dept. of transportation, pipeline and hazardous materials safety administration, Report No. 6781; 2009, abstract.

CSA. Oil and Gas Pipeline Systems, CSA Z662, 2015.

DNV. DNV RP-F101, corroded pipelines. DNV recommended Practice. Hovik, Norway: Det Norske Veritas; 1999.

J. F. Kiefner and P. H. Vieth. A Modified Criterion for Evaluating the Remaining Strength of Corroded Pipe. PRCI Report: PR-3-805, 1989, abstract.

J. F. Kiefner, P. H. Vieth and I. Roytman. Continued validation of Rstreng. Prci Report: PR-218-9304, 1996 abstract.

B. N. Leis and D. R. Stephens. An alternative approach to assess the integrity of corroded line pipe part I: current status; ISOPE, 1997, 4, pp. 624-641.

B. N. Leis and D. R. Stephens. An alternative approach to assess the integrity of corroded line pipe part II: alternative criterion. In: Proc of the 7th Int offshore and polar engineering conference, ISOPE, 1997, 4, pp. 624-641.

B. N. Leis and D. R. Stephens. Development of an alternative failure criterion for residual strength of corrosion defects n moderate- to high-toughness pipe. In: Proc, of the Int. pipeline conference IPC2000, 2, 781e792. Calgary: ASME; 2000.

V. Chauhan, J. Brister and M. Dafea. A review of methods for assessing the remaining strength of corroded pipelines. Report prepared for US Dept. of transportation, pipeline and hazardous materials safety administration, Report No. 6781; 2009, full document.

CSA. Oil and Gas Pipeline Systems, CSAZ662, 2015, Section 10.10.2.6, p. 313.

DNV. DNV RP-F101, corroded pipelines. DNV recommended Practice. Hovik, Norway: Det Norske Veritas; 1999., full document.

J. F. Kiefner and P. H. Vieth. A Modified Criterion for Evaluating the Remaining Strength of Corroded Pipe. PRCI Report: PR-3-805, 1989, full document.

J. F. Kiefner, P. H. Vieth and I. Roytman. Continued validation of Rstreng. PRCI Report: PR-218-9304,1996 full document.

B. N. Leis, X-K Zhu, and T. McGaughy. Assessment of Corrosion Model Error for Metal-Loss Defects in Pipelines. PRCI Report: PR-185-143600, 2016.

P. H. Vieth. Corrosion Assessment Critical Review. Report: R-TRP-20160612, 2016.

W. Zhou, C. Gong and S. Kariyawasam. Failure Pressure Ratios and Implied Reliability Levels for Corrosion Anomalies on Gas Transmission Pipelines. Proceedings of the 2016 11th International Pipeline Conference, IPC2016-64383, 2016.

W. Zhou, G.X. Huang. Model error assessments of burst capacity models for corroded pipelines. International Journal of Pressure Vessels and Piping, 2012, 99-100, pp. 1-8.

* cited by examiner

| Corrosion Profile |  | |
|---|---|---|
| Sub-section Number | Area Combination | Sub-section Area, $A_i$ |
| 1 |  | $A_1 = S_1$ |
| 2 |  | $A_2 = S_1 + S_2$ |
| 3 |  | $A_3 = S_1 + S_2 + S_3$ |
| 4 |  | $A_4 = S_1 + S_2 + S_3 + S_4$ |
| 5 |  | $A_5 = S_1 + S_2 + S_3 + S_4 + S_5$ |
| 6 |  | $A_6 = S_2$ |
| 7 |  | $A_7 = S_2 + S_3$ |
| 8 |  | $A_8 = S_2 + S_3 + S_4$ |
| 9 |  | $A_9 = S_2 + S_3 + S_4 + S_5$ |
| 10 |  | $A_{10} = S_3$ |
| 11 |  | $A_{11} = S_3 + S_4$ |
| 12 |  | $A_{12} = S_3 + S_4 + S_5$ |
| 13 |  | $A_{13} = S_4$ |
| 14 |  | $A_{14} = S_4 + S_5$ |
| 15 |  | $A_{15} = S_5$ |

FIG. 19C

SYSTEM AND METHOD FOR CORROSION DETECTION

CROSS REFERENCE TO RELATED APPLICATIONS

This application is a non-provisional of, and claims all benefit, including priority to, U.S. Application No. 62/637,356, entitled SYSTEM AND METHOD FOR CORROSION DETECTION (APPARATUS, SYSTEM AND METHOD FOR EVALUATION OF CORROSION CRITICALITY), filed 1 Mar. 2018, incorporated herein by reference in its entirety, which for clarity, includes the appendices filed with U.S. Application No. 62/637,356.

FIELD

Embodiments of the present disclosure generally relate to the field of pipe degradation, for example, from corrosion, evaluation, and more specifically, embodiments relate to improved systems and methods for evaluation of degradation criticality and physical flow control using multiple potential (e.g., plausible or candidate) profiles for assessing degradation of physical structural or mechanical elements.

INTRODUCTION

Metal-loss corrosion is one of the major threats to the structural integrity of pipeline systems. Pipeline systems are often used to transport or otherwise convey goods such as gas, oil, etc. across long distances. Pipeline parts may include valves, pumps, control devices, pipe sections, among others. Pipeline systems are major investments, and are often infrastructure components that span across large geographical regions and a diversity of climates and biomes.

Pipelines can be above ground, buried, having varying levels of throughput, etc. Pipelines are often part of an infrastructure network that ultimately conveys goods from one location to another, and require a great deal of expertise to fix, maintain, and operate.

Pipelines are often main conduits between entire businesses and downtime can be an undesirable outcome as supplies may be disrupted while the fixed costs associated with operating the pipeline remain.

Metal-loss corrosion is inevitable as the pipeline system is used to transport good and is exposed to corrosive environment during its lifespan. Pipeline failure, in some cases, can have deep ranging effects on public safety and environments. Accordingly, maintaining safe pipeline operation is an important objective.

Corrosion features are difficult to model for and predict in view of uneven levels of corrosion as a result of environmental factors, materials used in constructing the pipeline, pipeline reinforcements, etc. Metal-loss corrosion is further difficult to account for as pipeline failure are caused by complex interactions between a large number of potentially contributing factors, such as clustered groups of corroded sections, depth of corrosion, patterns of corrosion, etc.

Prior approaches have been made to assess corrosion. In particular, a prior model, known as RSTRENG, has been developed as an accurate model with low bias and scatter. However, the RSTRENG model was found by Applicants to be overly conservative for assessing large corrosion features, resulting in unnecessary excavations leading to unnecessary remediation actions in some scenarios. Overly conservative approaches lead to increased downtime and repairs, which may otherwise not be warranted for the system.

SUMMARY

An improved mechanism for evaluation of degradation (e.g., from corrosion) criticality is described herein. Material degradation of pipes is a serious safety concern and occurs over time as pipes age, endure wear and tear, suffer physical damage (e.g., vandalism, sabotage), erosion (e.g., from solvent usage), among others. Material degradation can lead to pipeline failures, and control of pipeline pressure and/or remedial activities is an important factor in ensuring continued safety of pipeline operations.

While the examples described herein relate primarily to corrosion, embodiments are contemplated for structural deficiencies or degradation as a result or in combination with other factors. Similarly, while examples described may be directed to metal loss (e.g., steel, iron), embodiments are also contemplated for other pipe materials, such as, but not limited to, plastic pipes, composite pipes, among others. Pipe materials may include coatings, such as epoxy, polymer coatings, among others.

Assessing structural integrity of pipes having non-idealities introduced in view of structural degradation is a complex and challenging technical endeavor. In particular, there are multiple potential avenues for pipeline failure, for example, different paths upon cracks may form, and it is not easy to assess a potential pipeline pressure that should be utilized in the pipe. Pipeline failure is a result of complex interactions between areas of structural weakness ("anomalies"), which may interact in various ways with one another to altogether lead to a failure. Over time, structural weakness intensifies as structural features of the pipe are worn away or otherwise damaged, and the interactions become even more complex. Overly conservative approaches lead to wasted opportunities, while overly optimistic approaches lead to potential safety issues.

Approaches having increased accuracy are desirable as resources can be deployed and actions can be taken where it is most effective to do so. Pipeline pressure controllers, using the estimated failure pressures corresponding to specific lengths or sections of the pipe, can take pre-emptive safety measures, such as reducing pressure along specific lengths or portions of the pipe that are compromised, controlling activation of relief values/storage mechanisms, among others.

Degradation of a pipeline component (e.g., a section of pipe) is modelled for failure and an improved method and system is described herein that estimates a failure pressure for the pipeline component. In some embodiments, a pipeline controller is configured to utilize the failure pressure to control maximum pressure of materials (e.g., liquid or gas) being transported through the pipeline, for example, as a way to reduce the potential for a structural failure of the pipeline (e.g., rupture, explosion, leakage). In another embodiment, the pipeline controller is configured to initiate a stoppage of flow. In further embodiments, a remediation controller receives as an input the estimated failure pressure, and automatically identifies or controls remediation activities (e.g., replacement of pipeline section), among others. Corresponding apparatuses, systems, methods, and computer readable media are provided. The evaluation of corrosion criticality is utilized to estimate a failure pressure of a pipeline that is subject to structural degradation (e.g., metal-loss corrosion).

The evaluation, in some embodiments, is utilized with a specific tool configured for controlling or otherwise regulate pipeline operations responsive to the estimated failure pressure. The evaluation is a specific technical process whereby multiple failure paths through anomalies (corrosion features) are utilized in concert to develop an estimated failure pressure. As described herein, the technical process includes a series of unconventional steps that Applicants have experimentally validated. The evaluation is a sound, robust probabilistic approach to computationally simulate interactive failure mechanisms between the anomalies.

A computer-implemented approach is described in various embodiments that Applicants have tested and evaluated to establish an improved mechanism for estimating (e.g., through identifying potential failure paths), controlling (e.g., establishing a maximum pressure), and/or remediating pipeline issues (e.g., turning off a pump, reducing pressure, excavating pipeline sections). Input data is received including a 3D measurement of structural degradation, represented as a grid (e.g., columns may represent representation of points along circumferential slices, such that if the grid is "rolled up", a 3D indication of the pipe is possible). Failure paths are generated through sequentially connecting a series of potential points. In some embodiments, each point is from a corresponding circumferential slice (e.g., each slice has only one point selected from it, the collection of points forming a path having a single point at each corresponding location along the longitudinal axis of the pipe). The potential failure paths are combined together to generate a probabilistic distribution and a specific estimated failure pressure is generated at a threshold percentile.

In some embodiments, the tool is a computer server or a set of computing devices which generate estimations of failure pressure (e.g., periodically), stored/maintained in data structures, associated with specific sections of a pipeline. In other embodiments, a graphical user interface is provided that visually maps or renders estimated failure pressure overlaid upon the pipeline. Areas of estimated low failure pressure (e.g., higher chance of failure) may have differing visual characteristics rendered (e.g., different color). In further embodiments, the tool incorporates a controller that is adapted to transmit control signals to modify operation of the pipeline itself, or to request remediation actions to be taken.

Such a tool is commercially valuable in the pipeline servicing industry. Pipeline failure is difficult to gauge and an improved technical solution is described herein for improving accuracy of estimating pipeline failure by undertaking a computationally challenging analysis of estimated pipeline characteristics, and transforming the estimated pipeline characteristics to identify a set of plausible profiles as identified by failure paths sequentially formed through modelling complex interactions between degradation (e.g., corrosion) features.

In an example, an apparatus includes a controller mechanism (e.g., circuit board, pulse-width modulator, control signal generator) that is coupled to physical pipeline operation mechanisms operating in concert, such as valves, sensors, valve regulators, pumps, shutdown switches, and responsive to the estimated failure pressure, communicates signals that ensure that the estimated failure pressure is not exceeded. If a pressure is found to be currently exceeded, control signals may be provided to reduce pressure (or to stop flow). Different safety thresholds may be applied depending on an assessed risk level (e.g., if a section of a pipeline is in proximity to residential areas, the safety threshold can be set to be very high).

The mechanism facilitates improved decision making, and in some embodiments, the tool includes a remedial action recommendation utility, which may either generate one or more renderings on an interface indicative of a potential issue, or in other embodiments, automatically invoke workflows to start remedial actions. In some cases, a threshold is utilized to raise warnings on an interface if the current pressure in the pipeline is near or slightly exceeds the failure pressure, and to automatically invoke workflows when the current pressure greatly exceeds the failure pressure. The mechanism, for example, can issue control signals which lead to physical manipulation of the pipeline, such as the activation of containment mechanisms, pipeline flow shut off, relief mechanism activation, construction, diversion, among others.

In some embodiments, the mechanism is a special purpose device that is configured for on-site (or in some embodiments, off-site) pipeline analysis, the special purpose device being used to receive data inputs taken from measurements or simulations and to return one or more user interfaces adapted to show, for example renderings of anomalies of the pipeline overlaid on images or renderings of the physical pipeline, and others. A special purpose device maybe adapted for improved efficiency and ruggedness, and may include specialized processors and chipsets, or may be provided in the form of an application specific integrated circuit (ASIC) or a field-programmable gate array.

In accordance with an aspect, there is provided a computer implemented system for determining an estimated failure pressure of a pipeline subject to metal-loss corrosion. Applicants have developed an improved approach where multiple plausible profiles (the "Pa" or Psqr approach) are generated based on an input data set of corrosion features representative of the metal-loss corrosion of the pipeline, whereby the input data set provides, in concert, a three-dimensional (3D) measurement of the metal-loss corrosion in a grid mapped onto the pipeline. Improvements were validated over RSTRENG, with the Psqr approach yielding improved model bias, scatter, decreased conservatism, and increased accuracy without compromising safety.

The system generates, based on the input data set, a plurality of potential (e.g., plausible, candidate) paths (e.g., potential failure paths) for characterizing the shape of the metal-loss corrosion of the pipeline. Each path represents a different set of anomalies based on the corrosion features that interact with one another to reduce the failure pressure, each path sequentially connecting a series of plausible points within each circumferential slice of the grid.

For each path of the plurality of paths, the system generates or otherwise determines a corresponding failure pressure based at least on a simulated pipeline failure occurring due to the corresponding set of anomalies interacting with one another. The corresponding failure pressures are combined to generate a probabilistic distribution (e.g., a probability density function "PDF") of the failure pressure. The probabilistic distribution is used to select an estimated failure pressure based on a failure pressure at a threshold percentile.

While a threshold percentile of 5% is described in some embodiments, the threshold percentile may be modified and varied depending on circumstances and to adjust an overall conservatism and/or accuracy of the approach. The estimated failure pressure, in some embodiments, is returned as a data value in a data structure for consumption by downstream systems or mechanisms (e.g., valve regulators, valve controllers).

In another aspect, the system is a pipeline controller apparatus that determines the estimated failure pressure, and responsive to the determined failure pressure, actively triggers mitigation steps by issuing control commands to actuate pipeline mechanisms to reduce or manage pressure within a pipeline. Pressure management may include reduction of pressure, triggering of shutdown/pressure release, among others, or automatic regulation of pressure. The pressure management control is utilized to prevent blowouts, and the triggered mitigation may occur as a result of an automated safety policy.

Where the system is being utilized as a pipeline controller, multiple thresholds may be utilized to establish a series of different critical pressure values for triggering mitigation steps. For example, an alarm may be triggered at a threshold percentile of 7%, whereas automatic remediation steps may occur at a threshold percentile of 5%. The threshold, in some embodiments, is dynamically and automatically adjusted depending on the type of material being transported through the pipeline, and/or other factors, such as a potential level of impact of a blowout or a leakage. For example, a very low threshold percentile may be applied in areas that are heavily populated or in extremely vulnerable environmental areas.

Further, where the system is a pipeline controller, the system may periodically or continuously poll or otherwise receive sensory information associated with the pipeline to monitor metal-loss corrosion across a period of time, such that the estimated failure pressure is updated based on a latest data set. A benefit of a pipeline controller managing a pipeline across a duration of time is that the inevitable metal loss-corrosion effects over time can be tracked and pipeline integrity can be managed based on age and environmental factors that the pipeline is exposed to.

In other embodiments, the system includes a user interface mechanism that includes a display controller adapted to generate one or more renderings of pipeline failure paths and their associated failure pressures, and their contribution to an overall probabilistic distribution. The user interface mechanism provides a user interface that may, for example, identify graphically on an overlay one or more probable paths of pipeline failure by tracing paths through one or more anomalies.

In order to maintain safe operation of the pipeline, the mechanism is adapted, in some embodiments, to (1) control a physical pipeline flow controller operating in conjunction with a pipeline pressure sensor to ensure that a pressure of the flow through the pipeline does not exceed the estimated failure pressure of the pipeline; (2) determine where to excavate the pipeline based on in-line inspection (ILI) results which give the 3D measurement of corrosion features, and (3) determine which excavated feature require repair based on inspection results performed after excavation which give the 3D measurement of corrosion features.

Accordingly, various benefits may accrue as improved accuracy and intelligence allows for decision making capabilities around which areas of the pipeline to be excavated and/or prioritized. Where the system is utilized as an improved decision-making tool, the system, in some embodiments, is adapted to conduct the analysis and to generate estimated failure pressures section-by-section of the pipeline, whereby the analysis is applied feature by feature (e.g., by clusters of corrosion that are proximate to one another), and sequentially across pipeline features.

In another aspect, the controlling of the physical pipeline flow controller includes the activation of a pressure restriction valve.

In another aspect, the physical pipeline flow controller operates a valve regulator to ensure that the pressure of the flow through the pipeline does not exceed the estimated failure pressure of the pipeline.

In another aspect, the system operates to aid in triggering the excavation at a point to ensure that feature is remediated before the pressure in the pipeline exceeds the estimated failure pressure of the pipeline.

In another aspect, the system schedules a repair to ensure that feature is remediated before the pressure in the pipeline exceeds the estimated failure pressure of the pipeline.

In another aspect, given the three-dimensional (3D) measurement of the metal-loss corrosion in a grid form, control parameters are applied to assess the corresponding set of anomalies and the interactions between the anomalies.

In another aspect, the control parameters include a start point, an interaction window width, and a likelihood of interaction.

In another aspect, the metal-loss corrosion of the pipeline is estimated to include wide complex corrosion clusters.

In another aspect, an area of each profile of the plurality of profiles is less than or equal to that of a river bottom profile of the corrosion feature.

In another aspect, the method includes: given the start point, identifying two points in adjacent slices on either side of the start point; generating interaction windows based on the interaction window width for each of the two points, the interaction windows defining potential points within the interaction window width that are selectable as a next point of the profile at least based on a likelihood of interaction with at least one of the two points; and iteratively identifying additional points until potential points are identified throughout every circumferential slice of the grid.

A further improved embodiment is directed to a specific modification of the start point whereby a depth-weighted approach is used to generate a plurality of candidate start points for each of the potential failure paths. Adding in a diversity of start points was found to be beneficial to accuracy especially in relation to specific types of corrosion patterns, namely pinhole corrosion where the pinhole is deeper than a general corrosion or not proximate to a general corrosion. Nonetheless, this improved approach of some embodiments is not limited to these types of corrosion patterns.

BRIEF DESCRIPTION OF FIGURES

FIG. 19C shows an example of the grids output of the cluster, according to some embodiments.

FIG. 288 is an example plot of plausible profiles, where the starting point was determined based on the depth-weighted factor and is specific to each plausible profile.

FIGS. 41A, 416, 41C, FIGS. 42A, 42B, 42C, 42D, 42E, 42F, 42G, 42H, FIGS. 43A, 43B, 43C, 43D, 43E are illustrations showing a total of 16 machined metal-loss features.

DETAILED DESCRIPTION

Figure 1A:
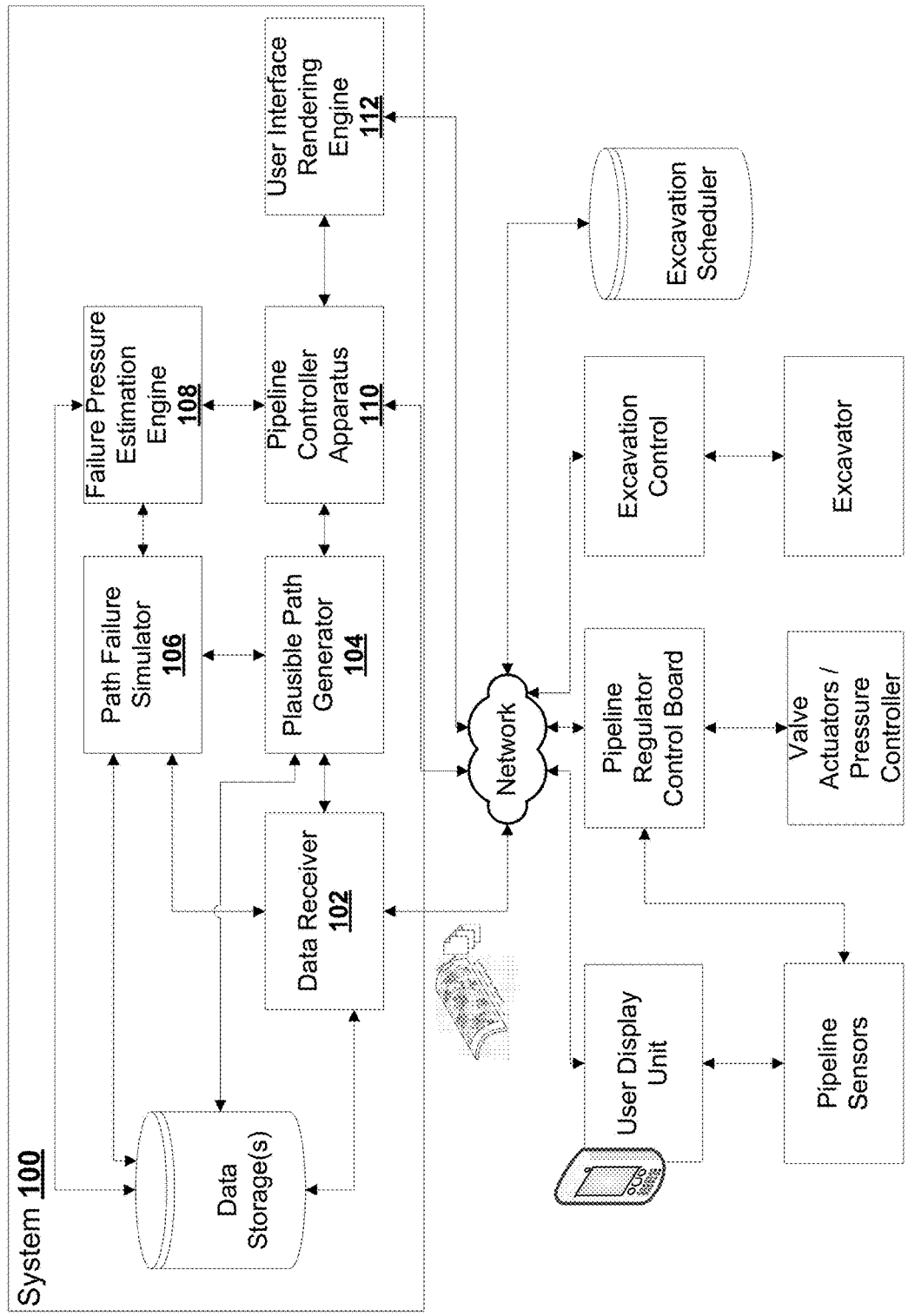
FIG. 1A is a block schematic diagram of an example system, according to some embodiments.

While the examples described herein relate primarily to corrosion, embodiments are contemplated for structural deficiencies or degradation as a result or in combination with other factors. Similarly, while examples described may be directed to metal loss (e.g., steel, iron), embodiments are also contemplated for other pipe materials, such as, but not limited to, plastic pipes, composite pipes, among others. Pipe materials may include coatings, such as epoxy, polymer coatings, among others.

Metal-loss corrosion is one of the major integrity threats to oil and gas pipelines. Various assessment models have been developed and used to assess metal-loss corrosion based on in-line inspection (ILI) or in-ditch measurement.

However, the existing models have different level of conservatism in the assessment, which triggers varying levels of unnecessary mitigation actions such as excavation, repair or derate (i.e. pressure reduction).

The research described herein is in relation to a new approach developed for addressing the conservatism of the existing models, and in some embodiments, without compromising safety. This approach utilizes a novel method to idealize the shape of the corrosion (i.e. shape factor). RSTRENG model utilizes a single worst case river bottom to characterize the shape of corrosion; in contrast, the new approach uses multiple plausible profiles ($P^2$) to characterize the shape of corrosion and is therefore called $P^2$ model or Psqr method. Each plausible profile is a simulated path (e.g., a potential failure path) through the corrosion cluster used to model complex interactions between different structural features (e.g., metal-loss corrosion anomalies) within the cluster.

The research has led to an improved mechanism for evaluation of corrosion criticality that is described herein. Corresponding apparatuses, systems, methods, and computer readable media are provided. The evaluation of corrosion criticality is utilized to estimate a failure pressure of a pipeline that is subject to metal-loss corrosion or other types of structural degradation. Structural degradation includes material loss, material degradation, areas of weakness due to structural and/or chemical changes, etc.

The evaluation, in some embodiments, is utilized with a specific tool configured for controlling or otherwise regulate pipeline operations responsive to the estimated failure pressure. The evaluation is a specific technical process whereby multiple failure paths through anomalies (corrosion features) are utilized in concert to develop an estimated failure pressure.

As described herein, the technical process includes a series of unconventional steps that Applicants have experimentally validated. The evaluation is a sound, robust probabilistic approach to computationally simulate interactive failure mechanisms between the anomalies. The simulations can then be used, in some preferred embodiments, to maintain data structures that are periodically updated based on distributed data harvester sensors (e.g., in-line inspection sensors, laser sensors, non-destructive testing sensors, ultrasonic inspection sensors), the data structures relating to estimated failure pressures at different sections of a pipeline. In further preferred embodiments, the data structures are processed by controller circuits which generate control signals to control pipeline operations (e.g., pressure regulators, relief systems).

The model has been validated using thirty (30) full scale specimen-based hydrostatic tests on real long corrosion features. Validation results show the Psqr method is less conservative, more accurate and more precise than the RSTRENG model. The magnitude of reduction in conservatism is dependent on the corrosion morphology; on average, the Psqr model achieves 14% reduction in model bias and 30% reduction in standard deviation of model error (i.e. scatter). The validation results also demonstrate that the model is safe. Furthermore, extensive sensitivity analyses have been performed and used to determine the optimized values of model parameters in order to assure safety.

To increase the data set used for validating the model, the burst tests results that were published in the Pipeline Research Council International (PRCI) report (Kiefner et al. 1996) were also reviewed. A total of sixteen (16) machined metal-loss features have been analyzed. Comparison of the burst pressure with predicted pressure for each of the 16 pipe samples also consistently showed the use of the Psqr model for corrosion assessment is safe.

The effectiveness of the Psqr method has been demonstrated through a pilot study, whereby two sets of data were used in the analysis. The first data set includes 170 corrosion features that were excavated from 27 different pipeline sections, and have field-measurements using laser scan tool. The second data set includes 154 critical corrosion clusters identified by the ILI tool that need immediate remediation according to RSTRENG model.

The observations obtained from the pilot study are as follows:

Firstly, the Psqr model is less conservative than the RSTRENG model. The conservatism reduction is dependent on the corrosion morphology. Wide complex corrosion clusters can have up to 20% reduction in conservatism. For axial slot-like clusters may not see reduction in comparison to RSTRENG. On average, the ratio of Psqr-based pressure to RSTRENG-based pressure is 1.07 based on the field-measured results of the 170 corrosion features, and 1.05 based on the ILI-reported results of the 154 corrosion features requiring immediate remediation actions. The same ratio ranges from 1.01 to 1.20 for the 170 excavated features, and from 1.00 to 1.14 for the 154 ILI features.

Secondly, the use of the Psqr method achieved 80% reduction in the number of corrosion features requiring excavation for the ILI data analysis and over 80% reduction in the number of features requiring repair for in-ditch analysis (in comparison with RSTRENG-based assessment). This reduction is also highly morphology-dependent.

The Psqr method is applicable to all clusters regardless of number of individual anomalies. A Microsoft Excel™ VBA-based Corrosion Assessment Tool, called TCAT, has been developed by incorporating the Psqr method, which can be used for carrying out corrosion assessment based on ILI or in-ditch measurement.

Integrity management for corrosion includes three phases: 1) detect and size corrosion anomalies using in-line inspection; 2) identify critical anomalies using assessment models; and 3) develop mitigation plans such as derate and excavation to address critical anomalies.

Both probabilistic and deterministic assessment approaches have been used by Applicant to identify critical anomalies and make integrity decisions based on ILI-reported sizing.

For both assessment approaches, the assessment model plays a significant role. Integrity decisions that are sensitive to model include, but are not limited to:

identifying critical anomalies that need mitigation based on ILI-reported sizing
calculating the derate pressures
making repair decisions in the ditch It has been identified that these decision-makings are most sensitive to the accuracy of the assessment model and model uncertainty (Zhou et al. 2016). A more accurate model makes both the probabilistic and deterministic assessment less conservative without compromising safety. Various corrosion assessment models, such as ASME B31G Family model (Kiefner and Vieth 1989), DNV RP-F101 (DNV 1999) and PCORRC (Leis and Stephens 1997; 2000) have been developed, and widely used in the pipeline industry for corrosion assessment.

Of these models, ASME B31G Family model is the most common model used by pipeline operators. ASME B31G family has three different models, including B31G, Modified B31G-0.85dL method, and Modified B31G-effective area method (Kiefner and Vieth 1989). Modified B31G-effective area method uses river bottom profile to characterize corrosion profile and has been implemented in a software package called RSTRENG (Kiefner and Vieth 1989). Hence, this method is also known as RSTRENG model in the pipeline industry. Both Modified B31G-0.85dL method and Modified B31G-effective area method are recommended in Canadian Standards Association (CSA) Z662-15 Clause 10.10.2.6 (CSA 2015) to assess the corrosion anomalies.

Extensive validation studies on corrosion assessment models (e.g., Chauhan et al. 2009; Zhou and Huang 2012) have concluded that RSTRENG model is the most accurate model among the existing models with lowest bias and least scatter. For single pit anomalies, Modified B31G-0.85dL method is more accurate. Therefore, RSTRENG model is used for clusters and Modified B31G-0.85dL method is used for single pits by Applicant for ILI-based corrosion management. However, the RSTRENG model is still conservative for assessing corrosion anomalies with large morphologies such as long and shallow clusters with discrete pits (Kiefner and Vieth 1989). Thus, it leads to unnecessary excavation for pipelines with such corrosion morphologies (particularly found in pipelines with extensive corrosion).

Furthermore, failures in pipeline industry have happened on complex corrosion morphologies for which models have not been calibrated. Therefore, Applicant initiated a project to investigate the failure mechanism of pipeline containing such corrosion morphologies and develop a model that would reduce the undue conservatism in assessing corrosion while maintaining the safety. The findings from this project and the details of the newly developed corrosion assessment model are described herein.

RSTRENG model uses the river bottom profile (i.e., profile generated by connecting the deepest point of a corrosion and projecting it onto the pipe wall in the longitudinal direction) to find the effective area that estimates the pressure at which the failure initiates. The river bottom profile does not represent the fracture propagation path. To best predict the pressure at time of rupture initiation, the interaction between anomalies should be appropriately considered in the assessment model.

Anomaly interaction is defined in terms of their impact on the failure pressure. For example, two anomalies are interacting if the failure pressure of a pipe containing these two anomalies is significantly lower than the failure pressures of the pipes containing individual anomalies (Kiefner et al. 1996).

As an initiative to address the conservatism of the RSTRENG model, Applicant initiated tests and data analysis. An approach was developed by considering all possible multiple profiles. Applicant considered the circumferential separation and related proximity issues to be an important differentiator to identify multiple plausible profiles. Also Applicant needed a process that was safe for all test cases and would be applicable to ILI and in-ditch measurements.

The new model is referred to as Psqr method, and in some preferred embodiments, is encapsulated in an improved controller, graphical interface, and/or tool.

The objective of the project was to develop a corrosion assessment model that will ensure safety while reducing:
  conservatism of original RSTRENG model for assessing large corrosion morphologies
  number of unnecessary excavations on ILI-reported anomalies deemed to be critical based on RSTRENG
  number of in-ditch features that require repairs
  number and magnitude of derates
  The model has been validated as follows.

The Psqr method has been validated by 30 full-scale burst tests, which has demonstrated that it is more accurate and has less scatter than RSTRENG model, and safe compared with the actual burst pressure. Further public domain burst test data has also been used to further extend the sample size and verify the model. Rigorous sensitivity analyses of model parameters have been performed to verify the selection of model parameters is safe and appropriate. The details of the model and sensitivity analyses are described in the following sections.

Example Apparatus

FIG. 1A is a schematic diagram of an apparatus for evaluation of corrosion criticality, according to some embodiments.

The apparatus is a system 100 that includes a plurality of components implemented by computer processors to evaluate corrosion criticality of a pipeline. In various embodiments, the system 100 includes interfaces, controller mechanisms, and control circuits, and the system 100 is coupled to physical pipeline operation mechanisms operating in concert, such as valves, sensors, valve regulators, pressure controller, pumps, and responsive to the estimated failure pressure, communicates signals that ensure that the estimated failure pressure is not exceeded.

The system 100 facilitates improved decision making, and in some embodiments, the tool includes a remedial action recommendation utility, which may either generate one or more renderings on an interface indicative of a potential issue, or in other embodiments, automatically invoke workflows to start remedial actions.

In some cases, a threshold is utilized to raise warnings on an interface if the current pressure in the pipeline is near or slightly exceeds the failure pressure, and to invoke workflows when the current pressure exceeds the failure pressure. The mechanism, for example, can issue control signals which lead to physical manipulation of the pipeline, such as the activation of containment mechanisms, pipeline pressure restriction, construction, diversion, among others. In some embodiments, the mechanism is a special purpose device that is configured for on-site (or in some embodiments, off-site) pipeline analysis, the special purpose device being used to receive data inputs taken from measurements or simulations and to return one or more user interfaces adapted to show, for example renderings of anomalies of the pipeline overlaid on images or renderings of the physical pipeline, and others.

A special purpose device maybe adapted for improved efficiency and ruggedness, and may include specialized processors and chipsets, or may be provided in the form of an application specific integrated circuit (ASIC) or a field-programmable gate array (FPGA).

The system 100 includes a data receiver 102 that receives one or more input data sets of corrosion features representative of the metal-loss corrosion of the pipeline, the input data set providing, in concert, a three-dimensional (3D) measurement of the metal-loss corrosion in a grid.

A plausible path generator 104 is configured to generate, based on the input data set, a plurality of plausible paths for characterizing the shape of the metal-loss corrosion of the pipeline. The number of paths can vary, and each path is a different plausible "profile" of a failure. Each path represents a different set of anomalies based on the corrosion features that interact with one another to reduce the failure pressure, each path sequentially connecting a series of plausible points within each circumferential slice of the grid.

For each path of the plurality of paths, a path failure simulator 106 generates or otherwise determines a corresponding failure pressure based at least on a simulated pipeline failure occurring due to the corresponding set of anomalies interacting with one another. The corresponding failure pressures are combined to generate a probabilistic distribution (e.g., a probability density function "PDF") of the failure pressure.

The probabilistic distribution is input into a failure pressure estimation engine 108 to select an estimated failure pressure based on a failure pressure at a threshold percentile. While a threshold percentile of 5% is described in some embodiments, the threshold percentile may be modified and varied depending on circumstances and to adjust an overall conservatism and/or accuracy of the approach. Where the system is being utilized as a pipeline controller, multiple thresholds may be utilized to establish a series of different critical pressure values for triggering mitigation steps. For example, an alarm may be triggered at a threshold percentile of 7%, whereas automatic remediation steps may occur at a threshold percentile of 5%. The threshold, in some embodiments, is dynamically and automatically adjusted depending on the type of material being transported through the pipeline, and/or other factors, such as a potential level of impact of a blowout or a leakage. For example, a very low threshold percentile may be applied in areas that are heavily populated or extremely vulnerable environmental areas.

The failure pressure estimation engine 108 returns the failure pressure as a data value in a data structure for consumption by downstream systems or mechanisms (e.g., valve regulators, pressure controllers). In some embodiments, the failure pressure estimation engine 108 tracks multiple estimated failure pressures each corresponding to a specific corrosion cluster on a specific section of a pipeline, and the multiple estimated failure pressures are linked to pipeline features and physical components within the sections of the pipeline.

In another aspect, the system 100 includes a pipeline controller apparatus 110 that determines the estimated failure pressure, and responsive to the determined failure pressure, actively triggers mitigation steps by issuing control commands to actuate pipeline mechanisms to reduce or manage pressure within a pipeline. Pressure management may include reduction of pressure, triggering of shutdown/pressure release, among others, or automatic regulation of pressure. The pressure management control is utilized to prevent blowouts, and the triggered mitigation may occur as a result of an automated safety policy.

The pressure may then be fed back to the system 100 in the form of a feedback loop to continuously regulate pressure in the pipeline, across the whole pipeline, or at various sections of the pipeline.

Further, where the system includes a pipeline controller apparatus 110, the system may periodically poll or otherwise receive sensory information associated with the pipeline to monitor metal-loss corrosion across a period of time, such that the estimated failure pressure is updated based on a latest data set. A benefit of a pipeline controller managing a pipeline across a duration of time is that the inevitable metal loss-corrosion effects over time can be tracked and pipeline integrity can be managed based on age and environmental factors that the pipeline is exposed to.

In other embodiments, the system includes a user interface mechanism 112 that includes a display controller adapted to generate one or more renderings of failure paths of corrosion and their associated failure pressures, and their contribution to an overall probabilistic distribution. The user interface mechanism provides a user interface that may, for example, identify graphically on an overlay one or more plausible paths of pipeline failure by tracing paths through one or more anomalies.

Accordingly, various benefits may accrue as improved accuracy and intelligence allows for decision making capabilities around which areas of the pipeline to be excavated and/or prioritized. Where the system is utilized as an improved decision making tool, the system, in some embodiments, is adapted to conduct the analysis and to generate estimated failure pressures section-by-section of the pipeline, whereby the analysis is applied feature by feature (e.g., by clusters of corrosion that are proximate to one another), and sequentially across pipeline features.

Description of the Psqr Method

Overview of the ASME B31G Family Models

The ASME B31G family model was derived from the toughness-independent NG-18 equation and includes the following three different models (Kiefner and Vieth 1989):

B31G

Modified B31G-0.85dL method

Modified B31G-effective area method

In general, the B31G family model to predict the failure pressure, Pb, due to metal-loss is given by the following relation:

$$P_b = \frac{2t}{D}\sigma_f \frac{1 - \frac{A}{A_0}}{1 - \frac{A}{MA_0}} \tag{1}$$

where t is the pipe wall thickness; D is the outside diameter; σy denotes the flow stress of the pipe material; A denotes the corroded area and $A_0$ (see FIG. 1B) denotes the reference area (i.e. the rectangular area with length and width equal to the length of corrosion anomaly L and pipe wall thickness, respectively), and M denotes the bulging factor (BF), also known as Folias factor.

Two different formulations of BF, denoted by $M_1$ and $M_2$, have been developed and used by different generation of the B31G models given by $$M_1 = \sqrt{1 + 0.8\frac{L^2}{Dt}} \tag{2a}$$

$$M_2 = \begin{cases} \sqrt{1 + 0.6275\frac{L^2}{Dt} - 0.003375\left(\frac{L^2}{Dt}\right)^2} & \frac{L^2}{Dt} \leq 50 \\ 3.3 + 0.032\frac{L^2}{Dt} & \frac{L^2}{Dt} > 50 \end{cases} \tag{2b}$$

Equation (1) essentially is a function of pipe characteristics, material properties, shape idealization, and bulging factor. It can be further generalized into Eq. (3)

$$P_b = \frac{2t}{D} \times F(YS) \times \frac{1 - SF \times \left(\frac{d_{max}}{t}\right)}{1 - SF \times \left(\frac{d_{max}}{t}\right)/M} \quad (3)$$

where F(YS) denotes the flow stress and is a function of yield strength of pipe steel, SF denotes the shape factor characterizing the shape idealization and equals the ratio of the metal-loss area to the rectangular area (i.e. $A_1$ shown in FIG. 1B) with length and width equal to the length and maximum depth of corrosion anomaly, respectively (e.g. for parabolic shape, SF=2/3), and $d_{max}$ denotes the maximum depth. A comparison of the three models is summarized in Table 2.1, where $d_{eff}$ denotes the effective depth, and $d_{max\_Aeff}$ denotes the maximum depth within the effective area. The effective depth and effective area are described further below.

Figure 1B:
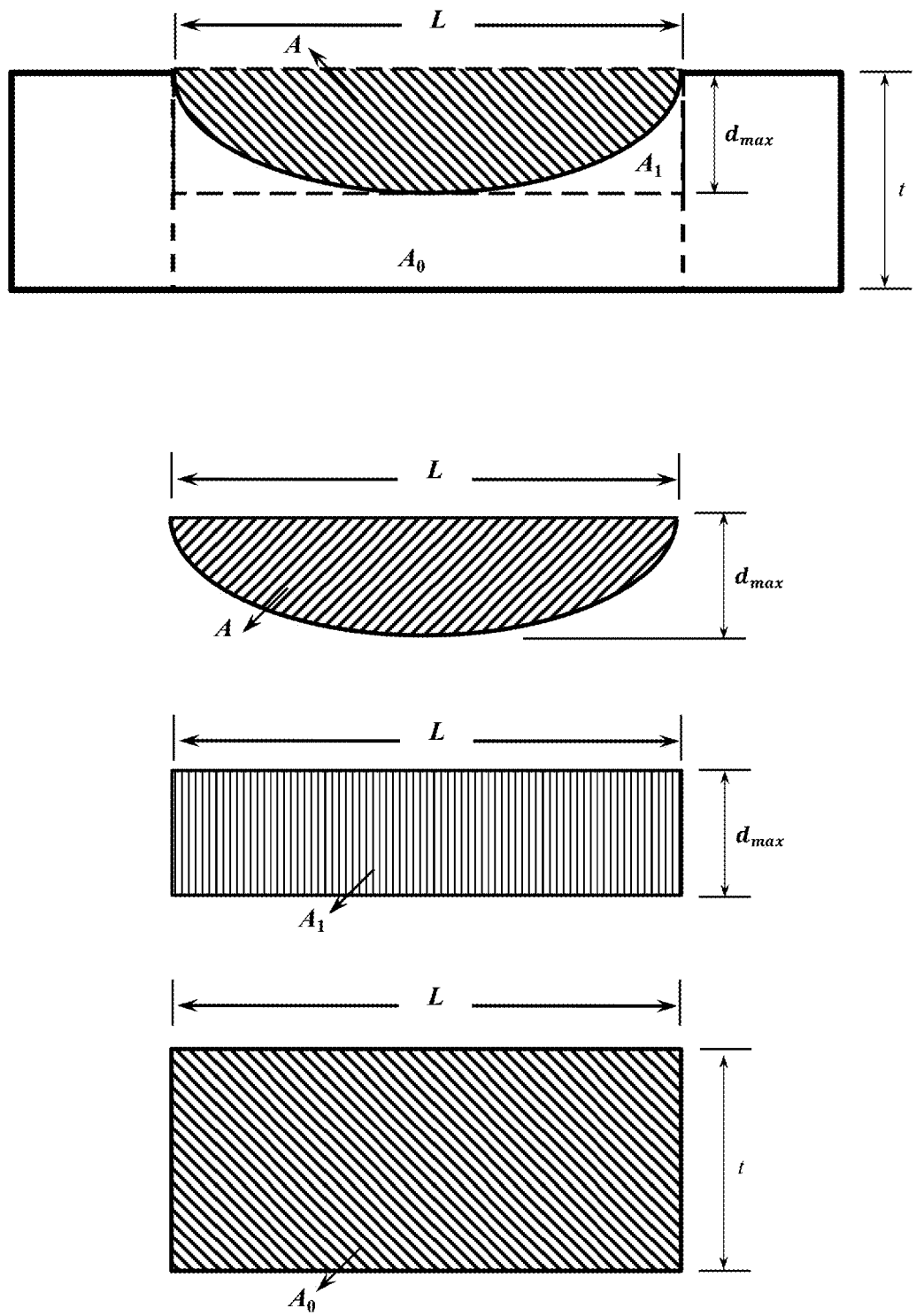
FIG. 1B is an illustration of the metal loss area, reference area, and the area used to determine a shape factor, according to some embodiments.
Figure 40A:
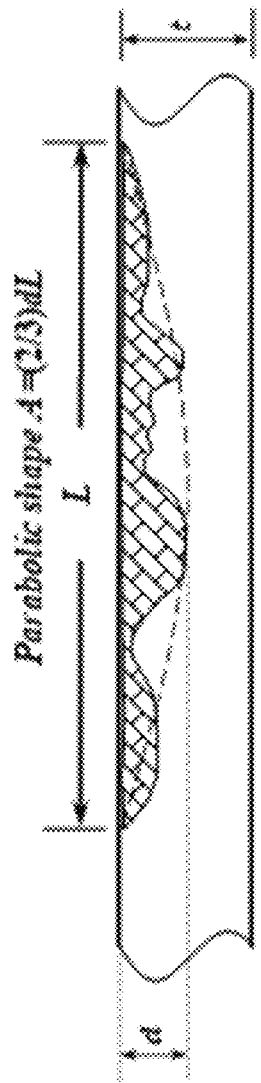
FIGS. 40A, 40B, and 40C are illustrations showing a set of shape visualizations for ASME B31G Family Models.
Figure 40B:
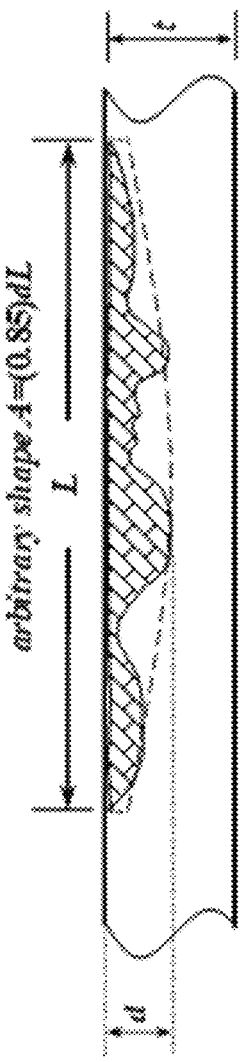
Figure 40C:
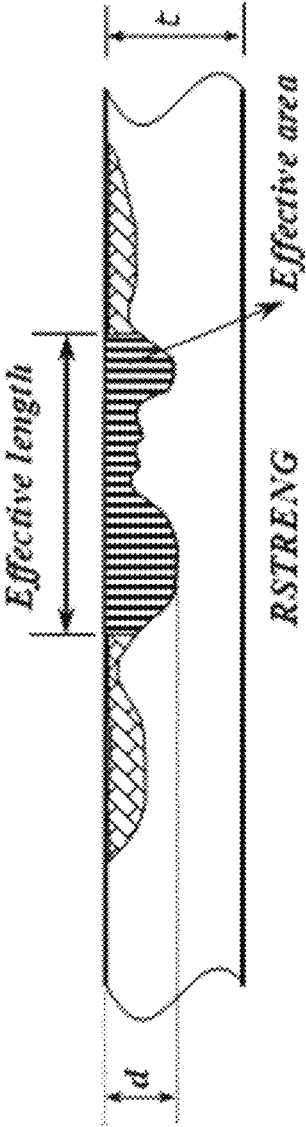

FIG. 1B is an illustration of the metal loss area, reference area, and the area used to determine a shape factor, according to some embodiments. FIGS. 40A, 40B, and 40C are illustrations showing a set of shape visualizations for ASME B31G Family Models.

TABLE 2.1

Comparison of the ASME B31G Family Models

| Method | Shape Idealization | Shape Factor (SF) | Flow Stress | Bulging Factor (BF) |
|---|---|---|---|---|
| B31G | FIG. 40A | 2/3 | 1.1 * YS | Two-term, $M_1$ |
| Modified B31G-0.85dL method | FIG. 40B | 0.85 | YS + 10 ksi | Three-term, $M_2$ |
| Modified B31G-Effective area method (RSTRENG) | FIG. 40C | $d_{eff}/d_{max\_Aeff}$ | YS + 10 ksi | Three-term, $M_2$ |

Overview of RSTRENG Model

RSTRENG is the application software to evaluate the Remaining STRENGth of corroded pipeline. As mentioned in above, RSTRENG used the Modified B31G-effective area method, which was developed by improving the shape factor of Modified B31G-0.85dL method and can be used for assessing corrosion morphologies with detailed measurements of metal-loss corrosion.

The use of this model involves an iterative algorithm to find the minimum failure pressure for given detailed measurements of metal-loss corrosion, and the metal loss area associated with the minimum failure pressure is called "effective area".

Therefore, the method is referred to as "Modified B31G-effective area method". The effective area method reduces excess conservatism embedded in the B31G and Modified B31G-0.85dL models for assessing clusters. The effective area was evaluated by characterizing the corrosion shape as a river bottom profile when the detailed measurement (i.e. corrosion map) of corrosion is available.

Figure 2:
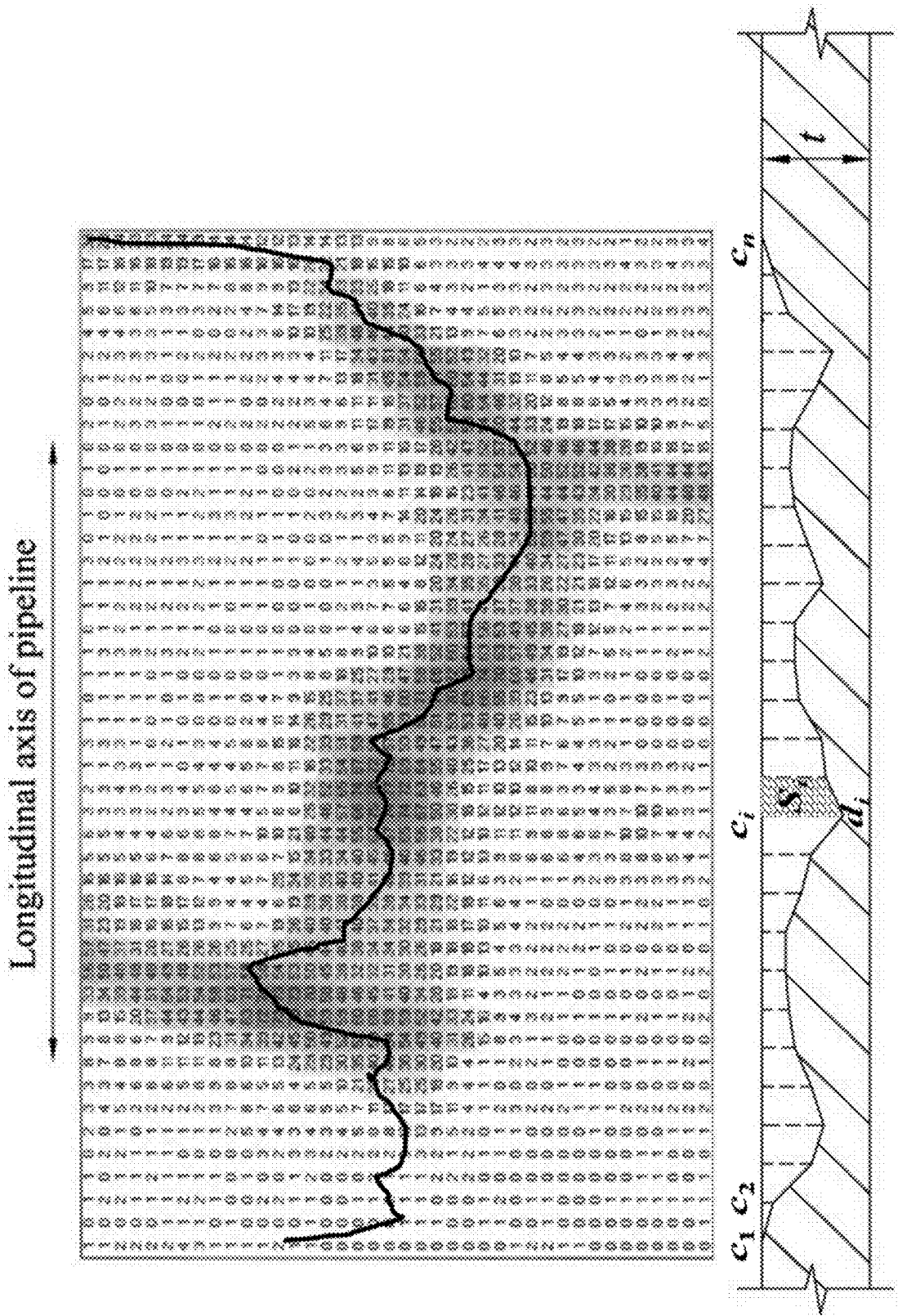
FIG. 2 contains renderings of an example river bottom profile, according to some embodiments.

The so-called "river bottom" profile is the profile that is generated by connecting the deepest point of the corrosion map and projecting it onto the longitudinal cross section, see FIG. 2. To differentiate the model developed in this research, it should be emphasized that RSTRENG model used Modified B31G river bottom profile-based effective area method. The river bottom profile-based effective area methodology used to evaluate the burst pressure is described below.

FIG. 2 contains renderings of an example river bottom profile, according to some embodiments.

Consider a profile with n measurement points (see FIG. 2), the coordinate of each measurement point is denoted by $c_1, c_2, \ldots, c_n$ with corresponding measured depth denoted by $d_1, d_2, \ldots, d_n$. The river bottom profile consists of (n−1) individual areas denoted by $S_1, S_2, \ldots, S_{n-1}$, including two (2) triangular areas and (n−3) trapezoidal areas. Given the (n−1) individual areas, a total of n (n−1)/2 sub-sections can be generated by combining the adjacent measurement points. For example, a given profile shown in FIG. 3 consists of six (6) measurement points (denoted by $c_1$ through $c_e$) and includes two (2) triangular and three (3) trapezoidal areas (denoted by $S_1$ through $S_5$). A total of 15 sub-sections can be generated by combining the adjacent individual areas, which are shown in FIG. 3.

Figure 3:
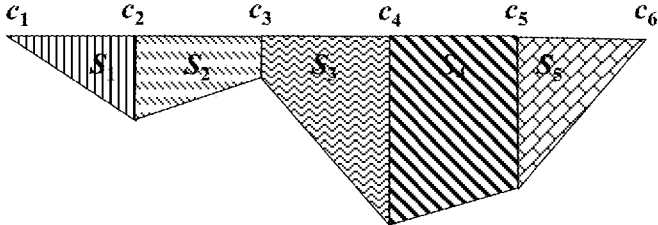
FIG. 3 includes example illustrations of subsection areas, according to some embodiments.
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:
Figure 3:

FIG. 3 includes example illustrations of subsection areas, according to some embodiments.

The burst pressure for the river bottom profile can be evaluated by:

$$P_b = \min\{P_{bi}\} \quad (4a)$$

$$P_{bi} = \frac{2t}{D} \sigma_f \frac{1 - \frac{A_i}{A_{0i}}}{1 - \frac{A_i}{M_{2i} A_{0i}}} \quad (4b)$$

$$M_{2i} = \begin{cases} \sqrt{1 + 0.6275 \frac{L_i^2}{Dt} - 0.003375 \left(\frac{L_i^2}{Dt}\right)^2} & \frac{L_i^2}{Dt} \leq 50 \\ 3.3 + 0.032 \frac{L_i^2}{Dt} & \frac{L_i^2}{Dt} > 50 \end{cases} \quad (4c)$$

where $P_{bi}$, $A_i$, $A_{0i}$, $L_i$ and $M_2$, (i=1, 2 to n (n−1)/2) denote the pressure, metal-loss area, reference area, effective length and bulging factor corresponding to sub-section i.

Figure 4:
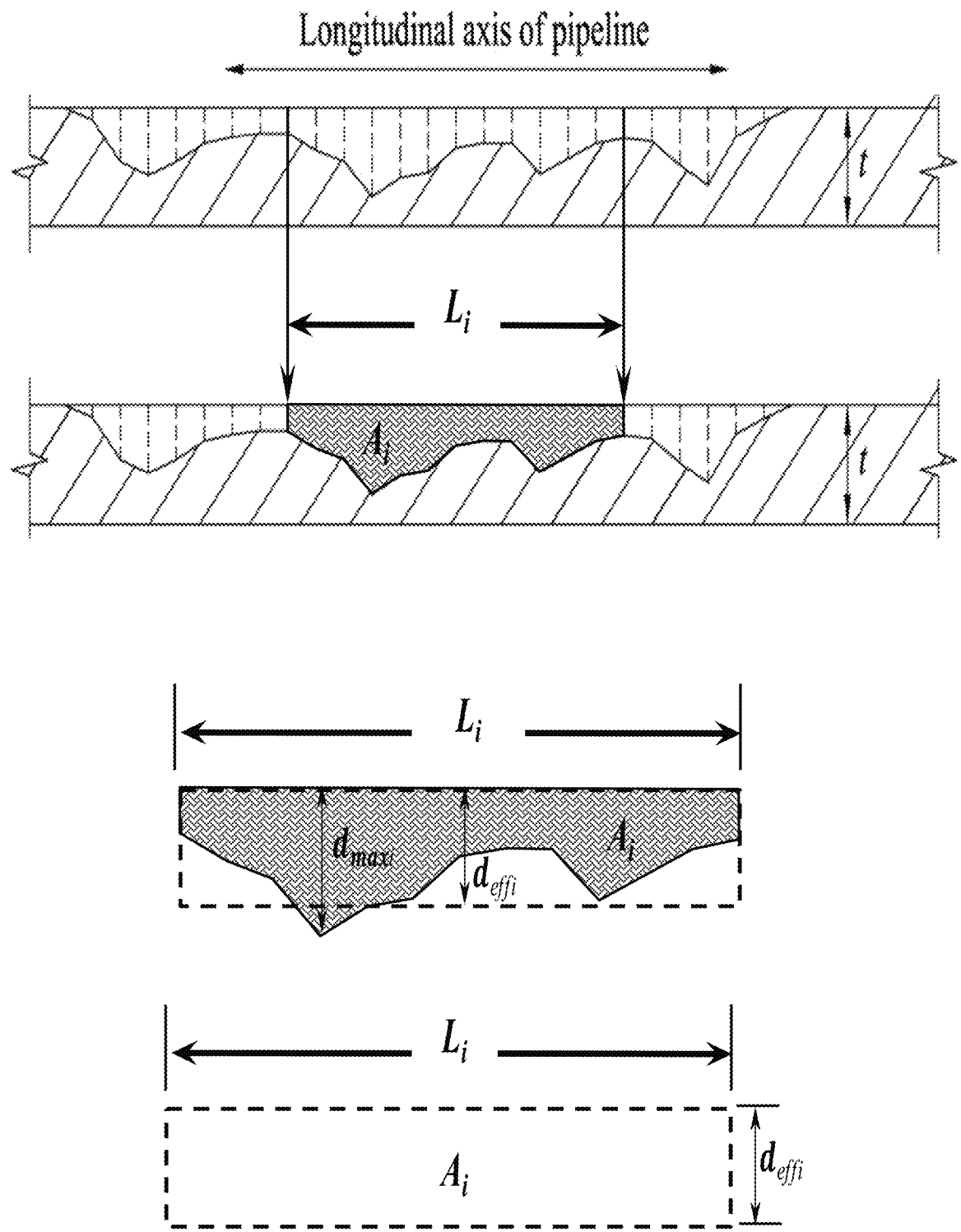
FIG. 4 is an illustration of effective area, effective depth, and effective length, according to some embodiments.

It follows from above description that the sub-section area that corresponds to Pb is the so-called effective area (see FIG. 4). FIG. 4 is an illustration of effective area, effective depth, and effective length, according to some embodiments.

Without loss of generality, the effective area of sub-section i, $A_i$, is calculated as the sum of the areas of the trapezoids made up by the discrete depth points within the effective length $L_i$. The effective depth, $d_{eff}$, can be calculated based on the effective area and effective length, and equals $A_i/L_i$. The shape factor for the RSTRENG model can be evaluated by $d_{eff}/d_{maxi}$, as shown in FIG. 4 with $d_{maxi}$ denoting the maximum depth within sub-section i.

Psqr Method

According to Eq. (3), the potential contributing factors to the conservatism of RSTRENG model, which have been identified (Leis et al. 2016), are the following three factors:
  Flow Stress
  Shape Factor
  Bulging Factor In an analysis, Applicants focused on the improvement of the shape factor (i.e., idealization of the corrosion profile), and the other two factors remain the same as the RSTRENG model. It should be noted that two PRCI projects (EC-2-6 and EC-2-7) have been focusing on the improvements of flow stress and bulging factor (Leis et al. 2016).

In some cases, the use of river bottom profile provides an overly pessimistic representation of the corrosion profile that leads to conservative estimate of the burst pressure, particularly for large corrosion morphologies where the deepest parts of the corrosion are not lined up along the axis of the pipe and deepest portions of the pitting are separated by islands of greater remaining wall.

Figure 5A:
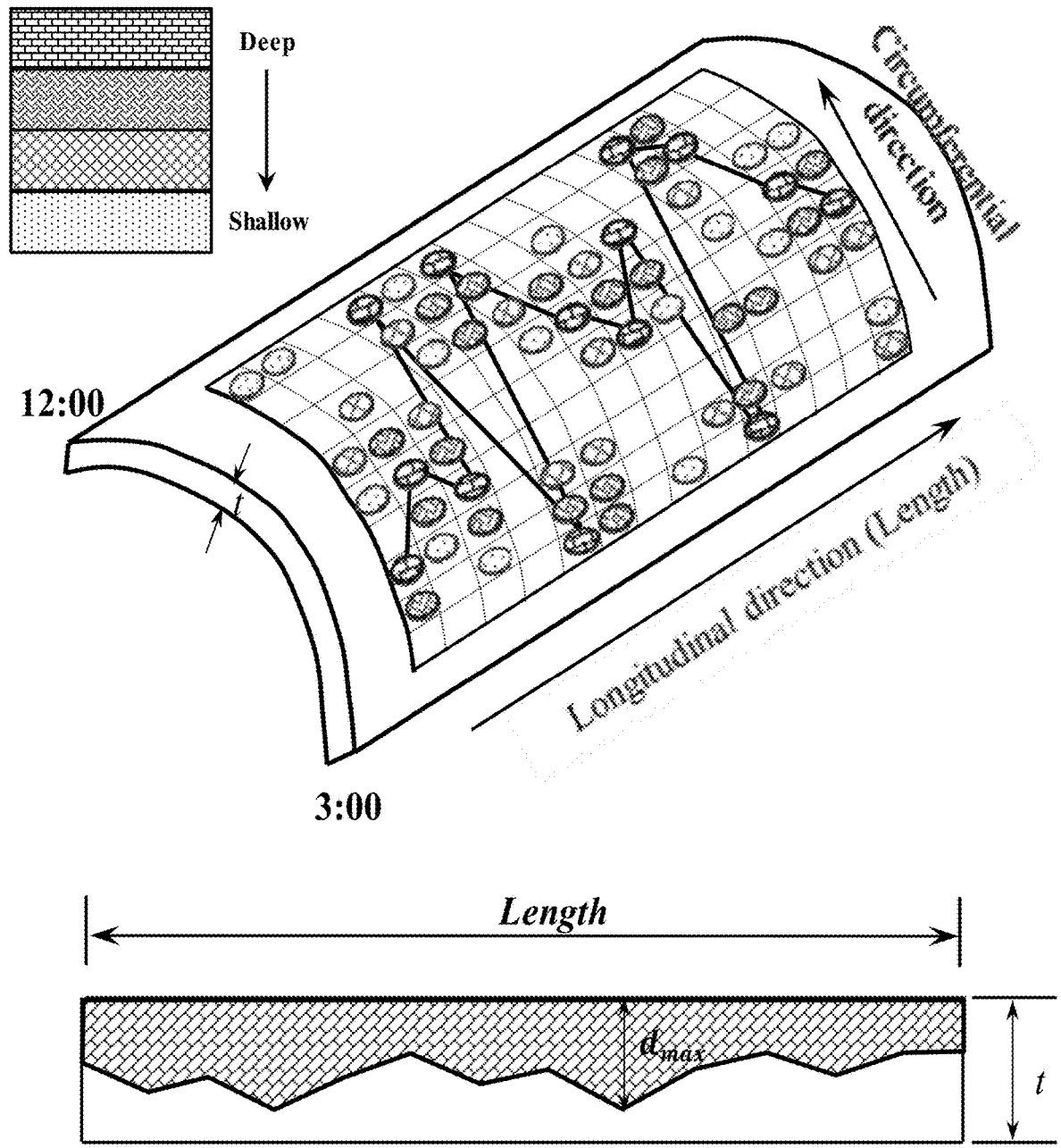
FIG. 5A is an illustration of a river bottom profile, which is represented by the projected solid area onto the longitudinal direction on the pipe wall, according to some embodiments.

This is primarily attributed to the fact that the river bottom profile considers all the deepest points regardless of the circumferential separation (i.e. the distance between any adjacent points in the circumferential direction). As shown in FIG. 5A, the river bottom profile, which is represented by the projected solid area onto the longitudinal direction on the pipe wall, considers the deepest points between 12:00 and 3:00 o'clock.

Figure 5B:
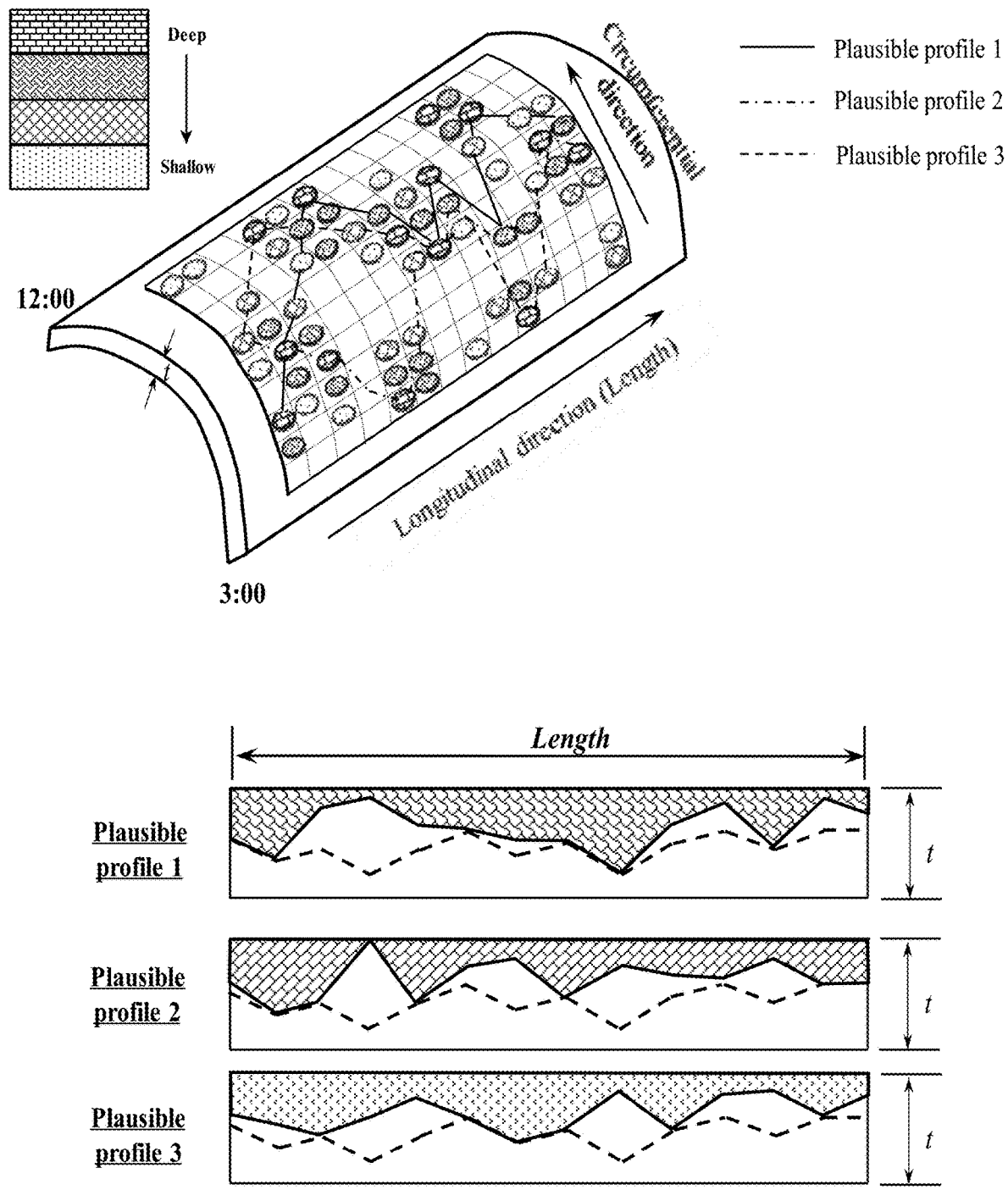
FIG. 5B is an illustration of multiple plausible profiles, denoted by plausible profiles 1, 2, 3, . . . , n, to characterize the shape of corrosion, according to some embodiments.

To address the conservatism embedded in the river bottom profile, a series of plausible profiles are used to characterize the corrosion morphologies. As illustrated in FIG. 5B, multiple plausible profiles are generated, denoted by plausible profiles 1, 2, 3, . . . , n, to characterize the shape of corrosion. The area of each of the plausible profile (i.e. the solid area) is less than or equal to that of the river bottom profile (i.e. the area bounded by the dashed line). The methodology of generating those plausible profiles is described further in the description.

Given one particular plausible profile, the effective area method used by RSTRENG model is used to evaluate the burst pressure corresponding to this profile. By repeating this process for a certain number of plausible profiles, the burst pressure samples corresponding to those plausible profiles can be generated considering a certain number of plausible profiles. The predicted burst pressure for the corrosion anomaly being assessed will then be determined based on a certain percentile value of the samples.

Figure 6:
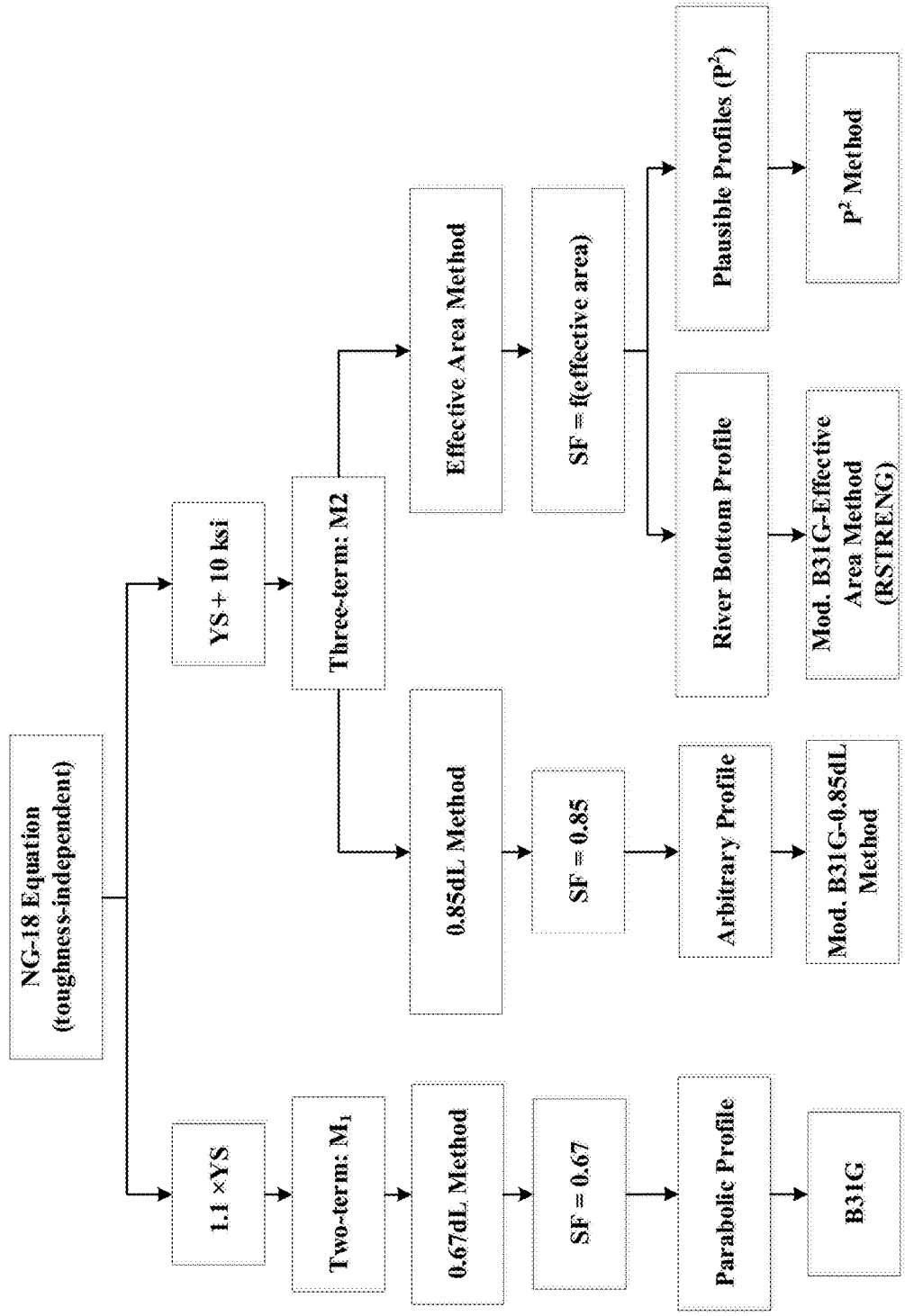
FIG. 6 is a flowchart illustrating example steps of a method, according to some embodiments.

As previously mentioned, the model is referred to as Psqr method. The evolution of the models derived from the NG-18 approach is described in FIG. 6.

This Psqr method has been implemented in a corrosion assessment tool called, TCAT.

Methodology of Generating a Plausible Profile

The detailed three-dimensional (3D) measurement of corrosion anomaly in a grid form, including depth, length and width, is required for generating plausible profiles. The 3D grid of the corrosion anomaly can be generated either from field measurement or ILI. Given the 3D grid of an anomaly, the following three control parameters were introduced to generate the plausible profiles:

start point of generating the plausible profile
interaction window
likelihood of interaction The values of the parameters were determined using the burst test results with consideration of sensitivity analysis. It should be noted that the plausible profile is representing a plausible set of anomalies that may interact to reduce the failure pressure and does not represent the fracture propagation path of rupture.

Start Point of Generating the Plausible Profile

Figure 7A:
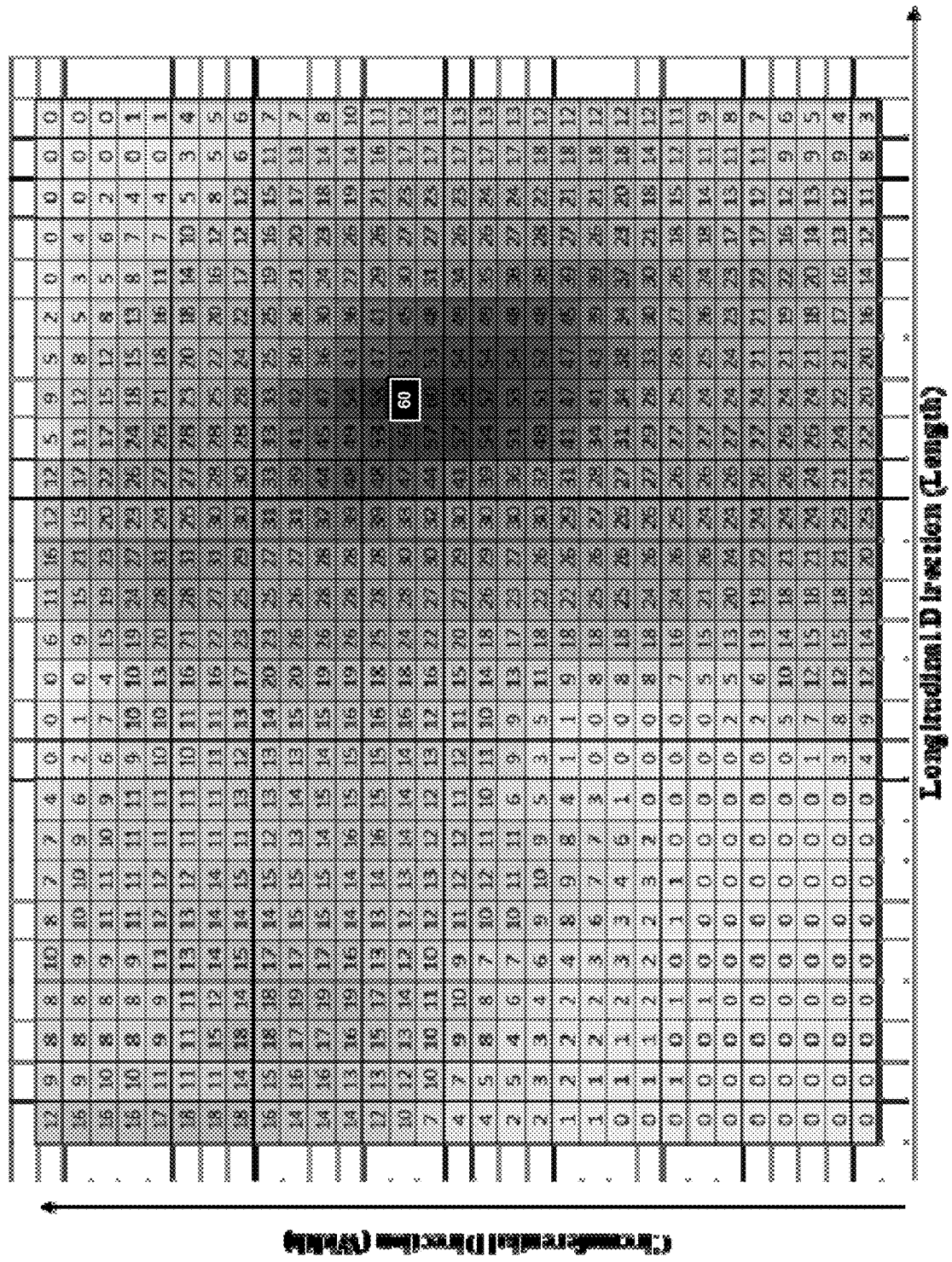
FIG. 7A is a grid model having a table showing the designation of a start point, according to some embodiments. In this example, the start point can be any point in the grid.

To generate a plausible profile, a start point should be selected. This start point can be any point in the grid, see FIG. 7A. In this study, the deepest point was originally selected as the start point for all plausible profiles considering that the deepest point is a characteristic point for a given corrosion area.

This assumption works well for the vast majority of corrosion morphologies.

An improved approach in relation to the generation of the start point is also used in some embodiments, which is better suited for less common corrosion morphologies such as cluster including pinhole with general corrosion, where the pinhole is deeper than and far away from the general corrosion.

To address the technical issues with these morphologies, the start point was assumed profile-specific and chosen based on the depth-weighted factor given by Eq. (5). The deeper corrosion in the grid, the higher chance to be selected as start point.

$$P_{ij} = \frac{d_{ij}}{\sum_{k=1}^{M} \sum_{l=1}^{N} d_{kl}} \quad (5)$$

where $P_{ij}$ denotes the likelihood of $d_{ij}$ being selected as the starting point and did denotes the depth corresponding to the $k^{th}$ row and $l^{th}$ column of the matrix.

Some other start point choices were also tested in this study, e.g. the deepest point within the whole corrosion cluster, the deepest points of the other local area within the cluster, and arbitrary point within the cluster.

Figure 7B:
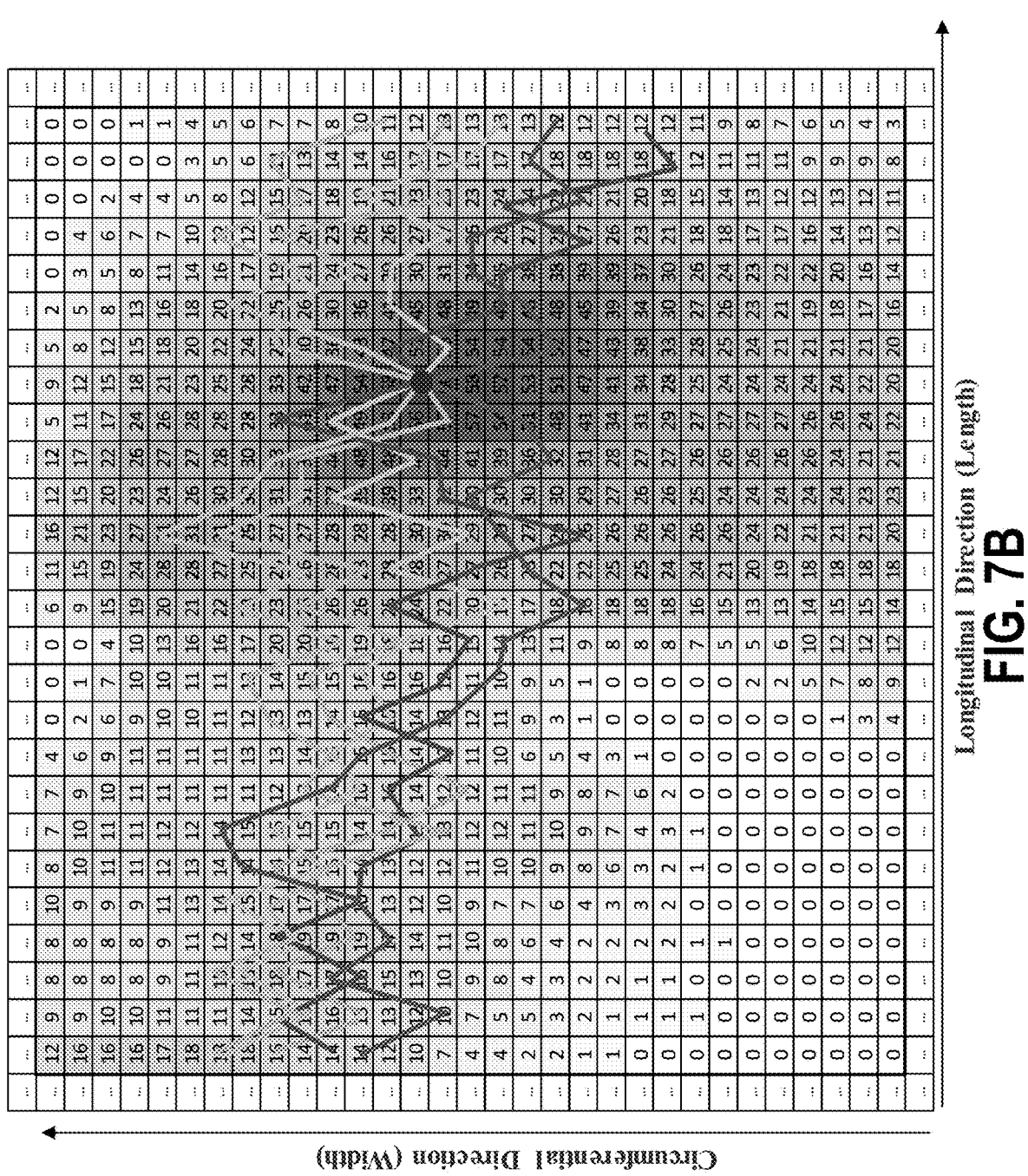
FIG. 7B is an example grid showing where the deepest point is used as the start point, according to some embodiments.
Figure 7C:
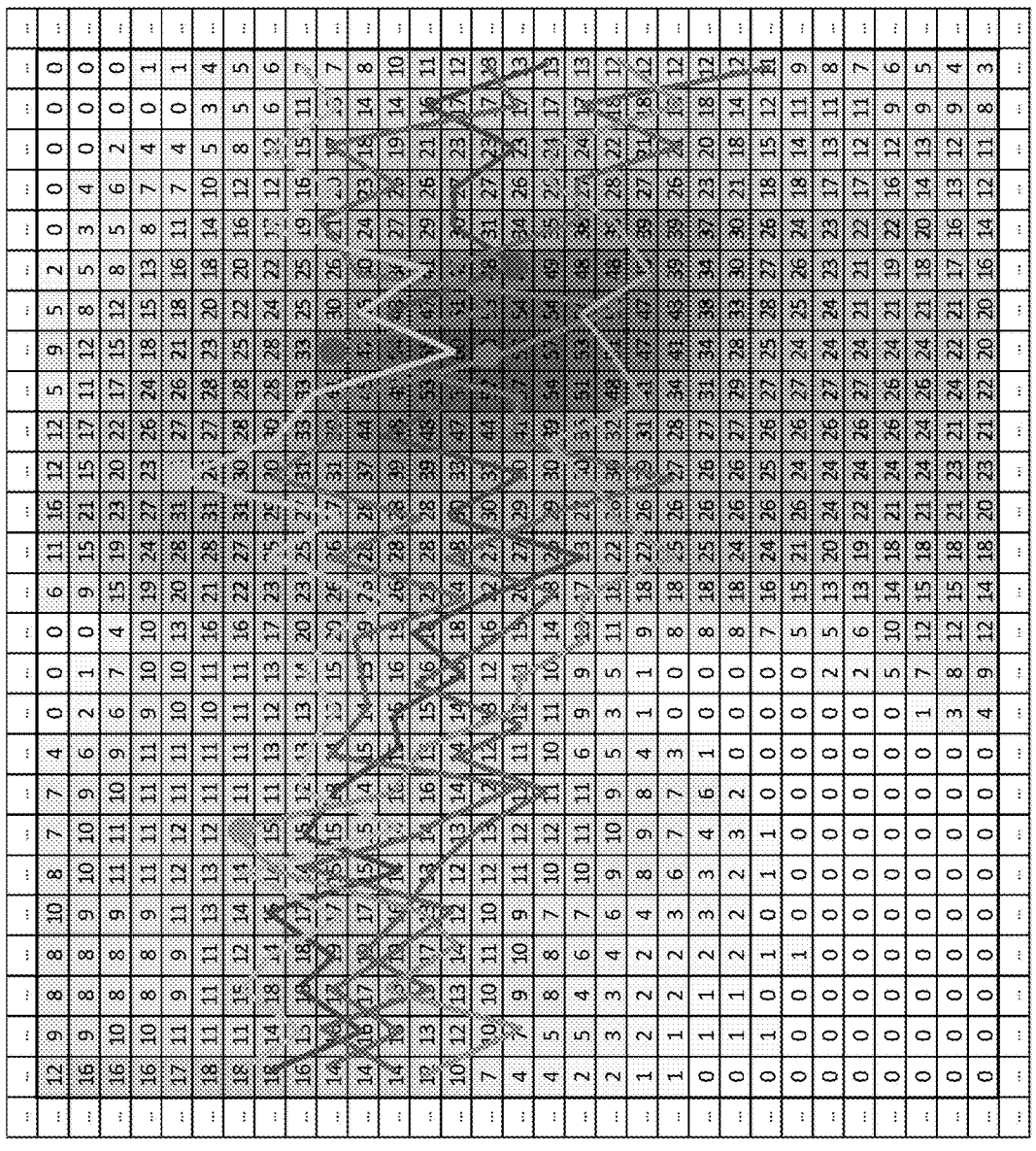
FIG. 7C, is an example grid showing where a depth-weighted start point is used, each profile has its individual start point (i.e. profile-specific start point), according to some embodiments.

The sensitivity analysis has shown that the start point has negligible impact on the predicted pressure for the majority of corrosion morphologies. When the deepest point is used as the start point, all plausible profiles have one common point of intersection, as shown in FIG. 7B. In contrast, when the depth-weighted start point is used, each profile has its individual start point (i.e. profile-specific start point), as shown in FIG. 7C. The solid circular symbols in FIG. 7B and FIG. 7C represent the start point.

Figure 7D:
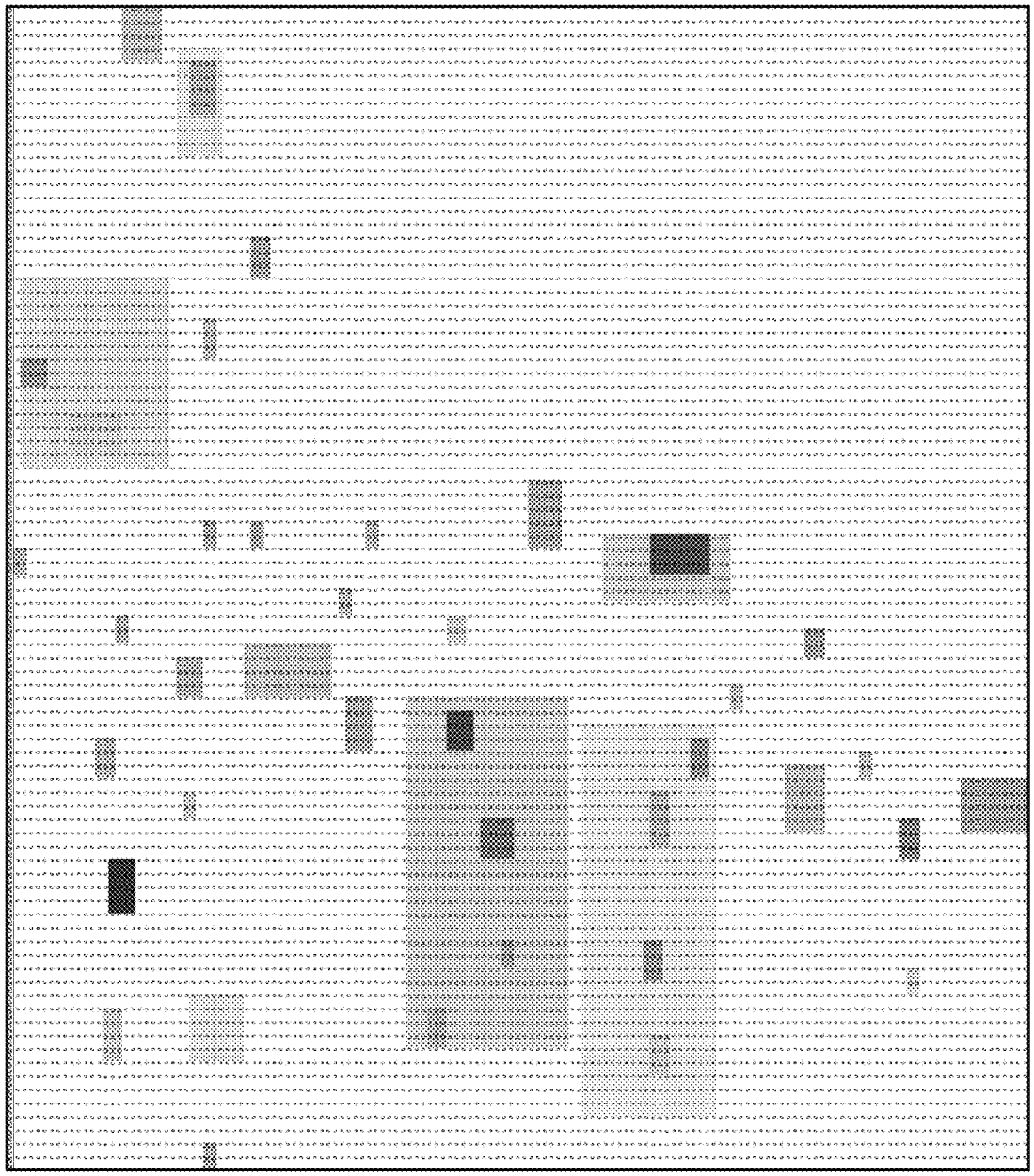
FIG. 7D is a sample output from a MFL tool showing a real corrosion cluster.

The depth-weighted profile-specific start point has an advantage over the single start point (i.e. deepest point), which is described as follows using a real corrosion cluster reported by MFL tool shown in FIG. 7D.

Figure 7E:
FIG. 7E is a grid showing an example distribution of plausible profiles over the effective length using the deepest point as the start point, according to some embodiments.
Figure 7F:
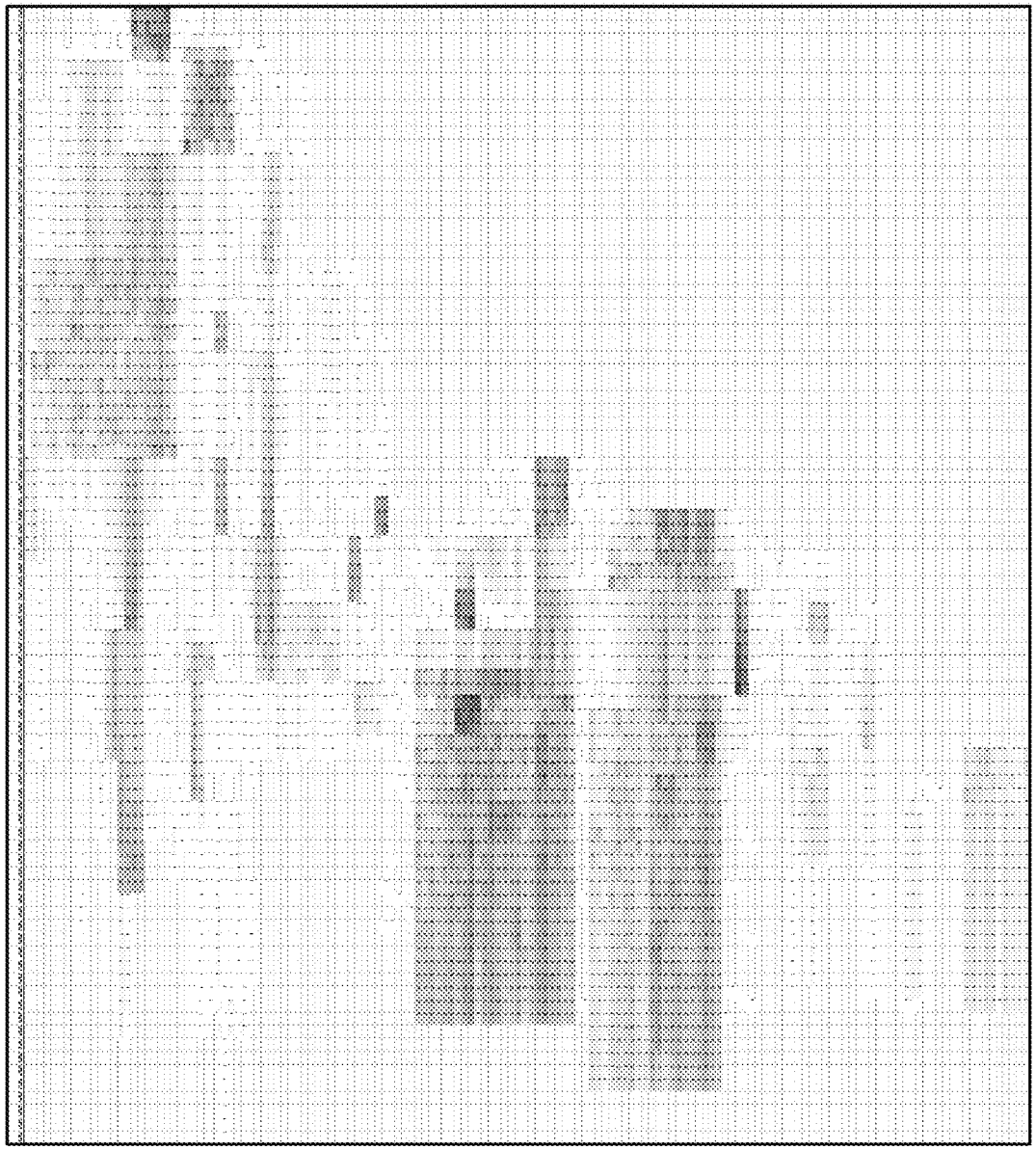
FIG. 7F is similar to FIG. 7E, but using a profile-specific start point determined from the depth-weighted factor.

Given the morphology of corrosion cluster, a thousand of plausible profiles are generated. FIG. 7E shows the distribution of plausible profiles over the effective length using the deepest point as the start point whereas FIG. 7F shows the same information but using profile-specific start point determined from the depth-weighted factor.

It can be seen from FIG. 7E that the use of deepest point as the start point missed a large portion of the corrosion area in the plausible profile generation, which misinterprets the corrosion information for pressure calculation. In contrast, when the depth-weighted factor is used to generate a profile-specific starting point, the distribution of plausible profiles over their respective effective length is consistent with the corrosion morphology. The refinement of starting point was validated through an intentionally designed corrosion morphology. Accordingly, the modified method is better suited in some embodiments.

Interaction Window

Figure 8:
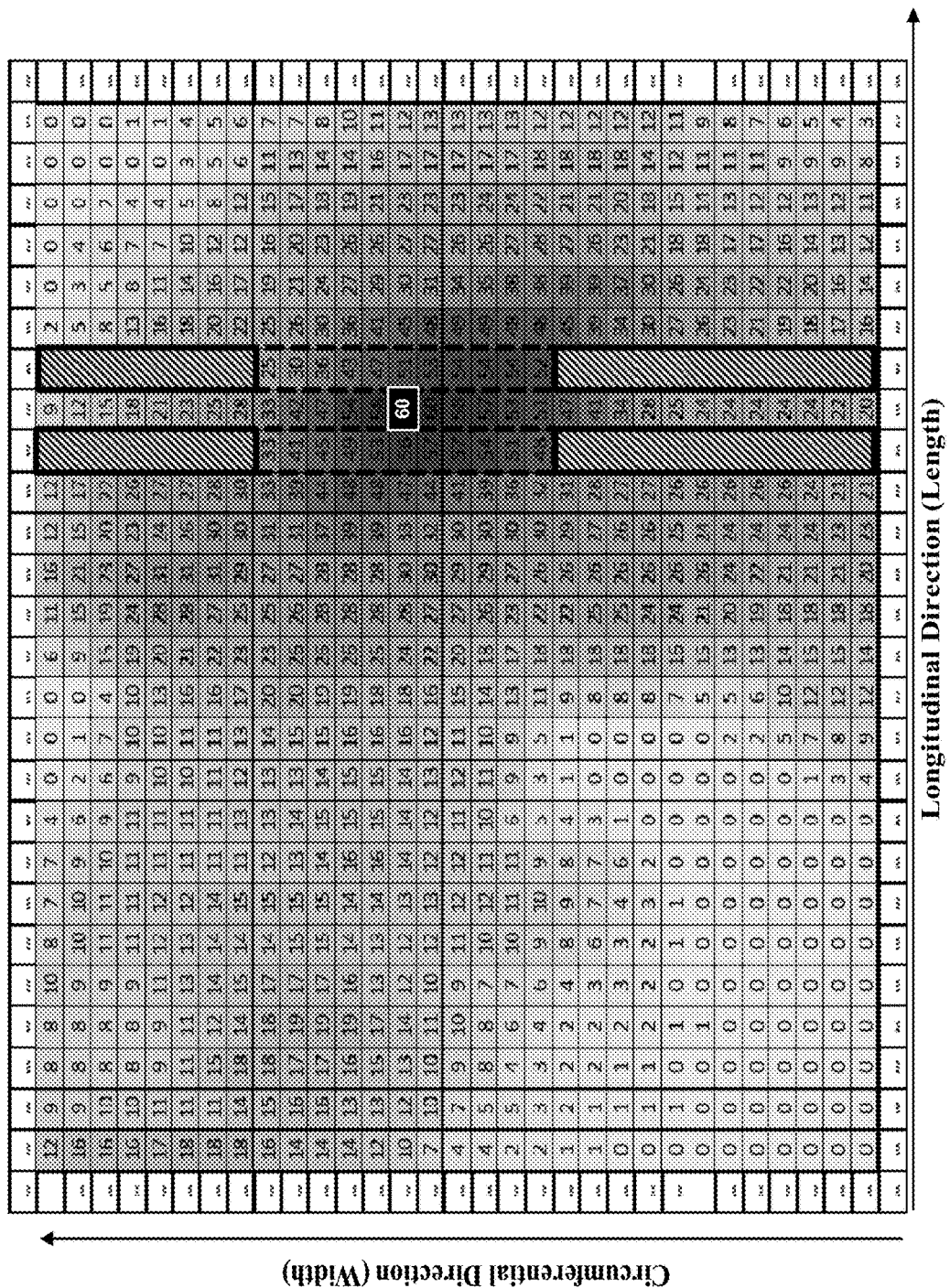
FIG. 8 is a grid view showing the selection of next points in adjacent slices, according to some embodiments.

The plausible profile is generated by connecting a series of plausible points within each circumferential slice of the grid. Those plausible points can be identified sequentially from the start point. Given the start point, the next two points in the adjacent slices on either side of the start point (see the two windows in FIG. 8) should be identified. To do so, the start point is set as the anchor point and two interaction windows that are centered at each side of the anchor point are created.

The window width is defined considering interaction of features. For each adjacent slice of the anchor point, only the points within the interaction window have the chance to be selected as the next point of the plausible profile. Essentially, the interaction window defines a limit beyond which widely separated points cannot interact with each other and therefore cannot be combined to form a plausible profile.

Once a plausible point is identified, it is considered as the next anchor point to create subsequent windows. This process is repeated until the plausible points are identified throughout every circumferential slice of the grid. To create a plausible profile, the plausible point within each window is determined using the likelihood of interaction method. The length of interaction window is determined through the sensitivity analysis.

Likelihood of Interaction

Consider m points within a given interaction window, the likelihood of point i (i=1, 2, . . . , m) being selected from the m points to connect with the anchor point is determined by the depth of this point $d_i$, and the proximity between point i and the anchor point, $I_i$. The probability density function (PDF) of likelihood of interaction is given by Eq. (6):

$$P_i = \alpha \frac{l_i}{\sum_{j=1}^{m} l_j} + \beta \frac{d_i}{\sum_{j=1}^{m} d_j} \quad (6)$$

where $P_i$ denotes the likelihood of interaction between the anchor point and point i within the window, α and β denote the weighting factor associated with proximity and depth that contribute to $P_i$, where α+β=1. When the summation of all depths within the window equals zero, the second term in Eq. (6) equals zero (i.e. β=0); that is, the likelihood of interaction is solely dependent on proximity.

Figure 9:
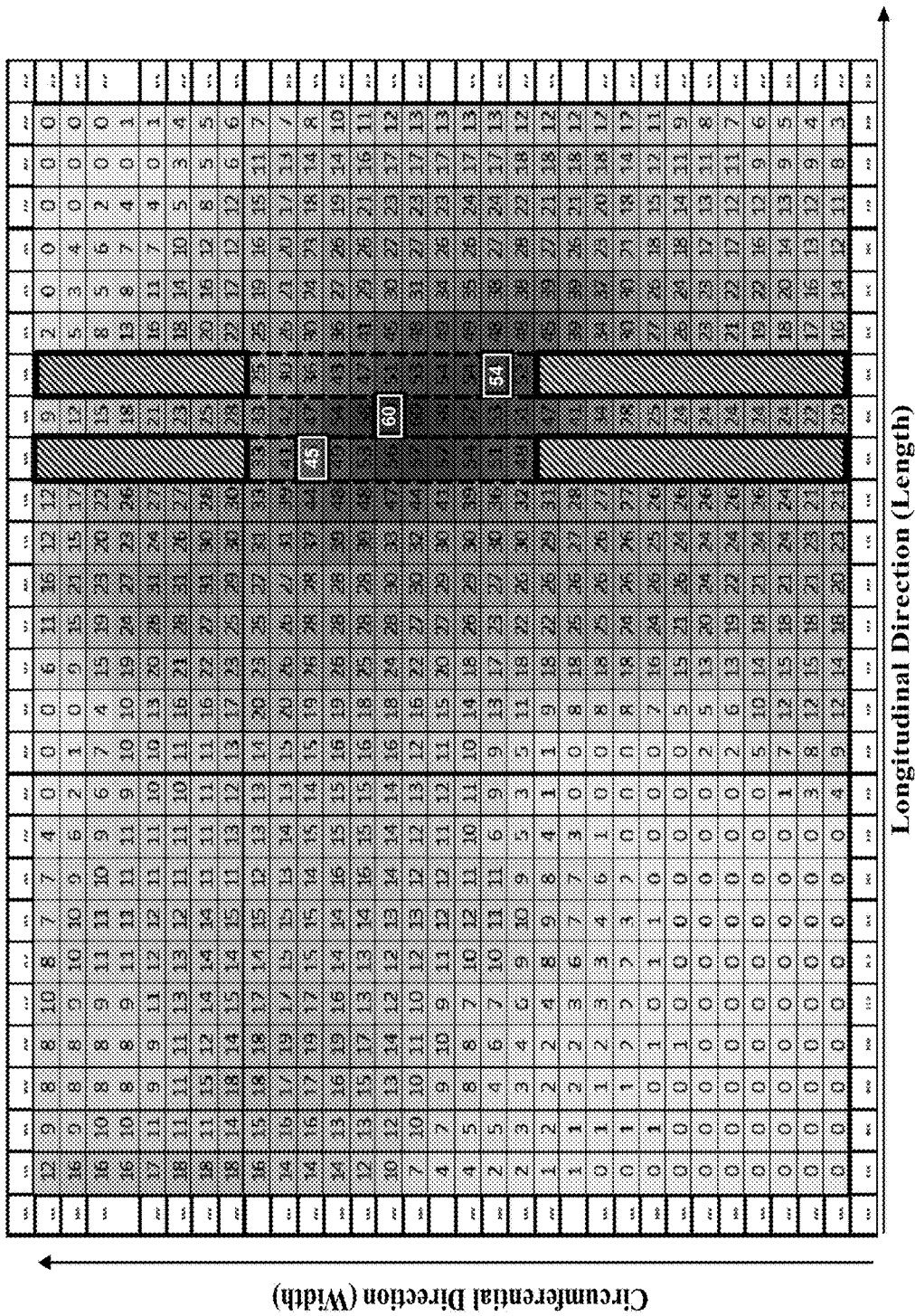
FIG. 9 is a grid view showing the selection of next points in adjacent slices based on probability distribution functions, according to some embodiments.

The values of α and β are determined based on sensitivity analysis. It follows from above-description that the PDF of likelihood of interaction for a given window can be created by Eq. (6). Given the PDF, a point, as shown in FIG. 9, can be chosen from the well-defined interaction window through simulation. It should be noted that the PDF of likelihood of interaction is slice-specific and window-specific, which will be dynamically updated when a new anchor point is generated.

Approach

Consider a corrosion anomaly has a length of L and a width of W and assume the resolution of the grid is Δl in the longitudinal direction, and Δw in the circumferential direction, the total grid of the feature is an M×N matrix with M=W/Δw and N=L/Δl.

Figure 10A:
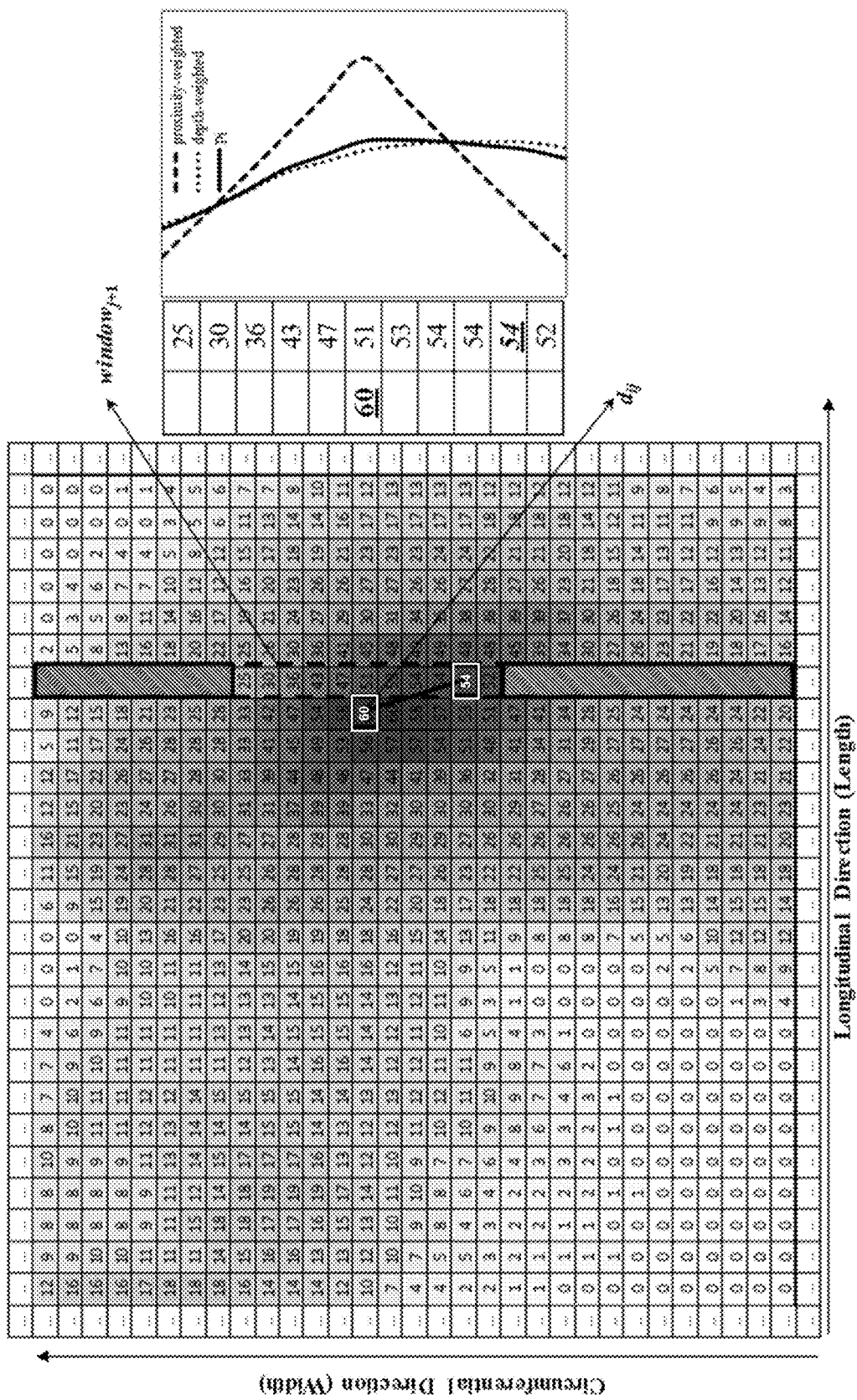
FIG. 10A is a grid view showing the selection of next points based on probability distribution functions, according to some embodiments.
Figure 10B:
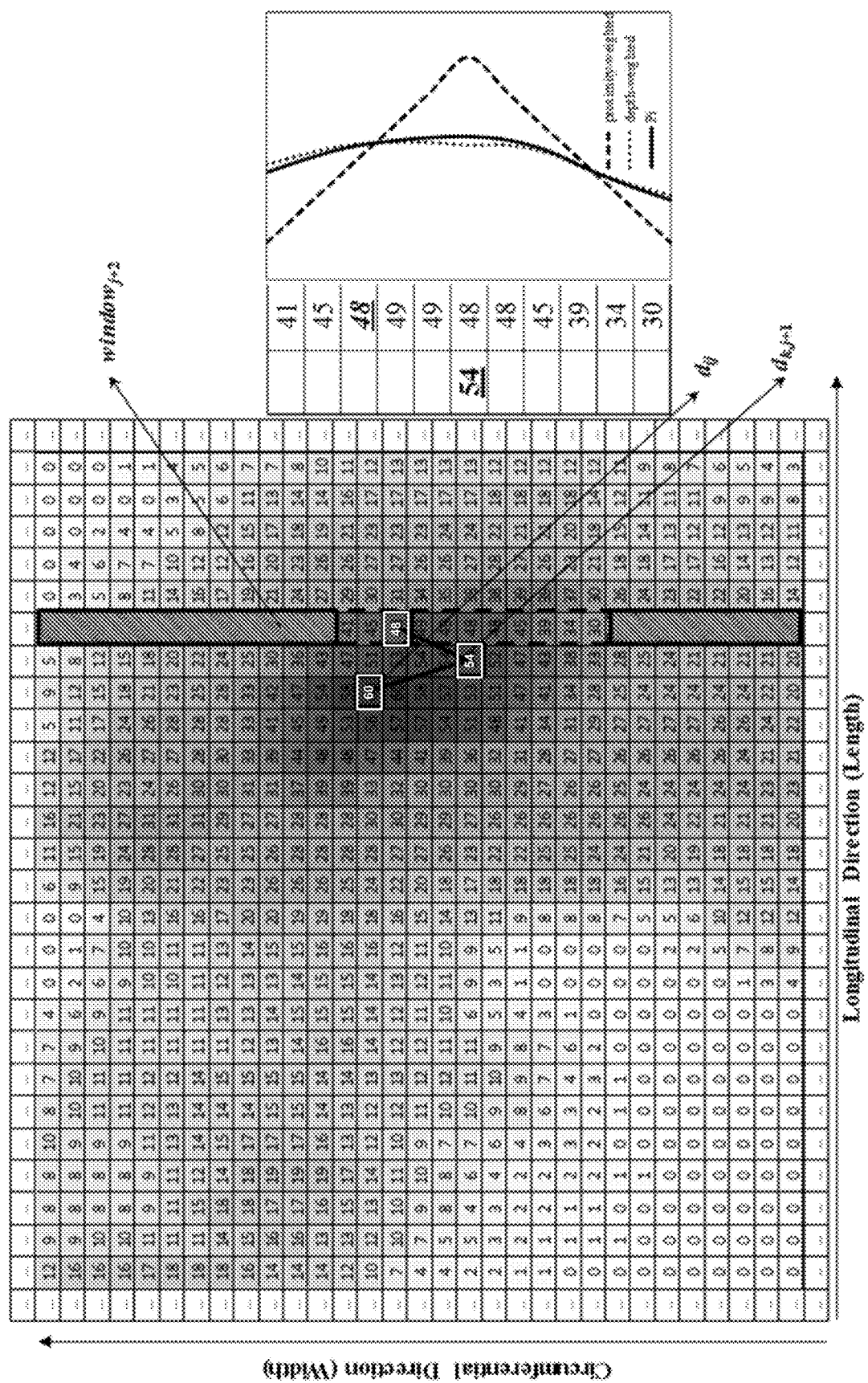
FIG. 10B is a grid view showing the selection of next points based on probability distribution functions, according to some embodiments.
Figure 10C:
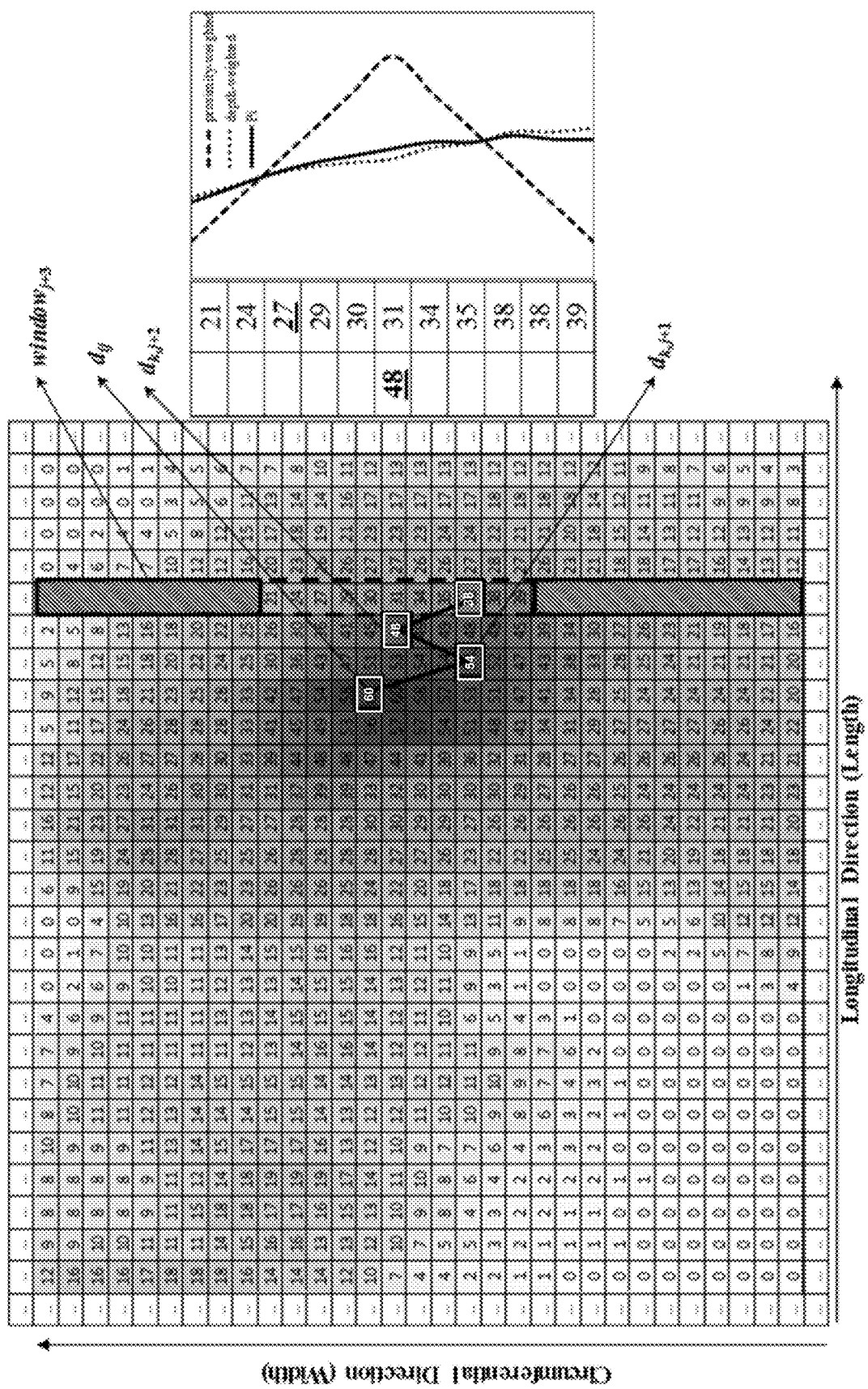
FIG. 10C is a grid view showing the selection of next points based on probability distribution functions, according to some embodiments.
Figure 10D:
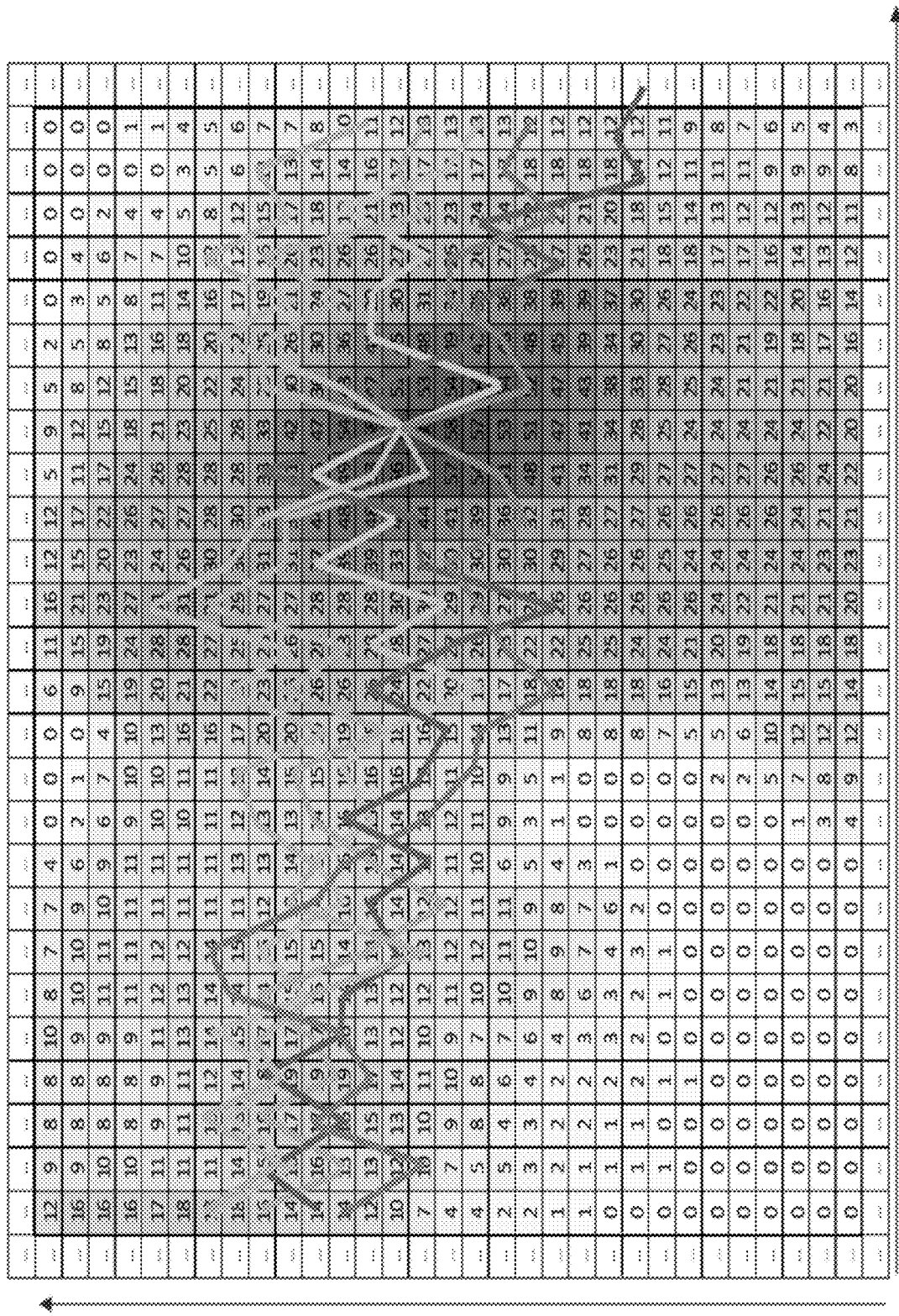
FIG. 10D is a grid view showing the selection of next points based on probability distribution functions, according to some embodiments, the profiles generated by connecting plausible measurement points.

Note that the resolution of grids depends on the technology used to measure the features, e.g. laser scan tool for field measurement. Without loss of generality, for a given simulation, the algorithm to generate one plausible profile is described as follows:

1) Set the anchor point at the start point $d_{ij}$;
2) Create window$_{j+1}$ (i.e. the interaction window at slice j+1) with the defined window width of mΔw, which contains m measurement points;
3) Define the PDF of likelihood of interaction between the anchor point and the measurement points within the window$_{j+1}$ (see FIG. 10A);
4) Based on the PDF defined in Step 3, a plausible point can be identified from window$_{j+1}$, and denoted by $d_{k,j+1}$ with k=i+x (see FIG. 10B). Note that x can be any integer value between −(m−1)/2 and (m−1)/2 that determined by a new generated random seed and the slice-specific and window-specific PDF;
5) Set the anchor point at $d_{k,j+1}$ and go to Steps 2 through 4 to get next interaction window (see FIG. 10C); repeat this process until all plausible points at the right-hand side of the start point $d_{ij}$;
6) Repeat Steps 2 through 5 to identify all plausible points at the left-hand side of the start point $d_{ij}$, and
7) generate one plausible profile by connecting all those plausible measurement points (see FIG. 10D).

It follows from above-described process that a total of $N_p$ plausible profiles can be generated by repeating $N_p$ cycles of simulation.

Determination of Burst Pressure

For each of the $N_p$ plausible profiles, $N_p$ pressure values are generated using Eqs. (4a) through (4c). The $N_p$ pressure values form a distribution which can be used to determine any percentile value. The predicted burst pressure is a conservative percentile value (say 5th-percentile) of the distribution. It should be emphasized that an appropriate $N_p$ value should be used in the model to obtain unbiased stable percentile estimate of pressure. A sensitivity analysis shows the impact of $N_p$ value on the predicted pressure. In this study, the value of $N_p$ is chosen dynamically to assure stable convergence of the $5^{th}$ percentile value, which is implemented in TCAT.

Figure 11:
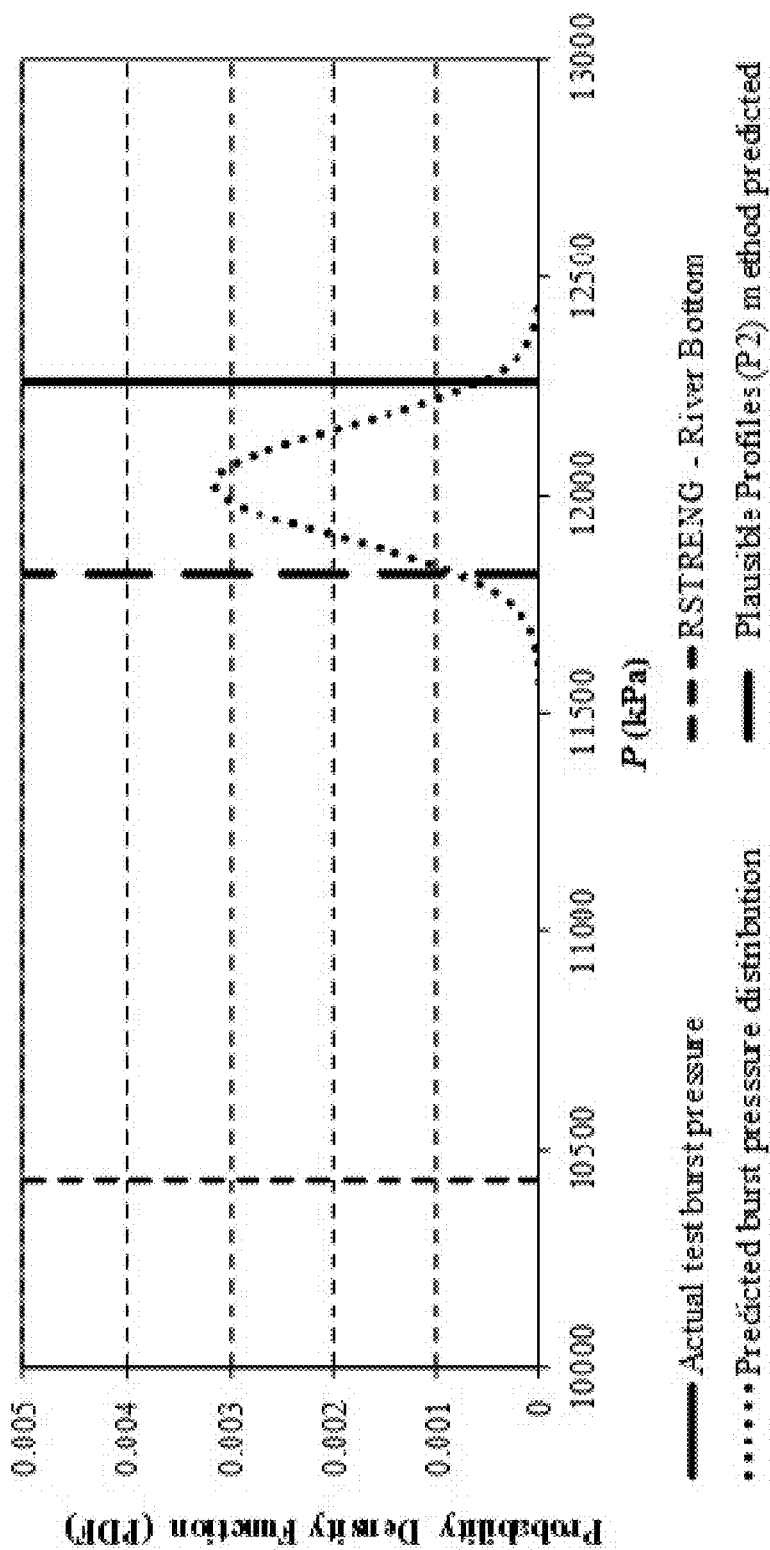
FIG. 11 is a graph of a probability density function (PDF) of the pressure values corresponding to a certain number of plausible profiles, according to some embodiments.

FIG. 11 shows a probability density function (PDF) of the pressure values corresponding to a certain number of plausible profiles (i.e. the round dotted curve) for one of the burst test cases, where the short-dashed and solid lines represent the RSTRENG-predicted burst pressure and actual burst pressure observed from the test, respectively. The percentile value, i.e. the long-dashed line in FIG. 11, was directly evaluated based on the samples and is independent of the type of probabilistic distribution.

In this study, the $5^{th}$-percentile value of the pressure distribution is defined as the representative predicted burst pressure based on the Psqr method. This implies that 95% of the times the pressures associated with the generated plausible profiles will exceed this representative predicted burst pressure. Furthermore, it is an appropriate choice from the safety perspective as all the test data have consistently shown that the $5^{th}$ percentile value is less than the actual burst pressure, and therefore assures safety.

Figure 12:
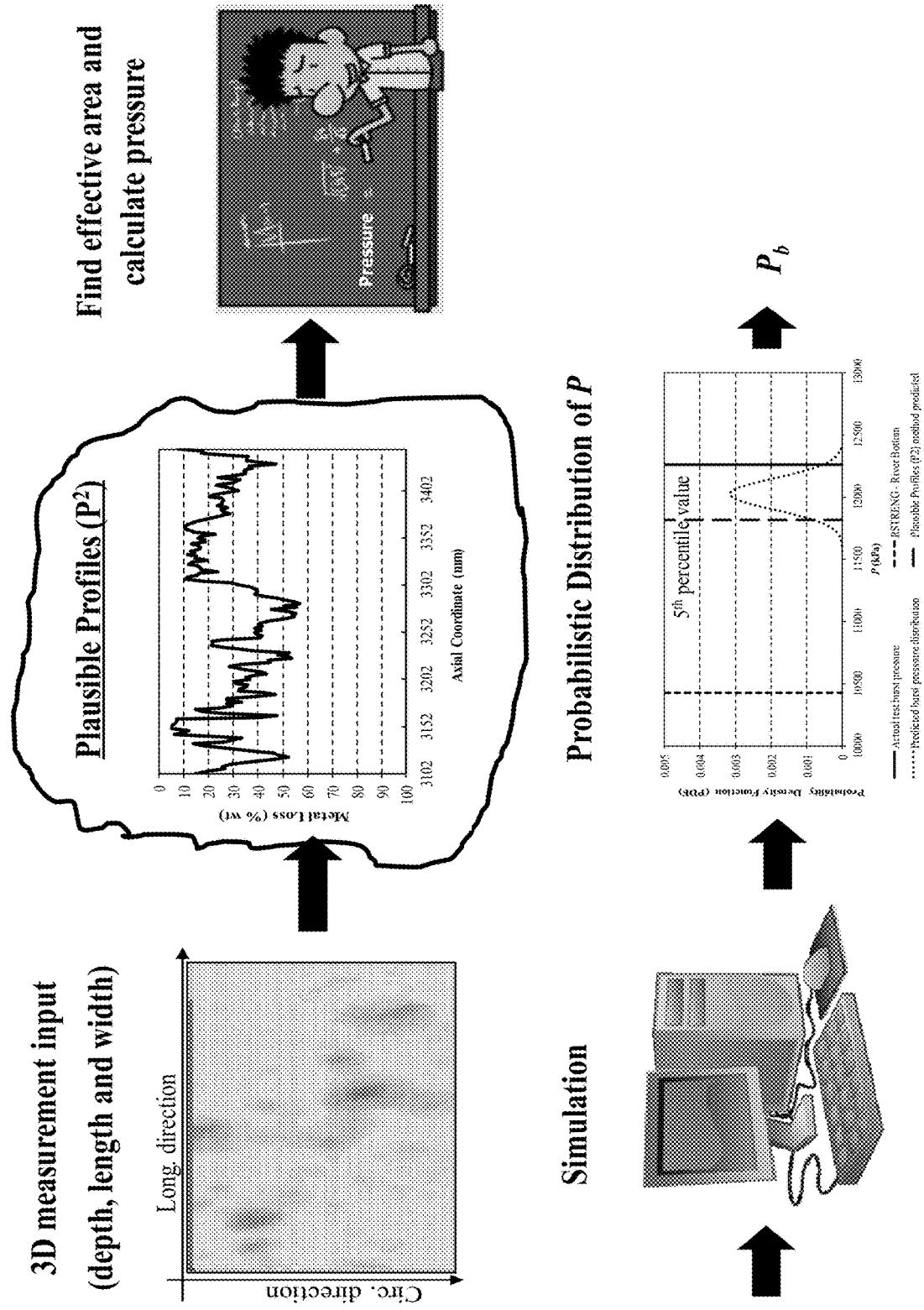
FIG. 12 is an example pictographic flowchart of a method, according to some embodiments.

The process of using the Psqr method to evaluate the burst pressure is depicted in FIG. 12.

Burst Test Review

To validate the accuracy of the developed model, a set of specimen-based full-scale hydrostatic tests were carried out to measure the actual burst pressure and then the model was validated by comparing the model-predicted pressure with the corresponding test pressure.

For the purpose of validation, a total of 14 pipe samples, which were removed from in-service pipeline containing real corrosion features, were originally hydrostatically tested in 2015. In 2018, another 16 burst tests were carried out for further validation and model refinement, where two pipe samples were removed from in-service pipeline containing real corrosion features and fourteen pipe samples were new pipe with machined and etched corrosion. In general, the following sequence of steps were followed to successfully execute the project:

Thirty (30) pipe joints were identified and transported to the lab

Mechanical testing was performed for each pipe joint to determine the actual material properties in the lab External corrosion was characterized using the Laser Mapping Tool Visual Image Correlation (VIC) measurements were painted on the pipe Each pipe joint was pressurized to failure, and the failure pressures were recorded per burst test procedure Assessment of results The failure pressure of each pipe was predicted using actual material properties and corrosion dimensions using both RSTRENG and Psqr method and then is compared with the actual failure pressure for model validation. Each of these aspects is briefly discussed below.

Pipe Joints Identified for Burst Testing

The pipe joints identified for burst testing are presented in Table 3.1 for the 2015 test and in Table 3.2 for the 2018 test and the details provided in this table are described as follows:

- Diameter is the nominal pipe size (NPS)
- Sample Number for each pipe joint
- Upstream girth weld (US GVV) number based upon the most recent ILI
- Mechanical testing report (MTR) number for unique joints of pipe, along with the referenced report number that contained the results
- Outside Diameter (OD), Wall Thickness (WT), and Specified Minimum Yield Strength (SMYS) for each pipe joint, and
- Sequential order of the burst testing as it was performed

TABLE 3.1

Pipe Joints Identified for Burst Testing in 2015

| OD (NPS) | Sample No. | US GW | MTR No. | OD (mm) | WT (mm) | SMYS (MPa) | Burst Test No. |
|---|---|---|---|---|---|---|---|
| 30 | 30_1 | 16360 | 1 (128.3) | 762 | 8.34 | 483 | 11 |
|  | 30_2 | 16370 | 2 (128.2) | 762 | 8.34 | 483 | 13 |
|  | 30_3 | 16260 | 3 (128.4) | 762 | 8.34 | 483 | 10 |
|  | 30_4 | 16100 | 4 (132.1) | 762 | 8.34 | 483 | 12 |
|  | 30_5 | 16140 | 5 (128.5) | 762 | 8.34 | 483 | 1 |
|  | 30_6 | 16320 | 6 (128.1) | 762 | 8.34 | 483 | 9 |
| 24 | 24_1 | 18080 | 1 (132.2) | 610 | 6.8 | 483 | 15 |
|  | 24_2 |  |  | 610 | 6.8 | 483 | 14 |
| 16 | 16_1 | 1000 | 1 (128.7) | 406 | 6 | 359 | 5 |
|  | 16_2 |  |  | 406 | 6 | 359 | 2 |
|  | 16_3 |  |  | 406 | 6 | 359 | 7 |
|  | 16_5 | 1200 | 2 (128.6) | 406 | 6 | 359 | 6 |
|  | 16_6 | 580 | 3 (132.3) | 406 | 6 | 359 | 3 |
|  | 16_7 |  |  | 406 | 6 | 359 | 8 |

TABLE 3.2

Pipe Joints Identified for Burst Testing in 2018

| OD (NPS) | Sample No. | US GW | MTR No. | NOD (mm) | NWT (mm) | SMYS (MPa) | Burst Test No. |
|---|---|---|---|---|---|---|---|
| 8 | 8_1 | NA | 1 (126.1) | 219.1 | 4.6 | 359 | 1 |
|  | 8_2 |  |  | 219.1 | 4.6 | 359 | 2 |
| 12 | 12_1 |  | 2 (126.2) | 323.9 | 6.4 | 359 | 3 |
|  | 12_2 |  |  | 323.9 | 6.4 | 359 | 4 |
| 20 | 20_1 |  | 3 (126.3) | 508 | 9.5 | 483 | 7 |
|  | 20_2 |  |  | 508 | 9.5 | 483 | 8 |
|  | 20_3 | 110960 | 11 (154.2) | 508 | 6.6 | 359 | 9 |
| 24 | 24_1 | NA | 4 (126.4) | 609.6 | 9 | 483 | 6 |
|  | 24_2 |  |  | 609.6 | 9 | 483 | 5 |
| 30 | 30_1 | 20410 | 12 (154.3) | 762 | 9.53 | 359 | 10 |
| 34 | 34_1 | NA | 5 (126.5) | 863.6 | 11.9 | 483 | 11 |
| 36 | 36_1 |  | 6 (126.6) | 914.4 | 11.8 | 483 | 16 |
| 42 | 42_1 |  | 7 (126.7) | 1066.8 | 14.3 | 483 | 12 |
|  | 42_2 |  | 8 (126.8) | 1066.8 | 14.3 | 483 | 13 |
| 48 | 48_1 |  | 10 (154.1) | 1219.2 | 11.6 | 483 | 14 |
|  | 48_2 |  | 9 (126.9) | 1219.2 | 11.6 | 483 | 15 |

Material Property Testing

The mechanical testing results including yield strength (YS), ultimate tensile strength (UTS) and Charpy V-Notch (CVN) toughness value, and chemical test results (i.e. Carbon Equivalent) for each pipe joint are summarized in Table 3.3 for the 2015 test and in Table 3.4 for the 2018 test. Additional details on the material property testing are available.

TABLE 3.3

Mechanical and Chemical Test Results for the 2015 test

| OD (NPS) | Sample No. | MTR No. | SMYS (MPa) | YS-2% (MPa) | VS-0.5% (MPa) | UTS (MPa) | YS/UTS | Average Elongation | CVN-Full size (J) | Carbon Equivalent |
|---|---|---|---|---|---|---|---|---|---|---|
| 30 | 30_1 | 1 (128.3) | 483 | 534 | 537 | 655 | 0.815 | 30 | 92 | 0.3 |
|  | 30_2 | 2 (128.2) |  | 530 | 528 | 649 | 0.816 | 29 | 88 | 0.28 |
|  | 30_3 | 3 (128.4) |  | 560 | 553 | 684 | 0.818 | 29 | 81 | 0.3 |
|  | 30_4 | 4 (132.1) |  | 511 | 516 | 608 | 0.841 | 34 | 101 | 0.26 |
|  | 30_5 | 5 (128.5) |  | 549 | 537 | 663 | 0.827 | 30 | 81 | 0.29 |
|  | 30_6 | 6 (128.1) |  | 510 | 507 | 627 | 0.812 | 25 | 91 | 0.26 |
| 24 | 24_1 | 1 (132.2) | 483 | 555 | 545 | 682 | 0.814 | 28 | 102 | 0.36 |
|  | 24_2 |  |  | 555 | 545 | 682 | 0.814 | 28 | 102 | 0.36 |
| 16 | 16_1 | 1 (128.7) | 359 | 371 | 382 | 541 | 0.686 | 33 | 35 | 0.4 |
|  | 16_2 |  |  | 371 | 382 | 541 | 0.686 | 33 | 35 | 0.4 |
|  | 16_3 |  |  | 371 | 382 | 541 | 0.686 | 33 | 35 | 0.4 |
|  | 16_5 | 2 (128.6) |  | 397 | 412 | 558 | 0.711 | 29 | 33 | 0.3 |
|  | 16_6 | 3 (132.3) |  | 412 | 422 | 576 | 0.715 | 28 | 32 | 0.31 |
|  | 16_7 |  |  | 412 | 422 | 576 | 0.715 | 28 | 32 | 0.31 |

TABLE 3.4

Mechanical and Chemical Test Results for the 2018 test

| OD (NPS) | Sample No. | MTR No. | SMYS (MPa) | YS-2% (MPa) | YS-0.5% (MPa) | UTS (MPa) | Y/T | Average Elongation | CVN-Full (J) | Carbon Equivalent |
|---|---|---|---|---|---|---|---|---|---|---|
| 8 | 8_1 | 1 (126.1) | 359 | 410 | 427 | 507 | 0.842 | 36 | 132 | 0.16 |
|  | 8_2 |  |  | 410 | 427 | 507 | 0.842 | 36 | 132 | 0.16 |
| 12 | 12_1 | 2 (126.2) |  | 401 | 416 | 525 | 0.792 | 37 | 178 | 0.19 |
|  | 12_2 |  |  | 401 | 416 | 525 | 0.792 | 37 | 178 | 0.19 |
| 20 | 20_1 | 3 (126.3) | 483 | 546 | 554 | 650 | 0.852 | 28 | 173 | 0.2 |
|  | 20_2 |  |  | 546 | 554 | 650 | 0.852 | 28 | 173 | 0.2 |
|  | 20_3 | 11 (154.2) | 359 | 410 | 430 | 577 | 0.745 | 27 | 16 | 0.54 |
| 24 | 24_1 | 4 (126.4) | 483 | 562 | 572 | 704 | 0.813 | 28 | 188 | 0.25 |
|  | 24_2 |  |  | 562 | 572 | 704 | 0.813 | 28 | 188 | 0.25 |
| 30 | 30_1 | 12 (154.3) | 359 | 378 | 395 | 537 | 0.736 | 34 | 26 | 0.47 |
| 34 | 34_1 | 5 (126.5) | 483 | 559 | 566 | 669 | 0.846 | 30 | 325 | 0.27 |
| 36 | 36_1 | 6 (126.6) |  | 569 | 571 | 675 | 0.846 | 27 | 224 | 0.23 |
| 42 | 42_1 | 7 (126.7) |  | 572 | 573 | 683 | 0.839 | 32 | 325 | 0.23 |
|  | 42_2 | 8 (126.8) |  | 548 | 550 | 653 | 0.842 | 34 | 325 | 0.23 |
| 48 | 48_1 | 10 (154.1) |  | 542 | 548 | 643 | 0.852 | 38 | 325 | 0.24 |
|  | 48_2 | 9 (126.9) |  | 619 | 608 | 705 | 0.862 | 31 | 325 | 0.27 |

Pipe Dimensions

The actual pipe dimensions for each pipe section that were measured in the lab are provided in Table 3.5 for the 2015 test and in Table 3.6 for the 2018 test.

TABLE 3.5

Actual Outside Diameter (AOD) and Actual Wall Thickness (AWT) of Each Pipe sample for the 2015 test

| OD (NPS) | Sample No. | US GW | AOD (mm) | AWT (mm) |
|---|---|---|---|---|
| 30 | 30_1 | 16360 | 763.2 | 8.4 |
|  | 30_2 | 16370 | 763.4 | 8.5 |
|  | 30_3 | 16260 | 763.2 | 8.4 |
|  | 30_4 | 16100 | 763.7 | 8.5 |
|  | 30_5 | 16140 | 762.9 | 8.4 |
|  | 30_6 | 16320 | 764.1 | 8.4 |
| 24 | 24_1 | 18080 | 610.5 | 6.8 |
|  | 24_2 |  | 610.6 | 6.7 |
| 16 | 16_1 | 1000 | 408.2 | 6.2 |
|  | 16_2 |  | 407.7 | 6.2 |
|  | 16_3 |  | 407.7 | 6.2 |
|  | 16_5 | 1200 | 407.7 | 5.9 |
|  | 16_6 | 580 | 407.4 | 5.9 |
|  | 16_7 |  | 407.4 | 6.0 |

TABLE 3.6

Actual Outside Diameter (AOD) and Actual Wall Thickness (AWT) of Each Pipe sample for the 2018 test

| OD (NPS) | Sample No. | US GW | AOD (mm) | AWT (mm) |
|---|---|---|---|---|
| 8 | 8_1 | NA | 219.1 | 5.7 |
|  | 8_2 |  | 219.1 | 5.7 |
| 12 | 12_1 |  | 323.9 | 6.2 |
|  | 12_2 |  | 323.9 | 6.2 |
| 20 | 20_1 |  | 508 | 9.5 |
|  | 20_2 |  | 508 | 9.5 |
|  | 20_3 | 110960 | 508 | 6.5 |
| 24 | 24_1 | NA | 609.6 | 9 |
|  | 24_2 |  | 609.6 | 9 |
| 30 | 30-1 | 20410 | 762 | 9.9 |
| 34 | 34_1 | NA | 863.6 | 11.7 |
| 36 | 36_1 |  | 914.4 | 11.8 |
| 42 | 42_1 |  | 1066.8 | 14.3 |
|  | 42_2 |  | 1066.8 | 14.4 |
| 48 | 48_1 |  | 1219.2 | 11.5 |
|  | 48_2 |  | 1219.2 | 11.6 |

Corrosion Mapping

Figure 13:
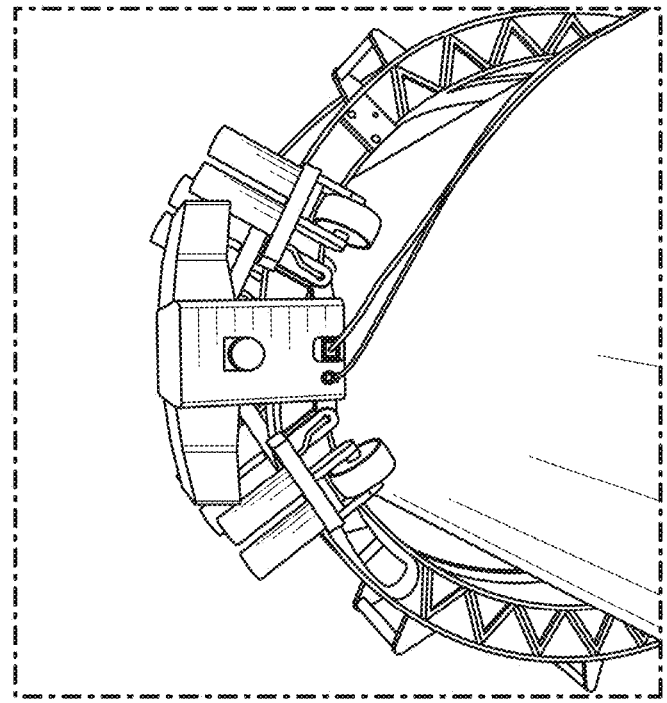
FIG. 13 includes two photographs of a testing apparatus for corrosion detection, according to some embodiments.
Figure 13:
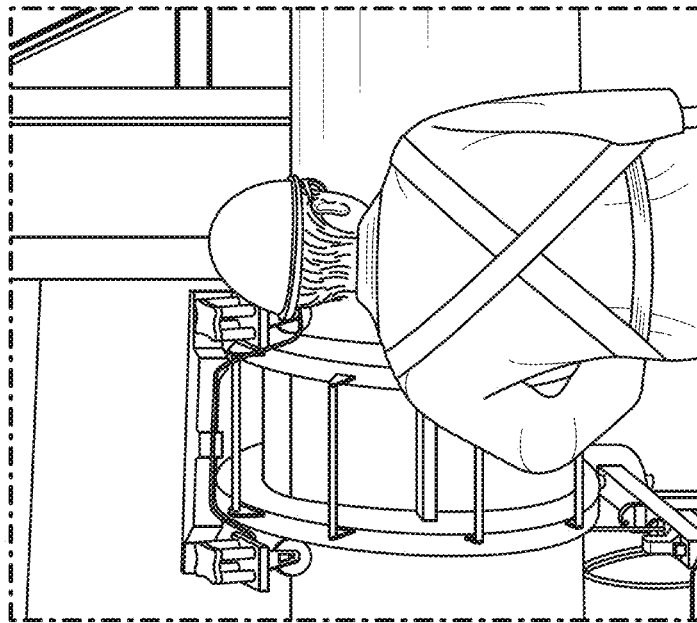

The Laser Pipeline Inspection Tool (LPIT) and Handyscan tool (a portable 3D laser scanning technology) to characterize the external metal loss for each pipe joint, see FIG. 13, and summarized in Table 3.7 and Table 3.8 for 2015 test and 2018 test, respectively.

Figure 14:
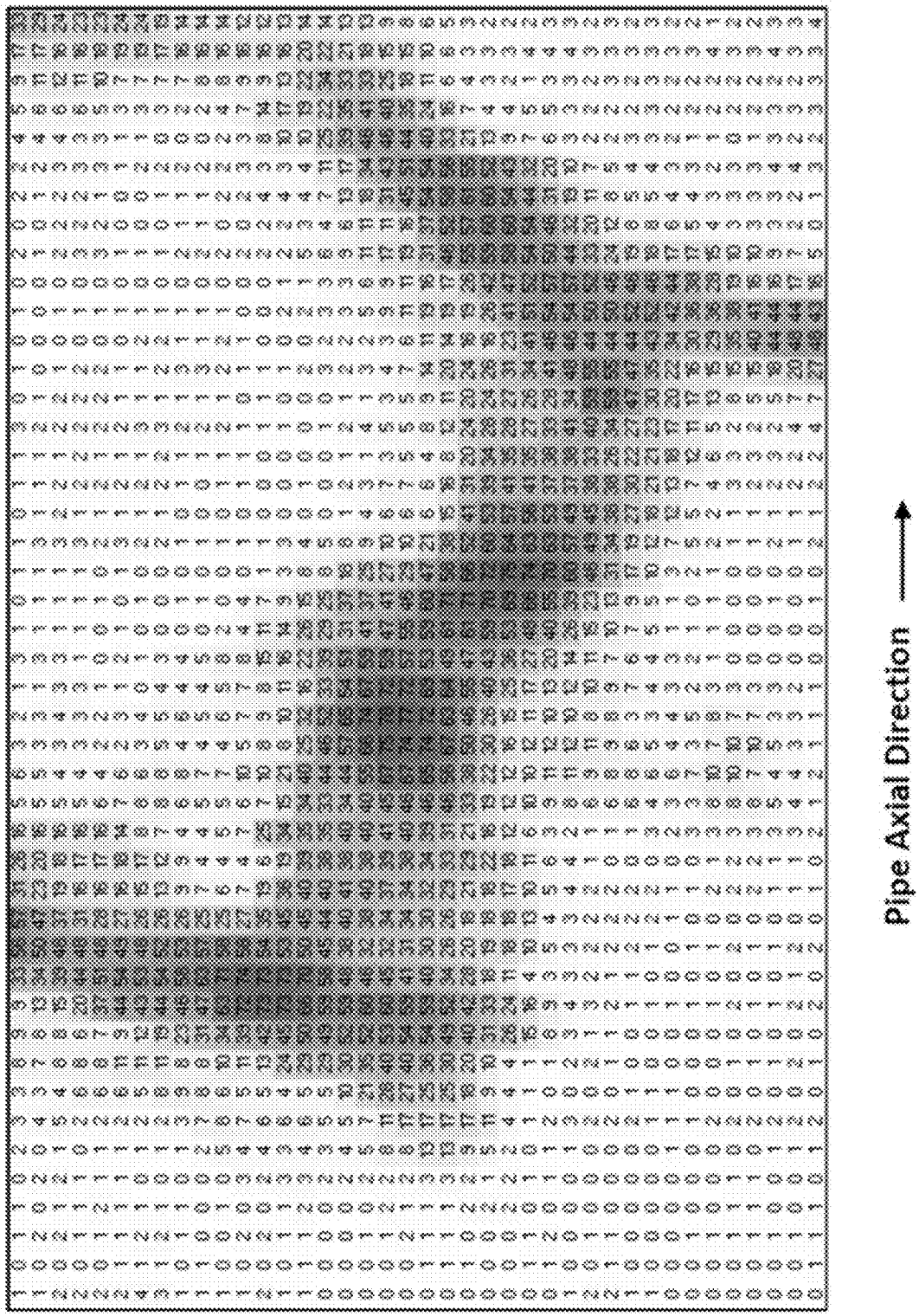
FIG. 14 is an example set of points as detected by a laser, according to some embodiments.

LPIT is attached to the pipe using tracking mounts between two rings that encircle the pipe. A servo-motor is used to move the laser back and forth and elevation measurements at about 1.5 mm increments axially and 2 mm increments circumferentially (see FIG. 14). It should be noted that the internal surface is not measured and therefore the remaining wall is the difference between the nominal wall thickness and the corrosion depth. The actual wall thickness is confirmed at locations away from the area of corrosion.

TABLE 3.7

Laser Scan Tool Used for Metal-loss Corrosion Characterization for the 2015 test

| OD (NPS) | Sample No. | US GW | Laser Scan tool |
|---|---|---|---|
| 30 | 30_1 | 16360 | Handyscan |
|  | 30_2 | 16370 | Handyscan |
|  | 30_3 | 16260 | Handyscan |
|  | 30_4 | 16100 | Handyscan |
|  | 30_5 | 16140 | LPIT |
|  | 30_6 | 16320 | Handyscan |
| 24 | 24_1 | 18080 | Handyscan |
|  | 24_2 |  | Handyscan |
| 16 | 16_1 | 1000 | LPIT |
|  | 16_2 |  | LPIT |
|  | 16_3 |  | LPIT |

TABLE 3.7-continued

Laser Scan Tool Used for Metal-loss Corrosion Characterization for the 2015 test

| OD (NPS) | Sample No. | US GW | Laser Scan tool |
|---|---|---|---|
| | 16_5 | 1200 | LPIT |
| | 16_6 | 580 | LPIT |
| | 16_7 | | LPIT |

TABLE 3.8

Laser Scan Tool Used for Metal-loss Corrosion Characterization for the 2018 test

| OD (NPS) | Sample No. | US GW | Laser Scan tool |
|---|---|---|---|
| 8 | 8_1 | NA | Handyscan |
| | 8_2 | | Handyscan |
| 12 | 12_1 | | Handyscan |
| | 12_2 | | Handyscan |
| 20 | 20_1 | | LPIT |
| | 20_2 | | Handyscan |
| | 20_3 | 110960 | Handyscan |
| 24 | 24_1 | NA | LPIT |
| | 24_2 | | LPIT |
| 30 | 30-1 | 20410 | LPIT |
| 34 | 34_1 | NA | LPIT |
| 36 | 36_1 | | LPIT |
| 42 | 42_1 | | LPIT |
| | 42_2 | | Handyscan |
| 48 | 48_1 | | Handyscan |
| | 48_2 | | Handyscan |

Visual Image Correlation (VIC) Measurements

Figure 15:
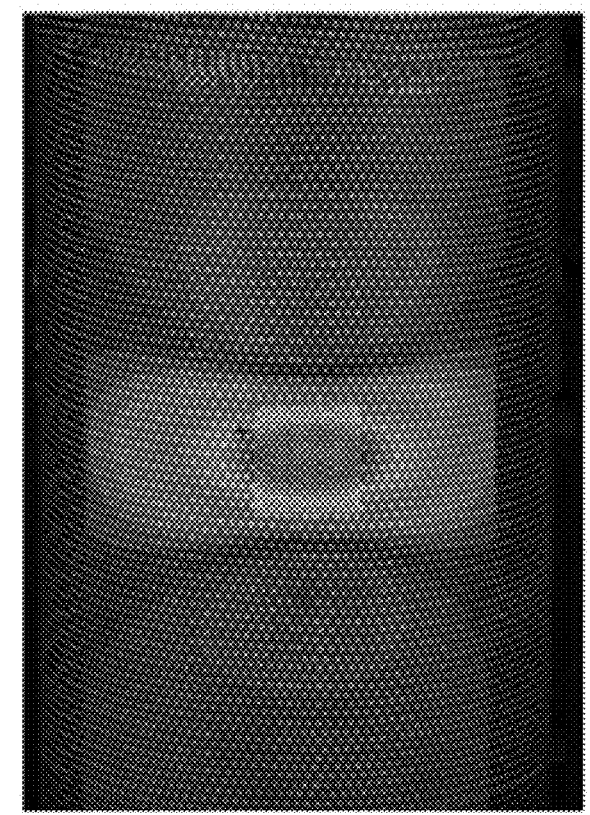
FIG. 15 is an example of the dot pattern applied to the pipe and subsequent strain results, according to some embodiments.
Figure 15:
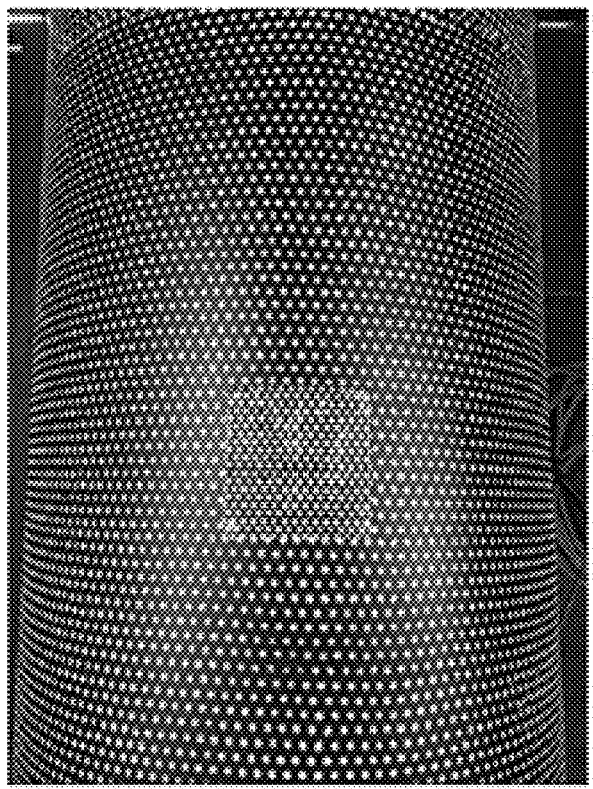

The VIC-3D optical inferrometry technique was used to measure surface strains during each test. This is done by painting a 'dot' grid pattern on each pipe joint. During the test, two sets of cameras are used to monitor the dot pattern painted on the pipe surface. An example of the dot pattern applied to the pipe and subsequent strain results are provided in FIG. 15. The corrosion cluster at the location of failure for each pipe are summarized in Table 3.9 for the 2015 test and in Table 3.10 for the 2018 test.

TABLE 3.9

Summary of Feature of Each Pipe for the 2015 test

| Pipe Information | | | Cluster Information Associated with Failure Location | | | |
|---|---|---|---|---|---|---|
| | | | | Peak | | |
| OD (NPS) | Sample No. | US GW | Cluster ID | Depth (% wt) | Length (mm) | Width (mm) |
| 30 | 30_1 | 16360 | 20 | 68 | 4326 | 407 |
| | 30_2 | 16370 | 1 | 48 | 430 | 262 |
| | 30_3 | 16260 | 1 | 73 | 610 | 386 |
| | 30_4 | 16100 | 13 | 78 | 710 | 192 |
| | 30_5 | 16140 | 11 | 59 | 782 | 271 |
| | 30_6 | 16320 | 35 | 75 | 1450 | 244 |
| 24 | 24_1 | 18080 | 20 | 30 | 1504 | 248 |
| | 24_2 | | 72 | 39 | 428 | 191 |
| 16 | 16_1 | 1000 | 1 | 33 | 844 | 296 |
| | 16_2 | | 24 | 47 | 1160 | 391 |
| | 16_3 | | 43 | 43 | 330 | 212 |
| | 16_5 | 1200 | 23 | 97 | 356 | 223 |
| | 16_6 | 580 | 16 | 57 | 344 | 121 |
| | 16_7 | | 38 | 87 | 542 | 375 |

TABLE 3.10

Summary of Feature of Each Pipe for the 2018 test

| Pipe Information | | | Cluster Information Associated with Failure Location | | | |
|---|---|---|---|---|---|---|
| | | | | Peak | | |
| OD (NPS) | Sample No. | US GW | Cluster ID | Depth (% wt) | Length (mm) | Width (mm) |
| 8 | 8_1 | NA | 1 | 51.7 | 849 | 328 |
| | 8_2 | | 1 | 47.6 | 859 | 310 |
| 12 | 12_1 | | 1 | 43.6 | 436 | 330 |
| | 12_2 | | 1 | 45.6 | 440 | 334 |
| 20 | 20_1 | | 1 | 71.6 | 932 | 388 |
| | 20_2 | | 1 | 74.6 | 564 | 348 |
| | 20_3 | 110960 | 1 | 39.3 | 366 | 142 |
| 24 | 24_1 | NA | 1 | 53.5 | 956 | 270 |
| | 24_2 | | 1 | 52.8 | 421 | 194 |
| 30 | 30_1 | 20410 | 1 | 50.7 | 1110 | 109 |
| 34 | 34_1 | NA | 1 | 78 | 572 | 212 |
| 36 | 36_1 | | 1 | 48.7 | 592 | 318 |
| 42 | 42_1 | | 1 | 63.9 | 303 | 1036 |
| | 42_2 | | 1 | 57.7 | 816 | 1266 |
| 48 | 48_1 | | 1 | 67.2 | 550 | 656 |
| | 48_2 | | 1 | 69.4 | 554 | 824 |

Burst Test Procedure

Figure 16:
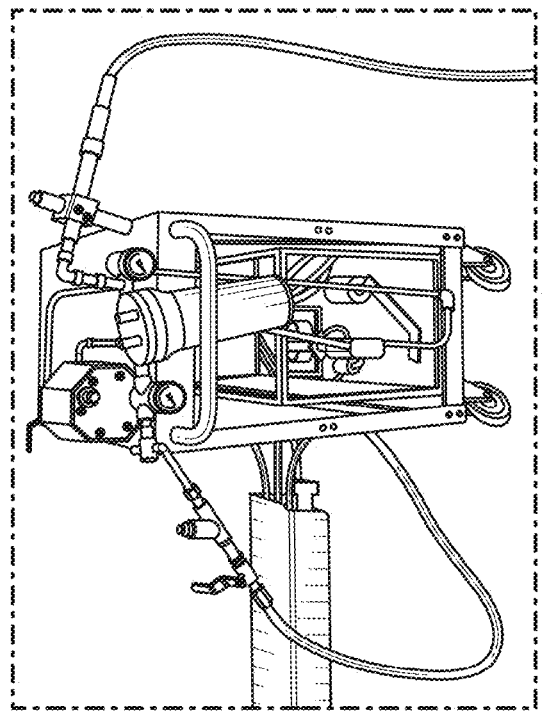
FIG. 16 includes photographs of the test facility, according to some embodiments.
Figure 16:
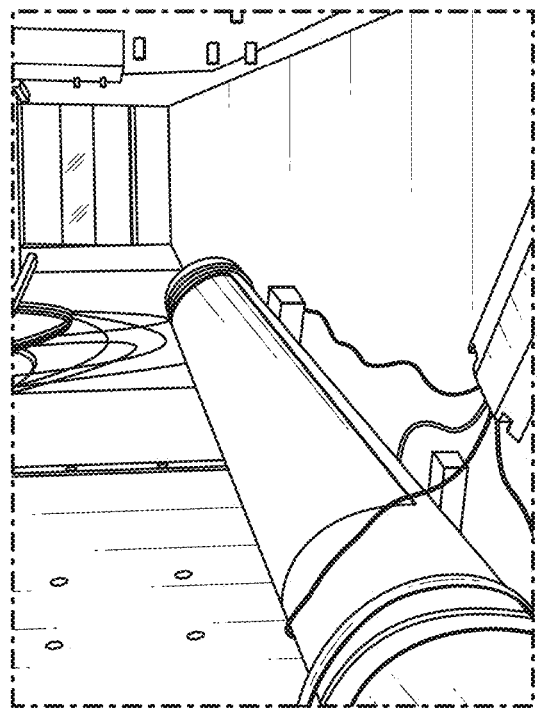
Figure 16:
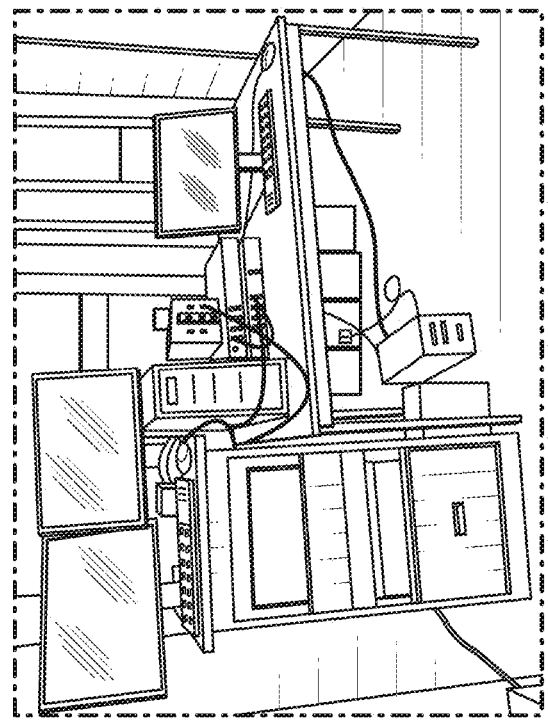

The burst test procedure was developed to ensure that relevant data and information could be gathered during the test. Photographs of the test facility are provided in FIG. 16. The burst test procedure for all the failed segments were conducted by Applicant, which includes the following:

Integrated images of Laser Mapping and VIC data
Assessment of VIC strain data
Identification of Cluster initiating rupture Burst Test Results All burst pipes failed by plastic collapse due to internal pressure. The burst pressures observed from the test are summarized in Table 3.6.

TABLE 3.11

Summary of Burst Test Results for the 2015 Test

| OD (NPS) | Sample No. | US GW | Burst Test No. | Actual Burst Pressure (kPa) |
|---|---|---|---|---|
| 30 | 30_1 | 16360 | 11 | 12307 |
| | 30_2 | 16370 | 13 | 14096 |
| | 30_3 | 16260 | 10 | 14775 |
| | 30_4 | 16100 | 12 | 12476 |
| | 30_5 | 16140 | 1 | 12262 |
| | 30_6 | 16320 | 9 | 12963 |
| 24 | 24_1 | 18080 | 15 | 14205 |
| | 24_2 | | 14 | 14374 |
| 16 | 16_1 | 1000 | 5 | 14603 |
| | 16_2 | | 2 | 13312 |
| | 16_3 | | 7 | 13521 |
| | 16_5 | 1200 | 6 | 11864 |
| | 16_6 | 580 | 3 | 12721 |
| | 16_7 | | 8 | 12837 |

TABLE 3.12

Summary of Burst Test Results for the 2018 Test

| OD (NPS) | Sample No. | US GW | Burst Test No. | Actual Burst Pressure (kPa) |
|---|---|---|---|---|
| 8 | 8_1 | NA | 1 | 19984 |
| | 8_2 | | 2 | 20178 |

TABLE 3.12-continued

Summary of Burst Test Results for the 2018 Test

| OD (NPS) | Sample No. | US GW | Burst Test No. | Actual Burst Pressure (kPa) |
|---|---|---|---|---|
| 12 | 12_1 | | 3 | 17505 |
| | 12_2 | | 4 | 17031 |
| 20 | 20_1 | | 7 | 21366 |
| | 20_2 | | 8 | 22080 |
| | 20_3 | 110960 | 9 | 10216 |
| 24 | 24_1 | NA | 6 | 20683 |
| | 24_2 | | 5 | 19853 |
| 30 | 30-1 | 20410 | 10 | 11110 |
| 34 | 34_1 | NA | 11 | 18493 |
| 36 | 36_1 | | 16 | 17609 |
| 42 | 42_1 | | 12 | 18609 |
| | 42_2 | | 13 | 17492 |
| 48 | 48_1 | | 14 | 11965 |
| | 48_2 | | 15 | 13424 |

Model Validation
Model Error for Real Corrosion Morphology

To validate the accuracy and precision of the described model, the burst test result of each pipe sample, which is the actual burst pressure, is compared with the corresponding predicted pressure. Note that the pressure is evaluated by both RSTRENG model and the Psqr method using the actual yield strength obtained from mechanical testing, actual wall thickness, outside diameter and metal-loss corrosion morphology measured by laser scan.

Figure 17:
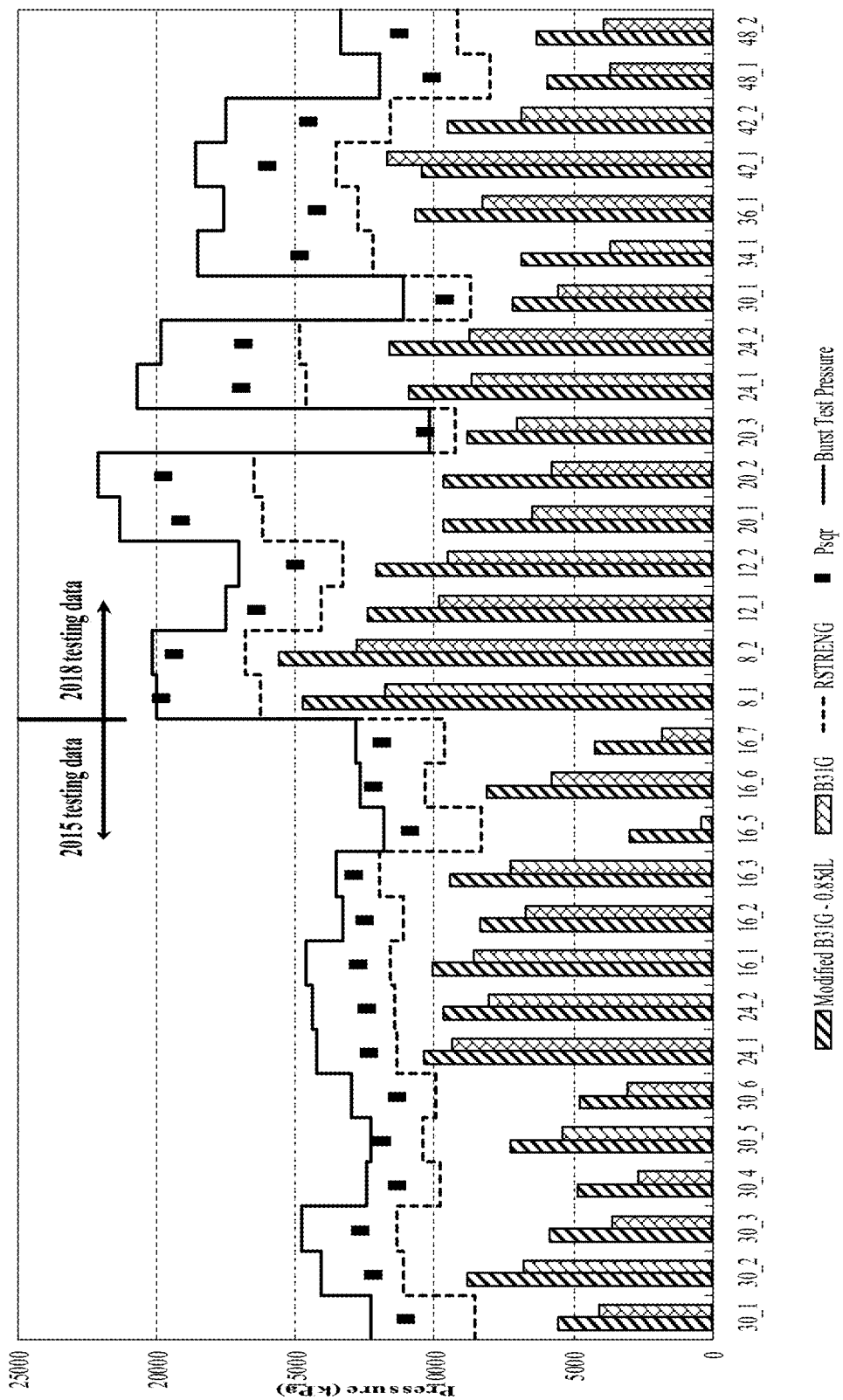
FIG. 17 is a bar graph comparing of the actual and predicted pressures for the 30 pipe samples, where the step curves represent the burst pressure observed from the test, and the RSTRENG-based pressure, respectively with each step indicating one pipe sample, according to some embodiments.

This isolates the uncertainties associated with the model (i.e. the so-called model error) by removing the uncertainties due to other parameters. FIG. 17 compares of the actual and predicted pressures for the 30 pipe samples, where the step curves represent the burst pressure observed from the test, and the RSTRENG-based pressure, respectively with each step indicating one pipe sample.

The dots represent the predicted pressures obtained from the new model. For comparison, the predicted pressure given by the B31G and Modified B31G-0.85dL methods are also shown in the same figure. As expected, both the B31G and Modified B31G-0.85dL methods provide over-conservative estimates of the burst pressure.

As shown in FIG. 17, the Psqr method provides more accurate results than the RSTRENG model with continued safety as the dots are much closer to but still lower than the burst pressure step curve compared to the RSTRENG-based pressure step curve.

The Psqr method is not only more accurate (i.e. lower bias) than the RSTRENG model, but it also has lower scatter than the RSTRENG model.

Figure 18:
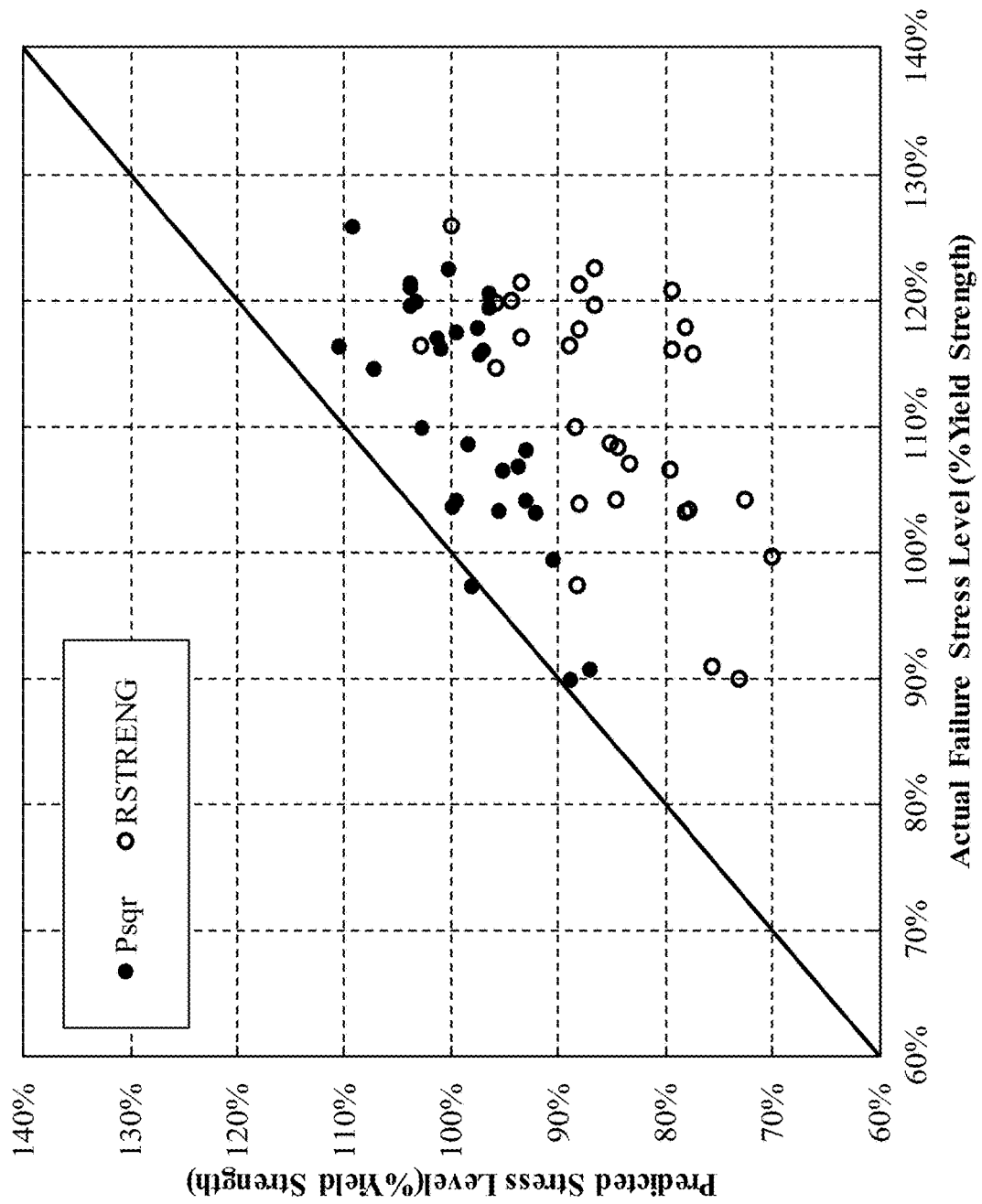
FIG. 18 is a unity plot showing that the plausible profiles method dots are closer to the unity line and spread more tightly than the RSTRENG dots, according to some embodiments.

This is clearly demonstrated by the unity plot shown in FIG. 18, where the plausible profiles method dots are closer to the unity line and spread more tightly than the RSTRENG dots.

To evaluate the model error, the ratio of the pressure obtained from the test to the pressure predicted by the assessment model (referred to as test-to-predicted pressure ratio) is used to quantify the model accuracy and uncertainty. Table 4.1 summarizes the test-to-predicted pressure ratio for the 30 pipe samples associated with the RSTRENG and Psqr models. For the 30 test samples, the mean and standard deviation of model error are 1.31 and 0.1, respectively, for the RSTRENG model, and 1.13 and 0.07, respectively, for the Psqr method.

TABLE 4.1

Summary of the probabilistic characteristics of model error based on the results of the 30 Tests

| Probabilistic characteristics | Model error | |
|---|---|---|
| | Psqr | RSTRENG |
| Mean | 1.13 | 1.31 |
| Standard Deviation | 0.07 | 0.10 |
| COV | 6.2% | 7.6% |
| Distribution Type | Weibull | Gumbel |

Sensitivity Analysis

The Psqr method involves an algorithm to generate a certain number of plausible profiles and then calculate the pressure. This algorithm introduced four control parameters including start point of generating plausible profile, interaction window, weighting factor (i.e. $\alpha$ and $\beta$ in Eq. 6) to define the PDF of likelihood of interaction, and number of plausible profiles.

Figure 19A:
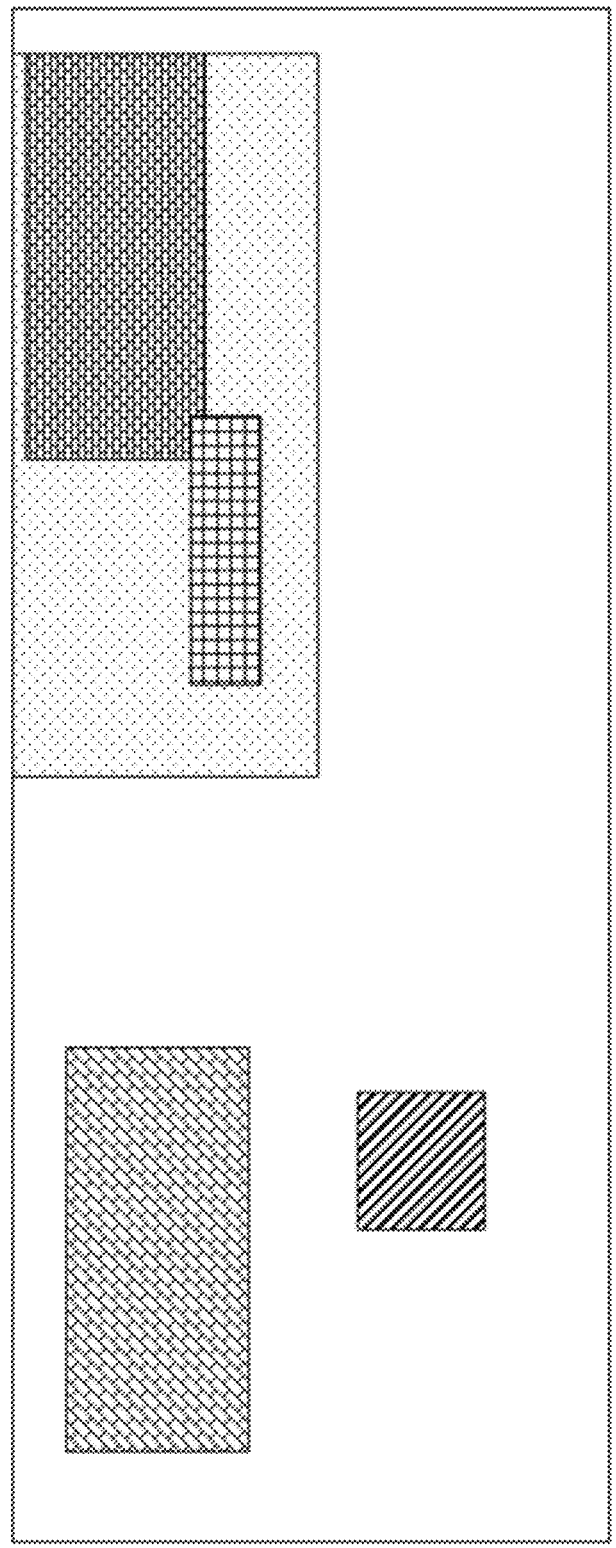
FIG. 19A is a visualization of a tool output, the shaded area shows a cluster that identified by the ILI tool involving five individual anomalies.
Figure 19B:
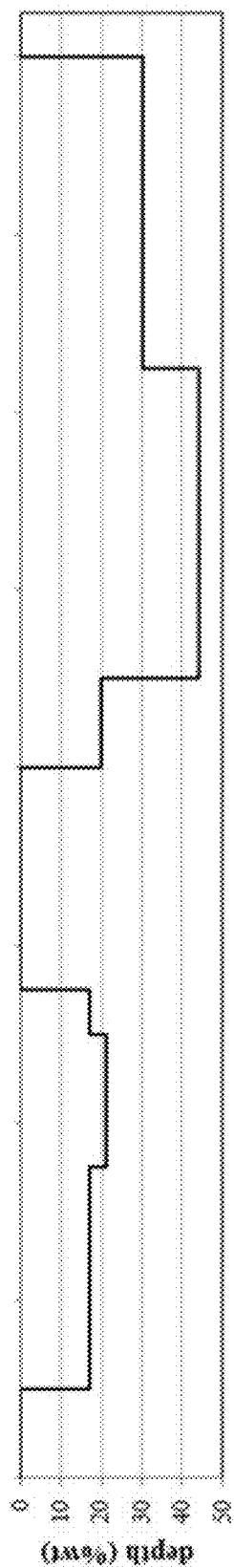
FIG. 19B is an example river bottom profile for this cluster, according to some embodiments.
Figure 19C:
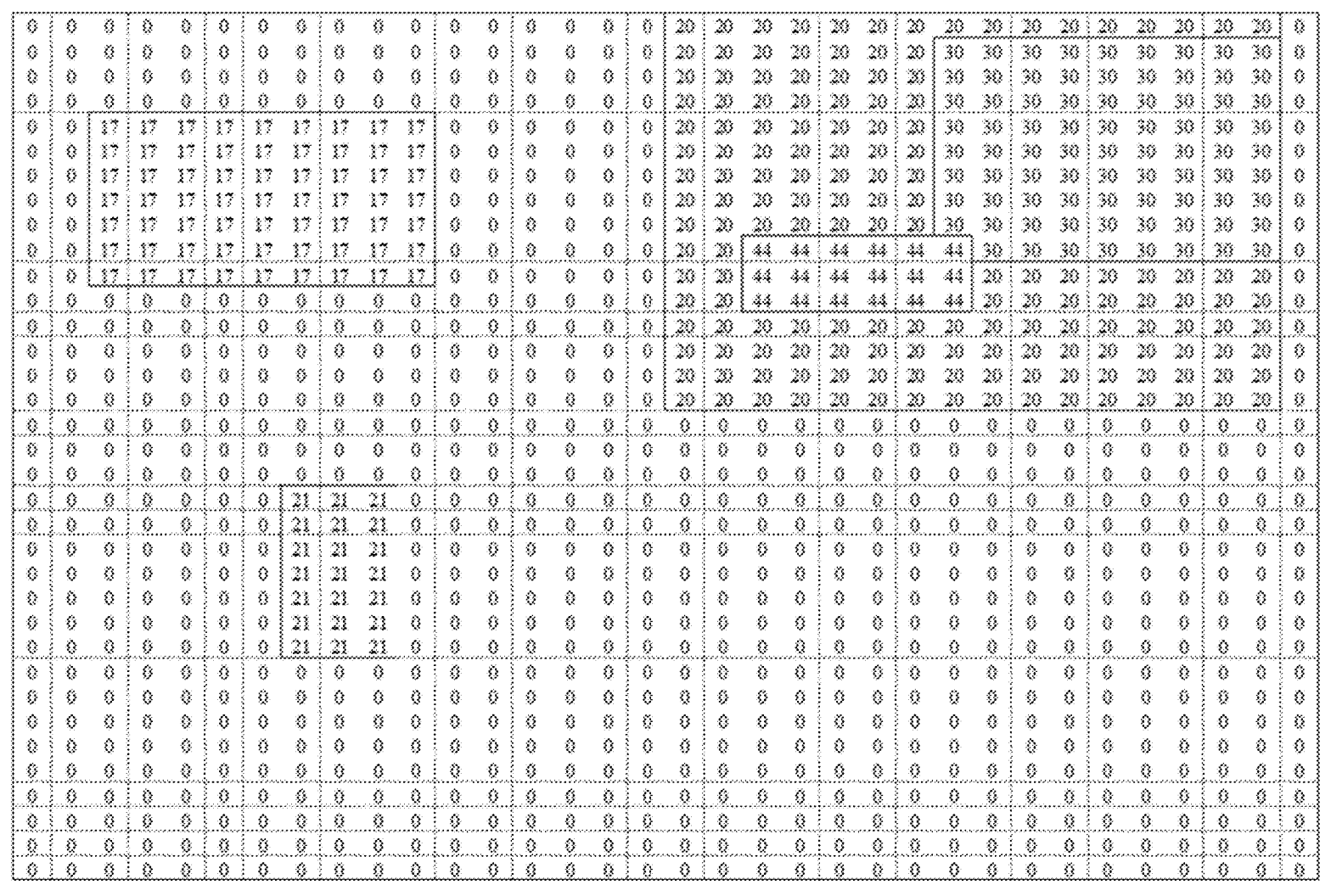

Furthermore, the use of the model to evaluate the pressure based on ILI data requires the entire cluster be output in a grid format. As shown in FIG. 19A, the shaded area shows a cluster that identified by the ILI tool involving five individual anomalies. The use of RSTRENG model to evaluate the burst pressure of this cluster requires the river bottom profile of this cluster, as shown in FIG. 19B. Applicant has developed a process to output the cluster in a higher granular format to meet the need of the Psqr method. FIG. 19C shows an example of the grids output of the cluster. Note that the size of grid is dependent on the resolution of technology and sizing algorithm. In this study, the grids of each cluster using 1×1 mm, 3×3 mm, and 5×5 mm (i.e. a square with length of 1, 3 or 5 mm) were exported. The smaller the grid, the longer the time required in the analysis. Therefore, a sensitivity analysis was performed to investigate the impact of grid size on the predicted burst pressure.

The sensitivity analyses were carried out based on the matrix given by Table 4.2, the results of which are described herein. The baseline of the analysis adopted in this study is also included in the same table. It should be noted that for a given set of sensitivity analyses, the approach only changes the input of this parameter with the input of other parameters remaining the same as the baseline analysis.

For example, the sensitivity analyses with respect to interaction length was performed by changing its value from t to 12t with start point, and the values of $\alpha$, $\beta$ and $N_p$ the same as the baseline analysis.

TABLE 4.2

Matrix of Sensitivity Analysis

| Parameter | Baseline | Values of Parametric Analysis |
|---|---|---|
| Start point | depth-weighted | Depth-weighted starting point, the deepest point within a cluster, the deepest points of the other local area within a cluster, and arbitrary point within a cluster |

TABLE 4.2-continued

Matrix of Sensitivity Analysis

| Parameter | Baseline | Values of Parametric Analysis |
|---|---|---|
| Interaction window width | 2 × 6t | 2 × (t, 2t, 3t, 4t, 5t, 6t, and 12t) |
| α and β | α = 0.1 and β = 0.9 | α = 0, 0.1, 0.2, 0.3, 0.4, 0.5, 0.6, 0.7, 0.8, 0.9, and 1.0 β = 1 − α |
| Number of profiles, $N_p$ | 500 | $N_p$ = 50, 100, 200, 300, 500, 1000, and 10000 |
| Grid size (ILI only) | 5 × 5 mm | 1 × 1 mm, 3 × 3 mm, and 5 × 5 mm |

Start Point

Figure 20:
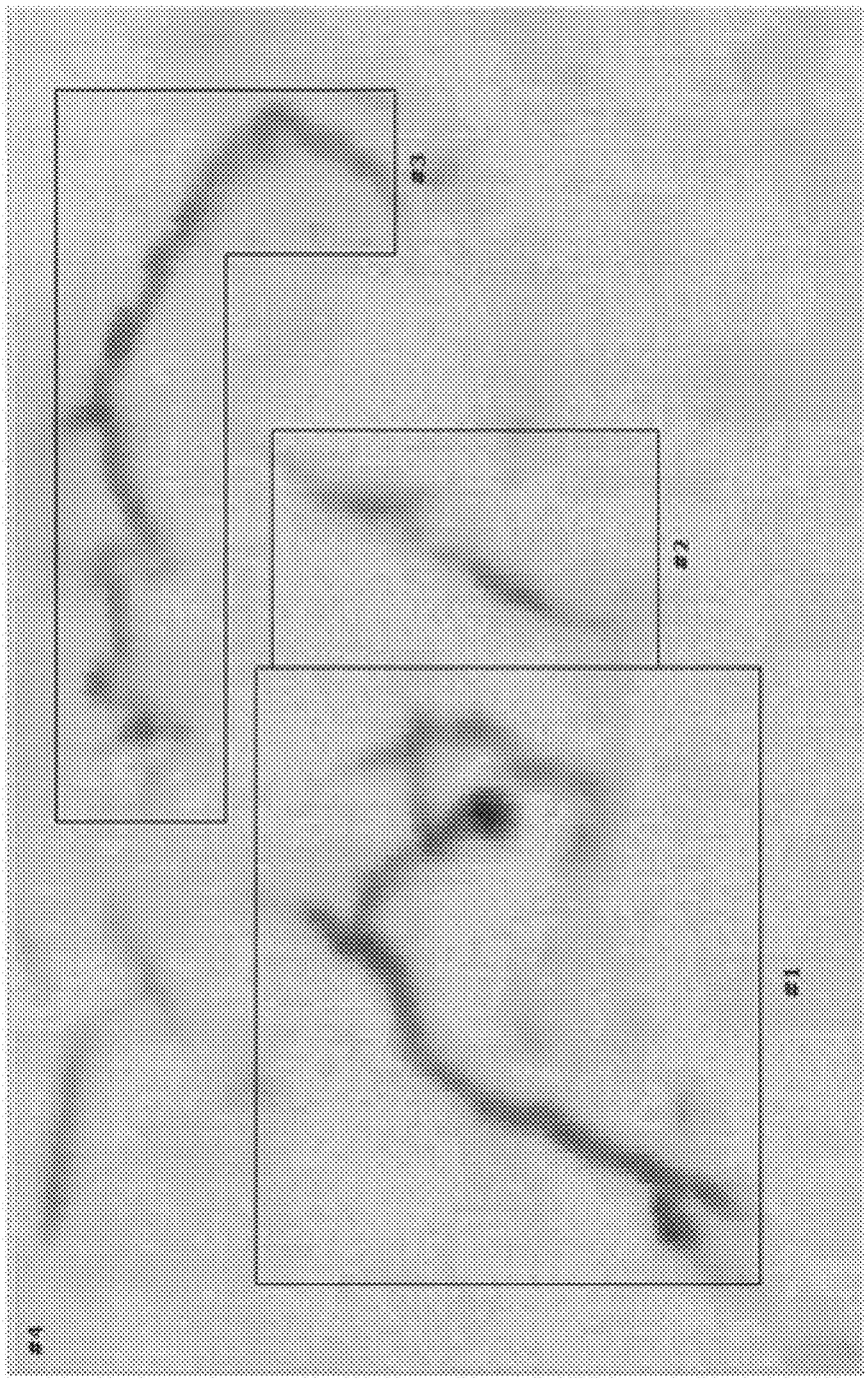
FIG. 20 is an example photograph of a feature, according to some embodiments.

Take the feature shown in FIG. 20 as an example, the start point of generating a plausible profile is varied by considering the following locations as start points:

The deepest point within the cluster (see the deepest point in Box #1)

The deepest point in the other areas within the cluster (see the deepest point in Boxes #2 and #3)

An arbitrary point within the cluster (see the top-left point #4)

Depth-weighted and profile-specific start point

Figure 21A:
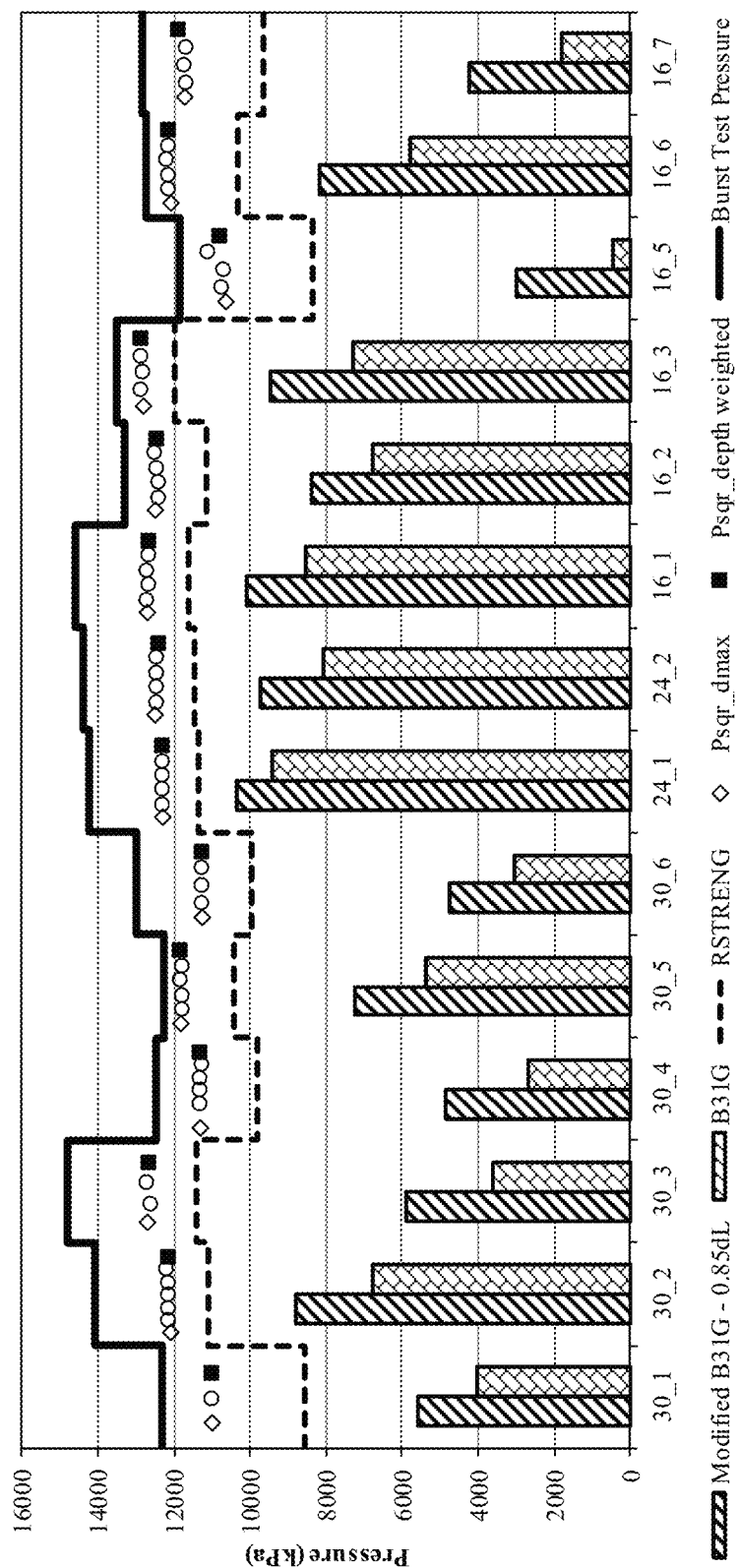
FIG. 21A is an example plot for the 2015 test, according to some embodiments.
Figure 21B:
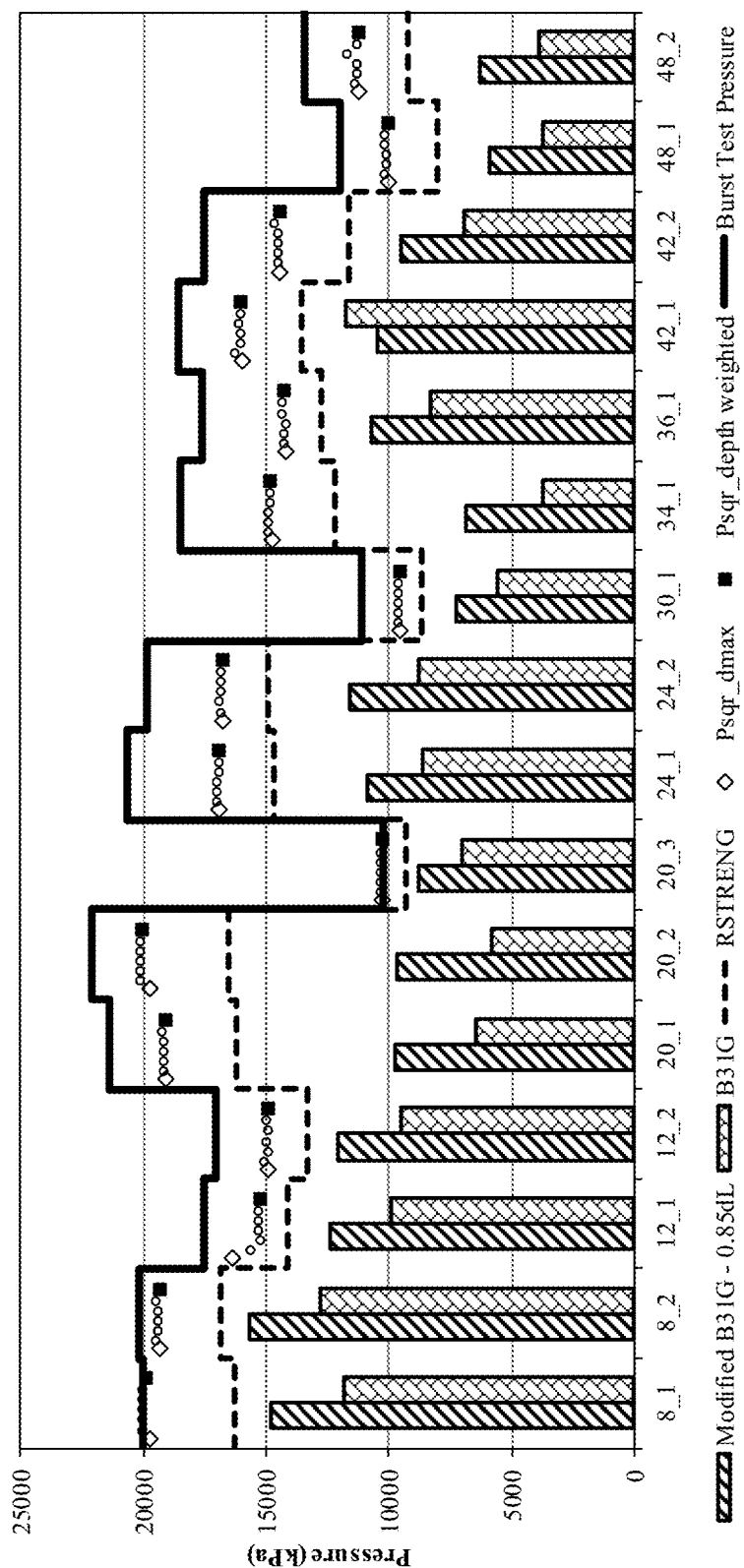
FIG. 21B is an example plot for the 2018 test, according to some embodiments.

For a given pipe sample, the pressures can be obtained from the Psqr model by using various start points, which are shown in FIG. 21A for the 2015 test and in FIG. 21B for the 2018 test, where the solid dot for a given pipe represents the result of baseline analysis (FIG. 22 and FIG. 23 follow the same convention) and the diamond represents the case with the deepest point as the start point. From the results shown in FIG. 21, it can be seen that selection of start point to generate a plausible profile has a negligible impact on the predicted pressure for the majority of corrosion morphologies. The start point has the largest impact on 12-1 pipe, which was intentionally designed to verify the start point. For 12-1 pipe, the pressure determined using the single start point is approximately 7% higher than that determined using the profile-specific start point. For the other pipes, the pressure difference is less than or equal to 1.5%. So the depth-weighted profile-specific start points are used in Psrq method.

Interaction Window Width

Figure 22A:
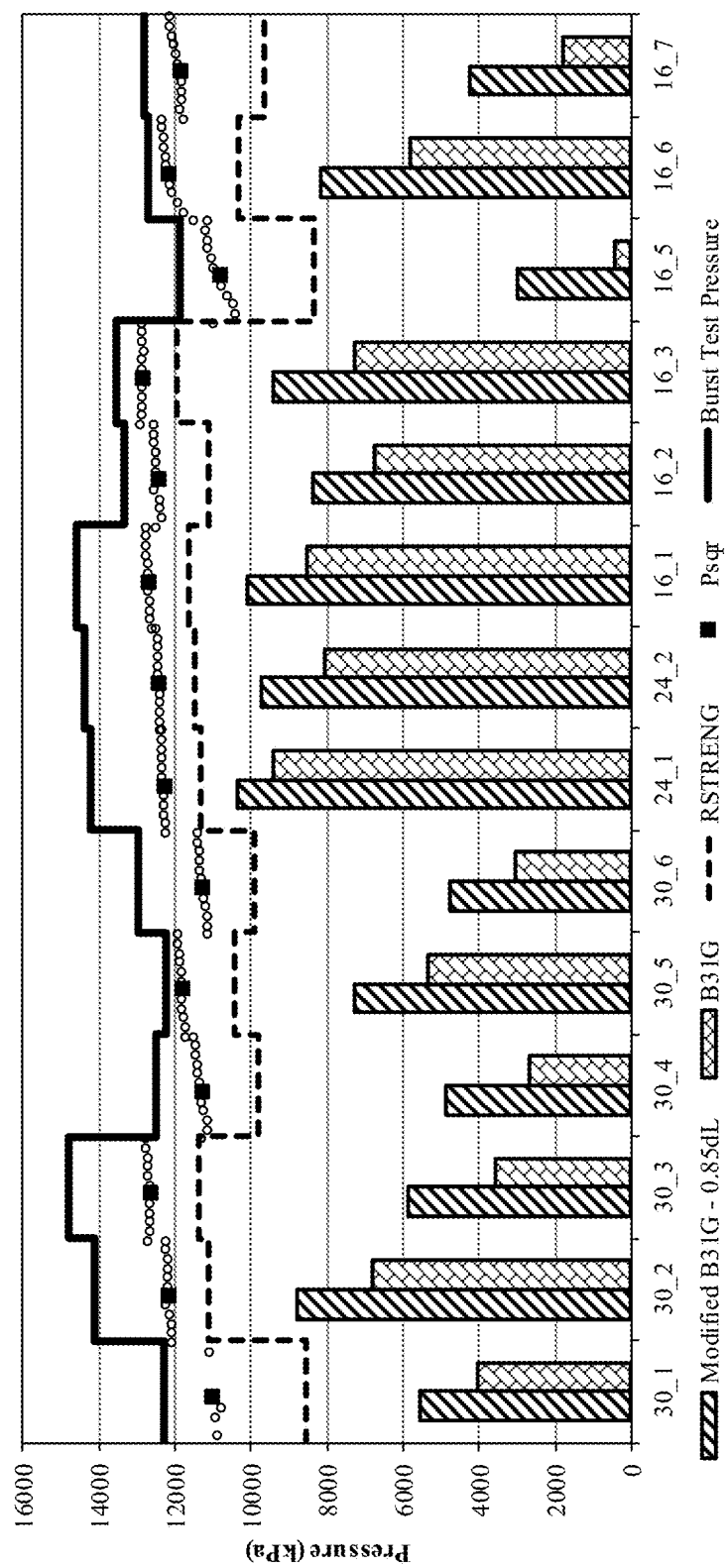
FIG. 22A is an example plot of pressures of a given pipe corresponding to different values of interaction window width for the 2015 test, according to some embodiments.
Figure 22B:
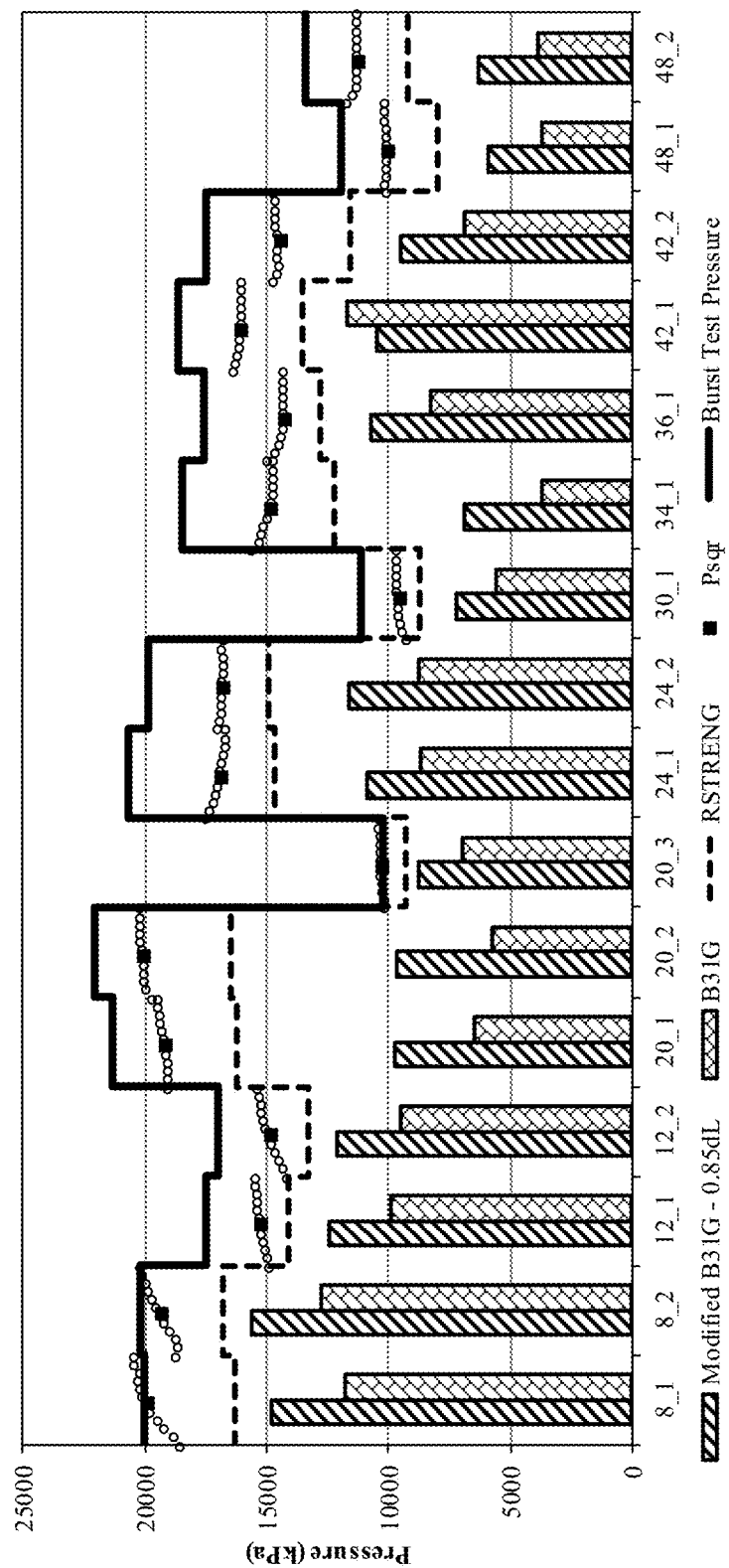
FIG. 22B is an example plot of pressures of a given pipe corresponding to different values of interaction window width for the 2018 test, according to some embodiments.

To investigate the impact of the interaction window width on the model prediction, a total of 12 cases are considered in terms of the value of interaction window width, i.e. half window width=λt, (λ=1, 2, . . . 12). The pressures of a given pipe corresponding to different values of interaction window width are shown in FIG. 22A for the 2015 test and in FIG. 22B for the 2018 test, which shows that the interaction window width in general has negligible impact on the predicted pressure.

For some morphologies when the interaction window is less than 2×6t the pressure calculated can be unstable as interacting features may not be considered. It is recommended to use 2×6t as the window width in this study. This implies that a length of 6t is considered at either side of the anchor point (i.e. the middle of window). The value of 6t provides a safe pressure and is consistent with the clustering rule used in the corrosion assessment. Note that the minimum value of window width is considered as 2×(1 inch), which is consistent with the clustering rule (i.e. 1 inch as opposed to 6t) for corrosion assessment on small-diameter and thin-wall pipe (say, wall thickness less than or equal to ⅙ inch=4.2 mm).

Weighting Factor

Figure 23A:
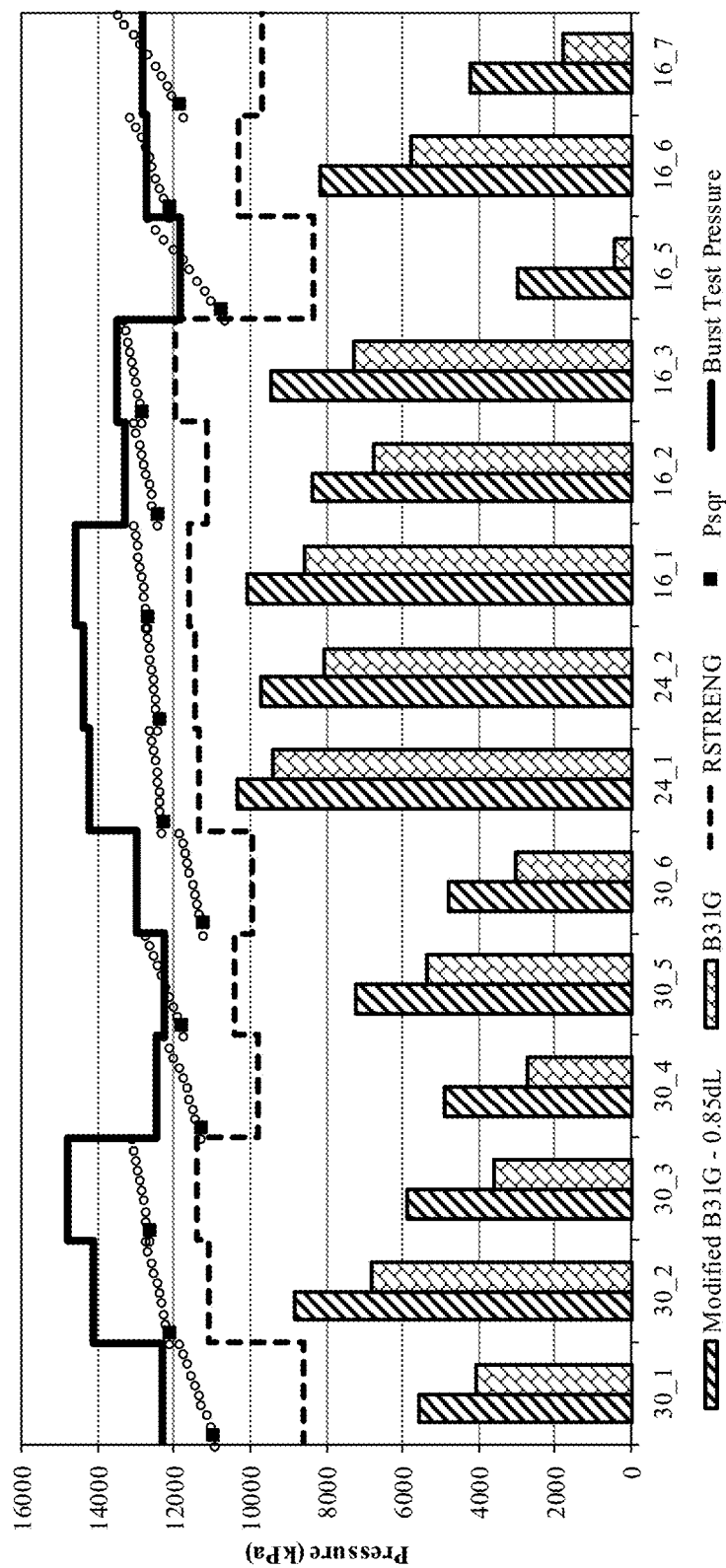
FIG. 23A is an example plot based on a pipe sample for the 2015 test, according to some embodiments.
Figure 23B:
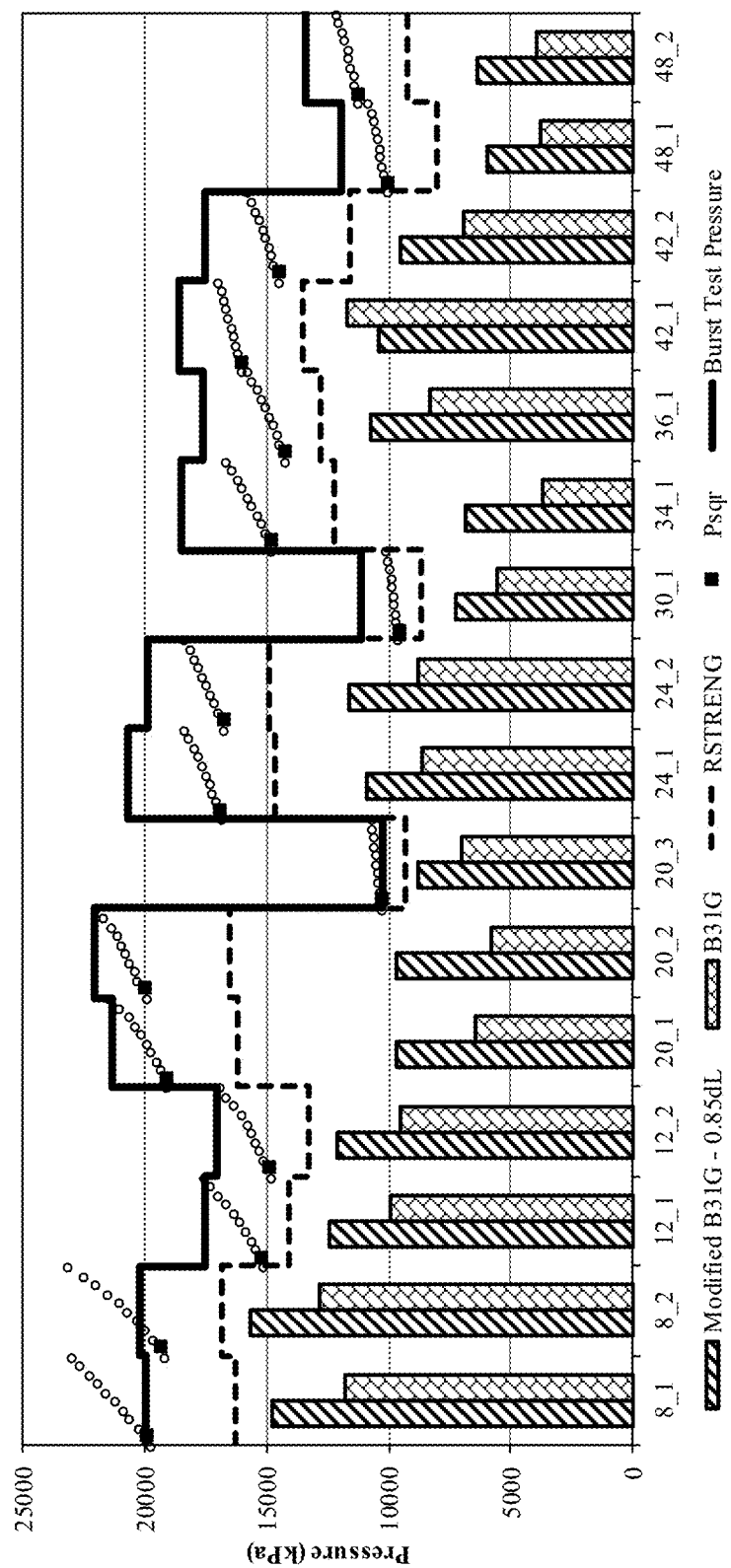
FIG. 23B is an example plot based on a pipe sample for the 2018 test, according to some embodiments.

Applicant considered eleven (11) pairs of α and β values to define the likelihood of interaction and investigated the sensitivity of model to both parameters. For given pipe samples as shown in FIG. 23A for the 2015 test and in FIG. 23B for the 2018 test. there are eleven data points which represents the pressure corresponding to α=0, 0.1, 0.2, . . . , 1, respectively.

It can be seen that the pressure increases as the value of a increases. This is because the plausible profile is dictated by the proximity with higher value of a. The proximity-dictated profile tends to capture the points in the vicinity as opposed to deeper point, and therefore leads to a higher predicted burst pressure. To ensure safety, it is recommended to use α=0.1 and β=0.9.

Number of Profiles

Figure 24A:
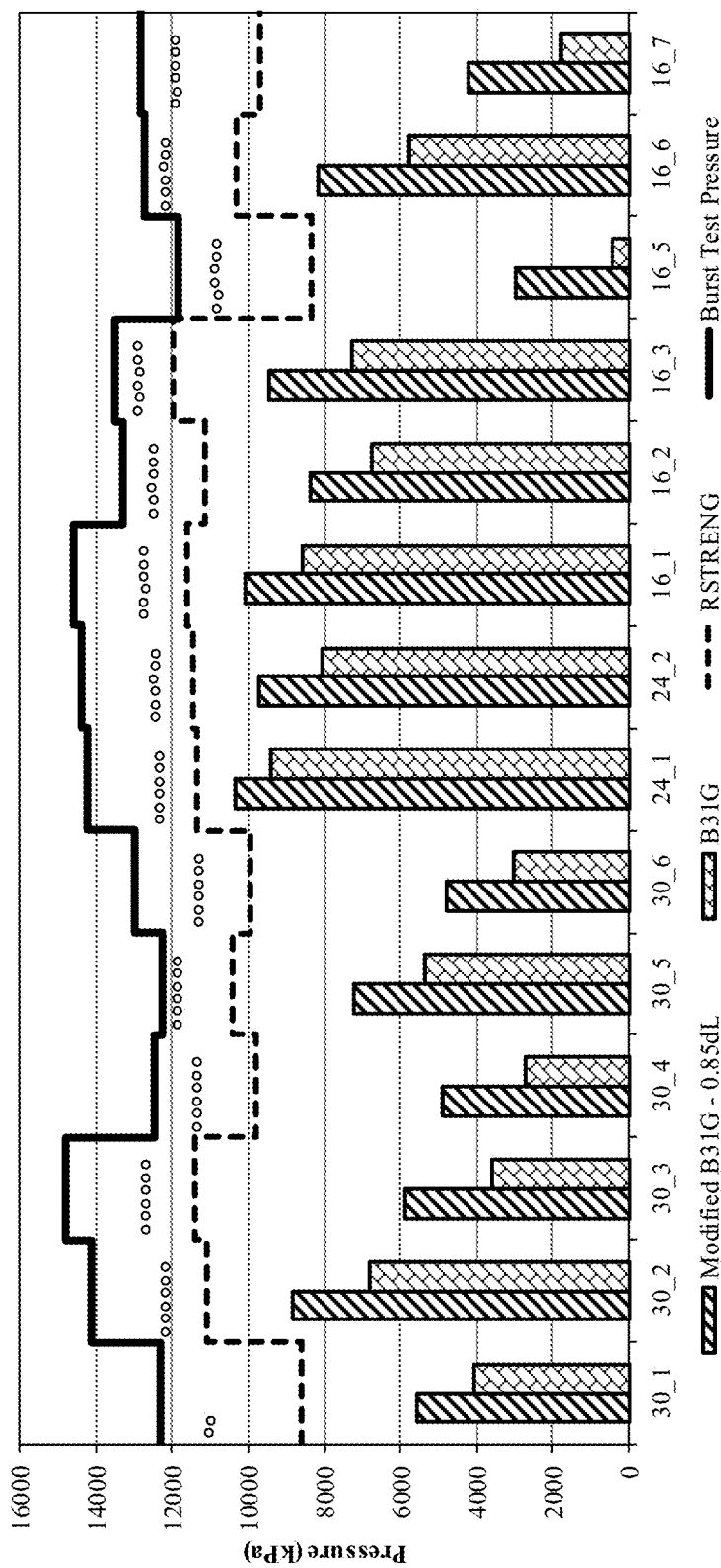
FIG. 24A is an example plot based on a pipe sample for the 2015 test, according to some embodiments.
Figure 24B:
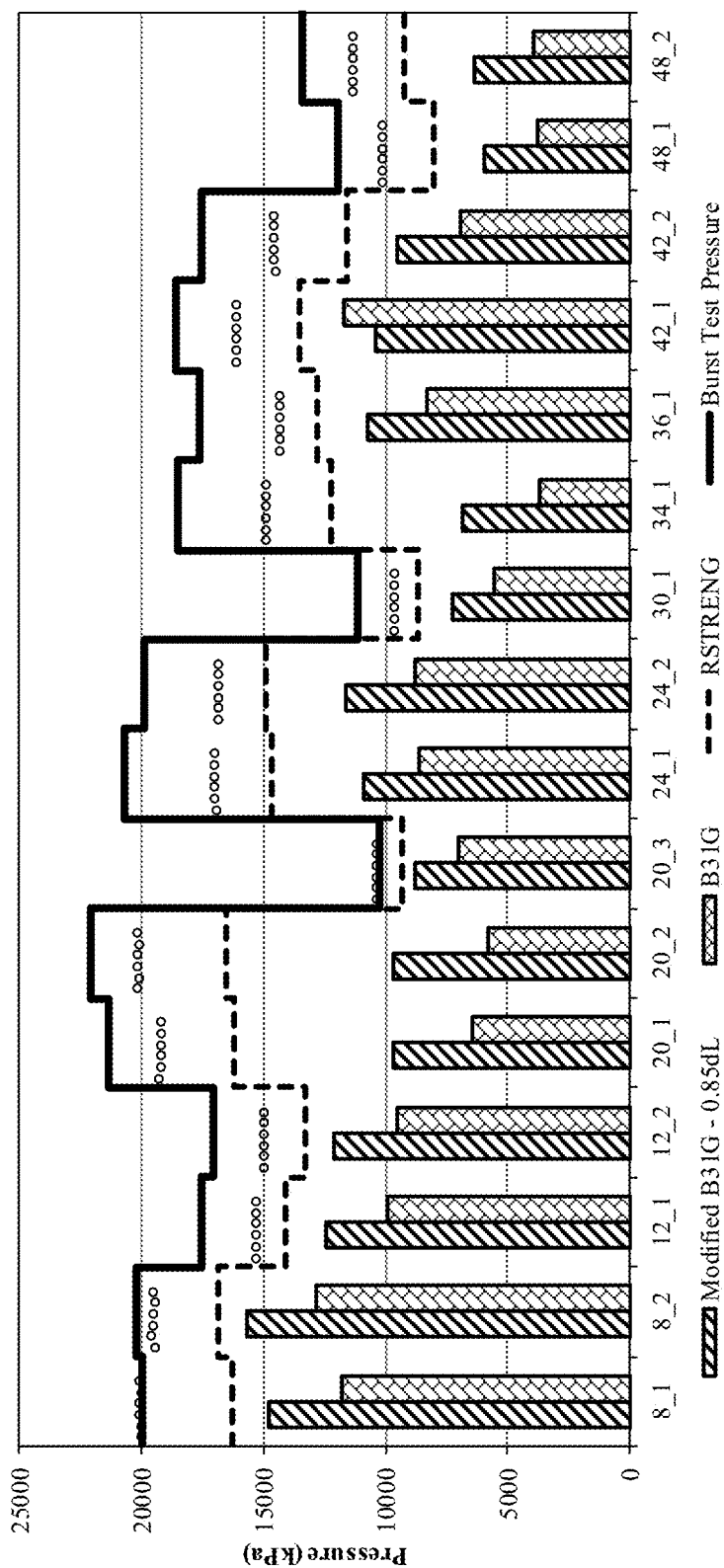
FIG. 24B is an example plot based on a pipe sample for the 2018 test, according to some embodiments, showing the pressure corresponding to each of the number is shown from the left to right.

To investigate the impact of number of profiles used to evaluate the burst pressure, seven different values of $N_p$ were considered in the analysis, i.e. $N_p$=50, 100, 200, 300, 500, 1000, and 10000. The pressure corresponding to each of the number is shown from the left to right in FIG. 24A for the 2015 test and in FIG. 24B for the 2018 test. As shown in FIGS. 24A and 24B, the value of $N_p$ has a negligible impact on the pressure calculation. However, as the required $N_p$ can be morphology dependent, in the model implementation, a case-specific minimum value of $N_p$ is determined by dynamically ensuring stable convergence of the predicted burst pressure (i.e. the $5^{th}$ percentile value of the pressure distribution as shown in FIG. 9).

Grid Size of ILI Output

Figure 25:
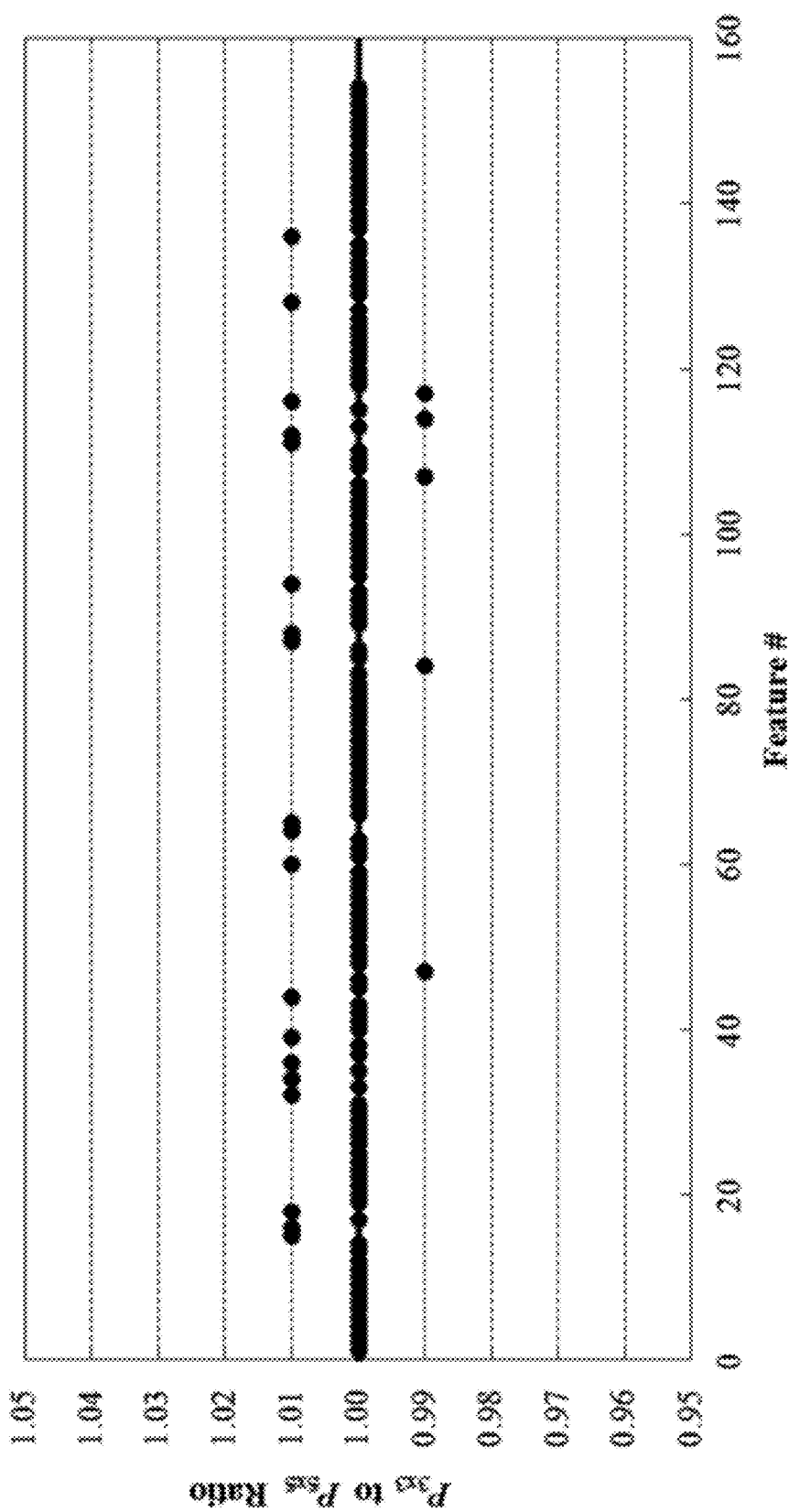
FIG. 25 is a plot showing the ratio of pressure corresponding to 3×3 to that corresponding to 5×5 for each of the 154 features.

The identified clusters were exported using three different grid sizes, i.e. 1×1 mm, 3×3 mm, and 5×5 mm. In this analysis, a total of 154 critical corrosion features that require immediate remediation actions (i.e. $RPR_{1.25}$≤1.0, $RPR_{1.25}$ defined as predicted burst pressure/MOP/1.25), which were used in the pilot study, were considered. The pressure of each feature corresponding to 3×3 and 5×5 grid data was evaluated using the Psqr method. The ratio of pressure corresponding to 3×3 to that corresponding to 5×5 for each of the 154 features is shown in FIG. 25. It can be seen that the pressures using the two different gird sizes are the same for the majority (over 85%) of the features. The maximum pressure difference is within 1% and finer grid does not always give a more conservative value. Therefore, it is adequate to use 5×5 grids in the analysis from an efficiency perspective.

Conclusions of the Sensitivity Analysis

The sensitivity analysis indicated that the model is not very sensitive to the start point, interaction window width, number of profiles and grid size of the ILI output, but is sensitive to the combination of weighting factor values (i.e. α and β values). To maintain safety, the following parameter values are recommended in the model based on sensitivity analysis:

Use the depth-weighted factor to choose the profile-specific start point to generate the plausible profiles;

the window width is considered as two times 6t (i.e. 12t) with minimum value of 2 inch to generate the plausible points on the plausible profile;

Use α=0.1 and β=0.9 to define the probability density function of likelihood of interaction;

A minimum number of plausible profiles should be dynamically defined to ensure the prediction converges to a stable value;

5×5 mm grid is adequate to be used for the ILI-based assessment considering efficiency of computation and assuring accuracy.

Shape Factor Analysis

Figure 26:
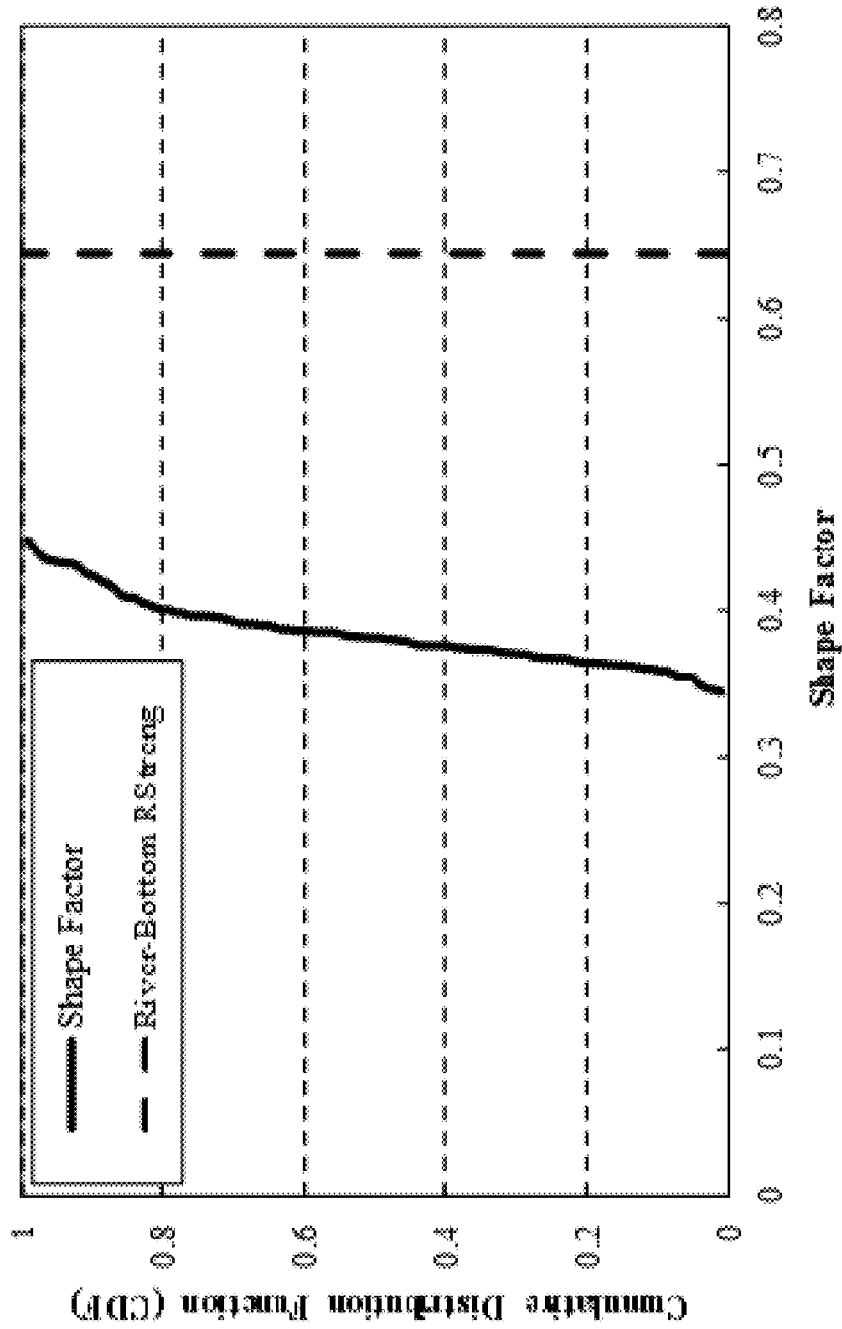
FIG. 26 depicts the cumulative density function (CDF) of the shape factor for Pipe Sample #24_1 tested in 2015, according to some embodiments.

The essence of the improvement is modifying the shape factor of the RSTRENG model. This section provides a comparison of the shape factors of the Psqr method and the RSTRENG method. FIG. 26 depicts the cumulative density function (CDF) of the shape factor for Pipe Sample #24_1 tested in 2015. The shape factor corresponding to RSTRENG, i.e. the short-dashed vertical line, is also shown in the same chart for comparison. As expected, the RSTRENG uses a higher value of shape factor than Psqr method, which leads to a more conservative estimate of burst pressure. Same observation was made from the comparison of the other pipe samples.

Validation of Start Point Refinement

Figure 27:
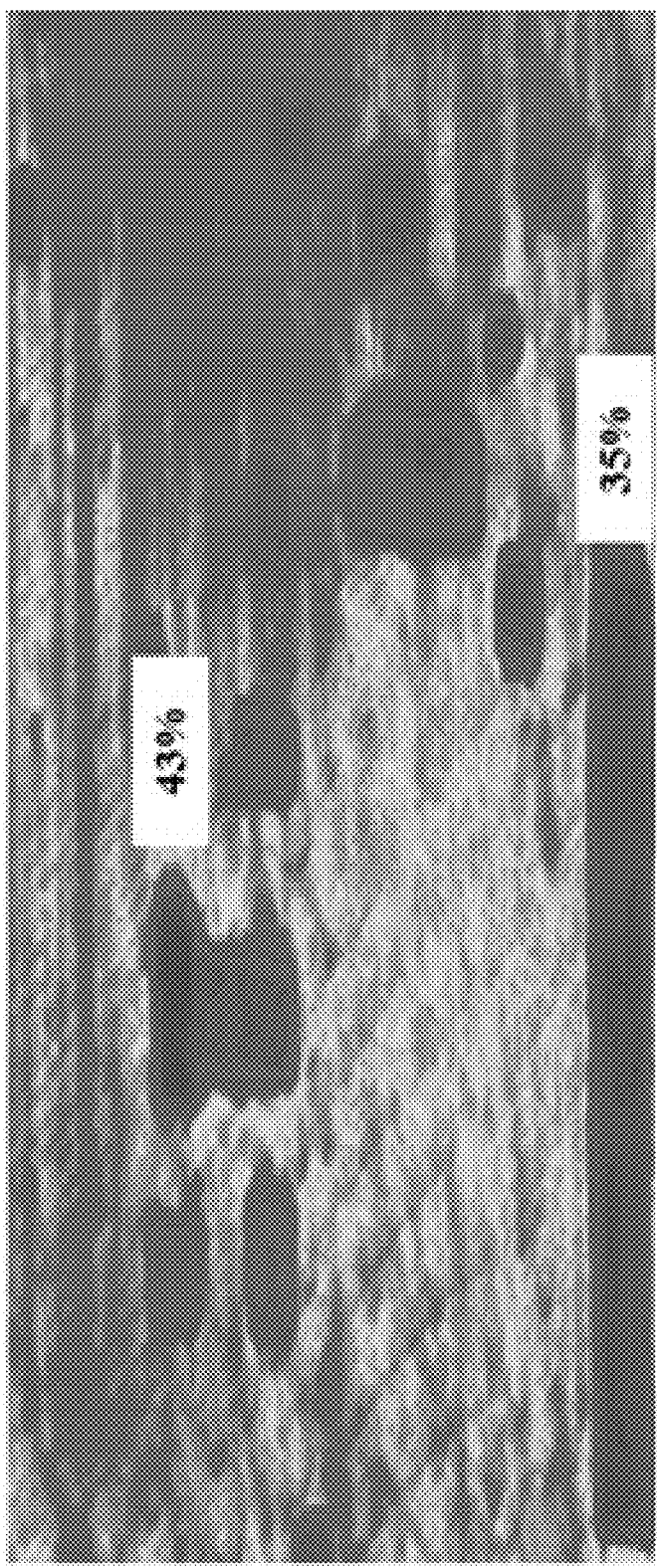
FIG. 27 is a plot showing corrosion morphology, according to some embodiments.
Figure 28A:
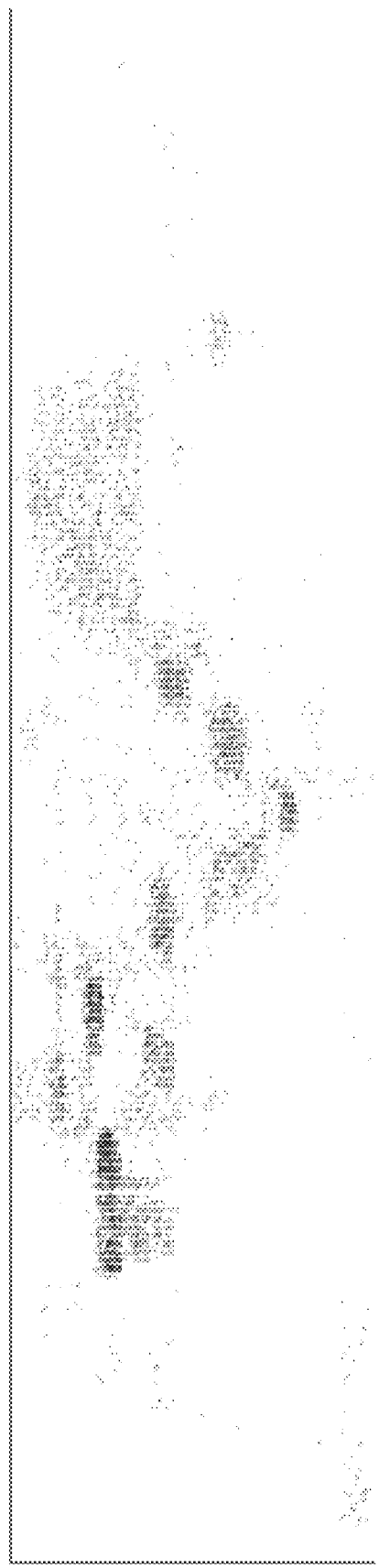
FIG. 28A is an example plot of plausible profiles over their respective effective length with the deepest point as the starting point, according to some embodiments.
Figure 28B:
Figure 29:
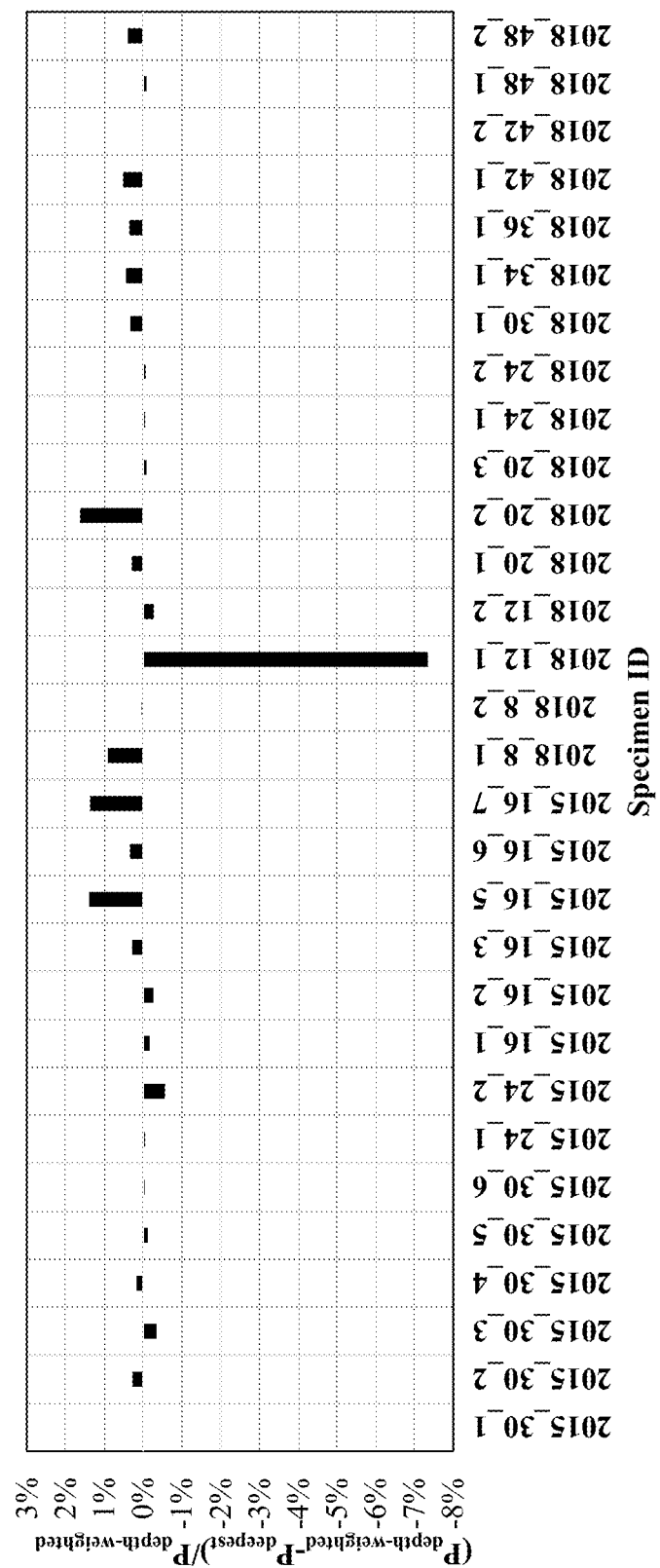
FIG. 29 is a plot showing differences between the methodologies, according to some embodiments.

The start point was refined to be profile-specific considering depth-weighted factor. To validate this assumption, a corrosion morphology was intentionally designed and fabricated on a pipe sample (sample ID:12-1) and tested in 2018. The corrosion morphology is depicted in FIG. 27. The pipe ruptured along the long corrosion anomaly with maximum depth of 35%. The plausible profiles over their respective effective length are shown in FIG. 28A with the deepest point as the starting point, and in FIG. 28B, where the starting point was determined based on the depth-weighted factor and is specific to each plausible profile. Comparison of the two images shown in FIG. 28A and FIG. 28B markedly demonstrates that the use of profile-specific starting point allows multiple plausible profiles to effectively translate the information of the entire corrosion area to the burst pressure and reflect the actual failure. It should be noted that the impact of start point is morphology-dependent and minimal (51.5%) for the majority of the tested pipe samples, see FIG. 29.

Model Validation Using Data from PRCI

To further validate the Psqr model, the testing data reported in the PRCI research (Kiefner et al. 1996) were also reviewed and analyzed. The analysis results demonstrated that the Psqr model is safe.

FIGS. 41A, 41B, 41C, FIGS. 42A, 42B, 42C, 42D, 42E, 42F, 42G, 42H, FIGS. 43A, 43B, 43C, 43D, 43E are illustrations showing a total of 16 machined metal-loss features were used in the analysis, as shown in Table 4.3. The pipe properties together with the corresponding burst pressure observed from the burst test are summarized in Table 4.4.

TABLE 4.3

Table of Morphology and Dimension

Figure 41A:
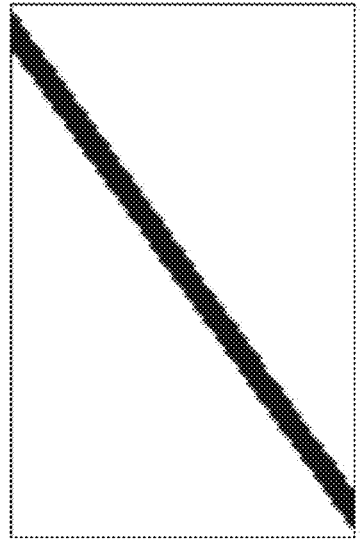
Figure 41B:
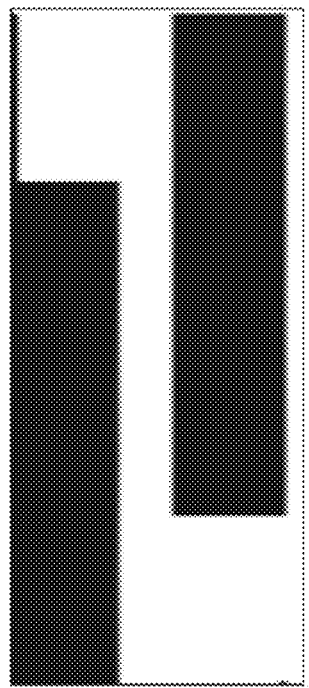
Figure 41C:
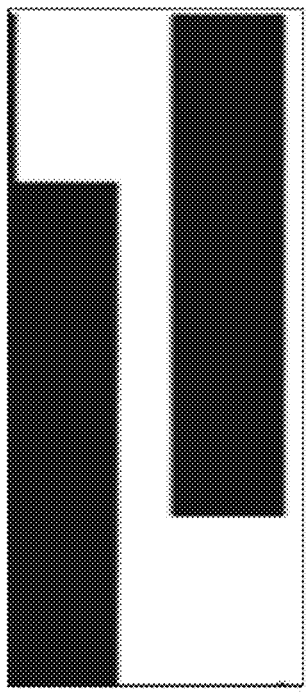
Figure 42D:
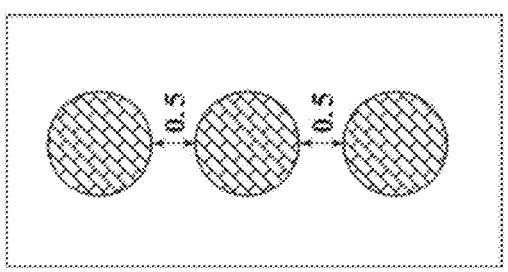
Figure 42C:
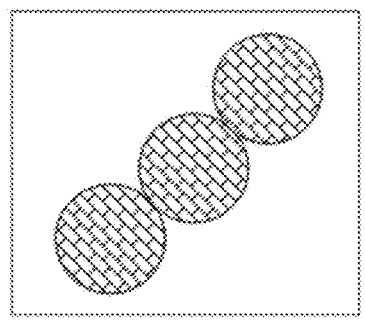
Figure 42F:
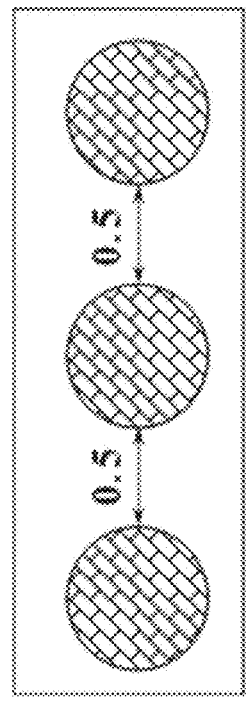
Figure 42H:
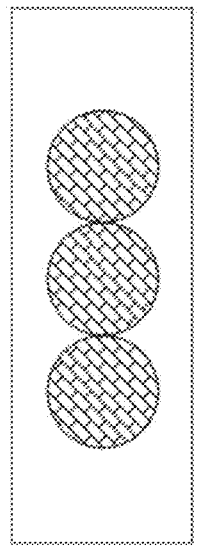
Figure 42B:
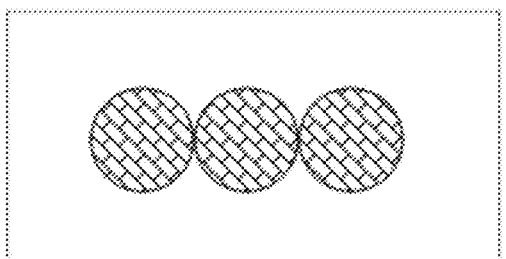
Figure 42A:
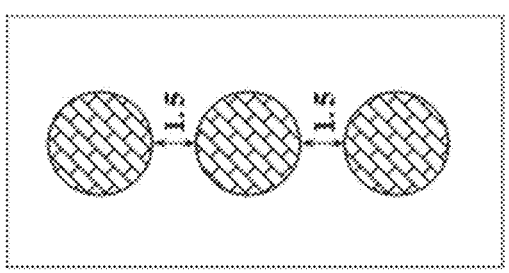
Figure 42E:
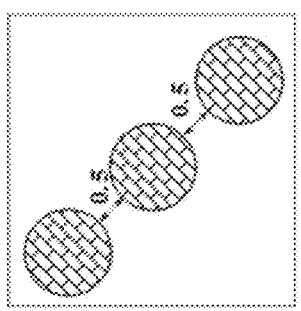
Figure 42G:
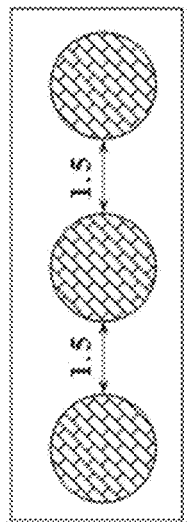
Figure 43A:
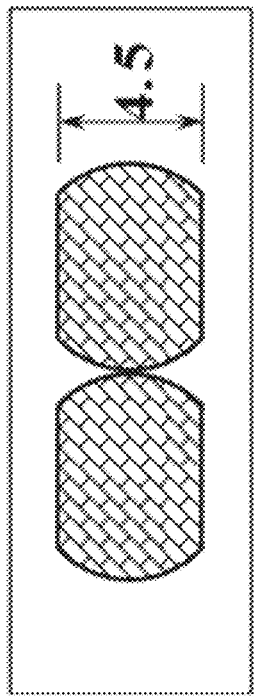

| Index | Morphology | Maximum Depth (% wt) | Maximum Length (mm) | Description |
|---|---|---|---|---|
| 94 | FIG. 41A | 40 | 402 | 30 inch long slot spirally oriented at 30 degree angle from circumferential direction |
| 103 | FIG. 41B | 40 | 508 | Two 15-inch axially oriented grooves circumferentially separated by 2t and overlapping axially to give a projected length of 20-inch |
| 104 | FIG. 41C | 40 | 508 | Two 15-inch axially oriented grooves circumferentially separated by 4t and overlapping axially to give a projected length of 20-inch |
| 134 | FIG. 42A | 60 | 39 | 3 cylindrical pits of 1.5 inch diameter and 60% wt deep separated circumferentially by 1.5 inch |
| 136 | FIG. 42B | 60 | 39 | 3 cylindrical pits of 1.5 inch diameter and 60% wt deep circumferentially touching one another |
| 137 | FIG. 42C | 60 | 93 | 3 cylindrical pits of 1.5 inch diameter and 60% wt deep diagonally touching one another |
| 138 | FIG. 42D | 60 | 39 | 3 cylindrical pits of 1.5 inch diameter and 60% wt deep separated circumferentially by 0.5 inch |
| 139 | FIG. 42E | 60 | 107 | 3 cylindrical pits of 1.5 inch diameter and 60% wt deep located diagonally and separated by 0.5 inch |
| 140 | FIG. 42F | 60 | 142 | 3 cylindrical pits of 1.5 inch diameter and 60% wt deep arrayed axially and separated by 0.5 inch |
| 141 | FIG. 42G | 60 | 193 | 3 cylindrical pits of 1.5 inch diameter and 60% wt deep arrayed axially and separated by 1.5 inch |
| 142 | FIG. 42H | 60 | 119 | 3 cylindrical pits of 1.5 inch diameter and 60% wt deep arrayed axially and touching each other |
| 143 | FIG. 43A | 40 | 342 | Two patches of 6-inch long, 4.5-inch wide and 40% wt maximum depth axially separated by 1.5 inch |

TABLE 4.3-continued

Table of Morphology and Dimension

Figure 43B:
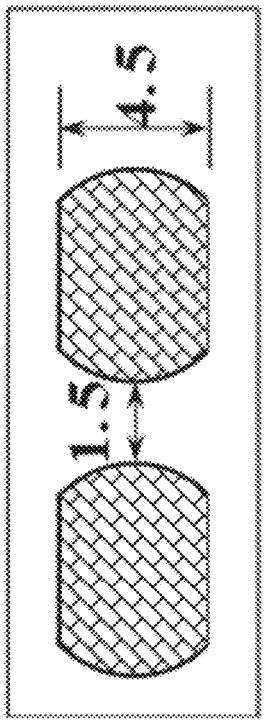
Figure 43C:
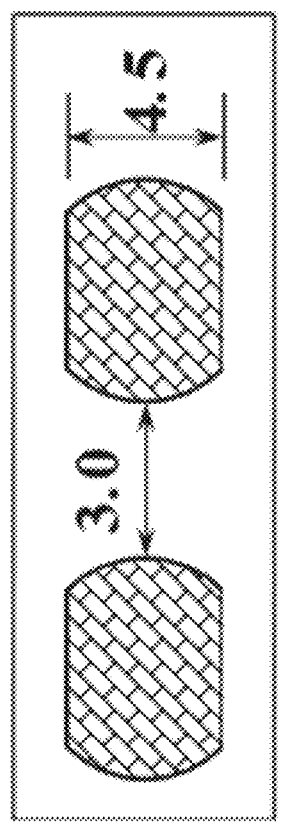
Figure 43E:
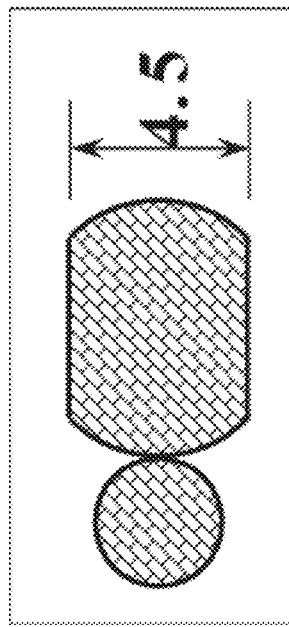
Figure 43D:
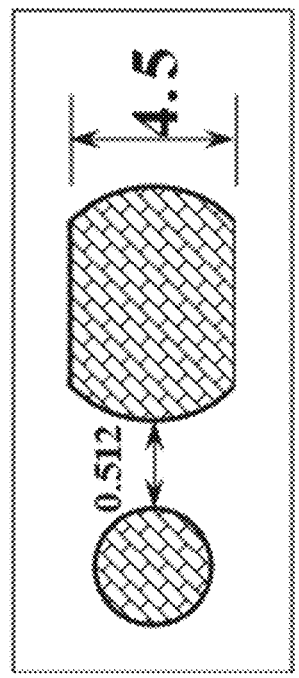

| Index | Morphology | Maximum Depth (% wt) | Maximum Length (mm) | Description |
|---|---|---|---|---|
| 144 | FIG. 43B | 40 | 305 | Two patches of 6-inch long, 4.5-inch wide and 40% wt maximum depth axially touching each other |
| 145 | FIG. 43C | 40 | 380 | Two patches of 6-inch long, 4.5-inch wide and 40% wt maximum depth axially separated by 3 inch |
| 150 | FIG. 43D | 60 | 204 | One cylindrical pit of 1.5 inch diameter and 60% wt deep, and one patch of 6-inch long, 4.5-inch wide and 40% wt maximum depth axially separated by 0.5 inch |
| 151 | FIG. 43E | 60 | 192 | One cylindrical pit of 1.5 inch diameter and 60% wt deep, and one patch of 6-inch long, 4.5-inch wide and 40% wt maximum depth axially touching each other |

TABLE 4.4

Table of Pipe Properties and Burst Pressure

| Index | OD (mm) | Grade (MPa) | Wall Thickness (mm) | Actual Yield Strength (MPa) | RSTRENG Predicted Failure Pressure (kPa) |
|---|---|---|---|---|---|
| 94 | 508 | 414 | 6.76 | 456 | 9154 |
| 103 | 508 | 414 | 6.68 | 445 | 8686 |
| 104 | 508 | 414 | 6.45 | 427 | 8076 |
| 134 | 610 | 359 | 12.34 | 447 | 19232 |
| 136 | 610 | 359 | 12.34 | 447 | 19232 |
| 137 | 609.6 | 359 | 12.34 | 447 | 15433 |
| 138 | 609.6 | 359 | 12.34 | 447 | 19244 |
| 139 | 609.6 | 359 | 12.34 | 447 | 14677 |
| 140 | 609.6 | 359 | 12.34 | 447 | 15179 |
| 141 | 609.6 | 359 | 12.34 | 447 | 16255 |
| 142 | 609.6 | 359 | 12.34 | 447 | 14308 |
| 143 | 609.6 | 359 | 12.34 | 447 | 15192 |
| 144 | 609.6 | 359 | 12.34 | 447 | 14605 |
| 145 | 609.6 | 359 | 12.34 | 447 | 15683 |
| 150 | 609.6 | 359 | 12.34 | 447 | 15305 |
| 151 | 609.6 | 359 | 12.34 | 447 | 15045 |

Figure 30:
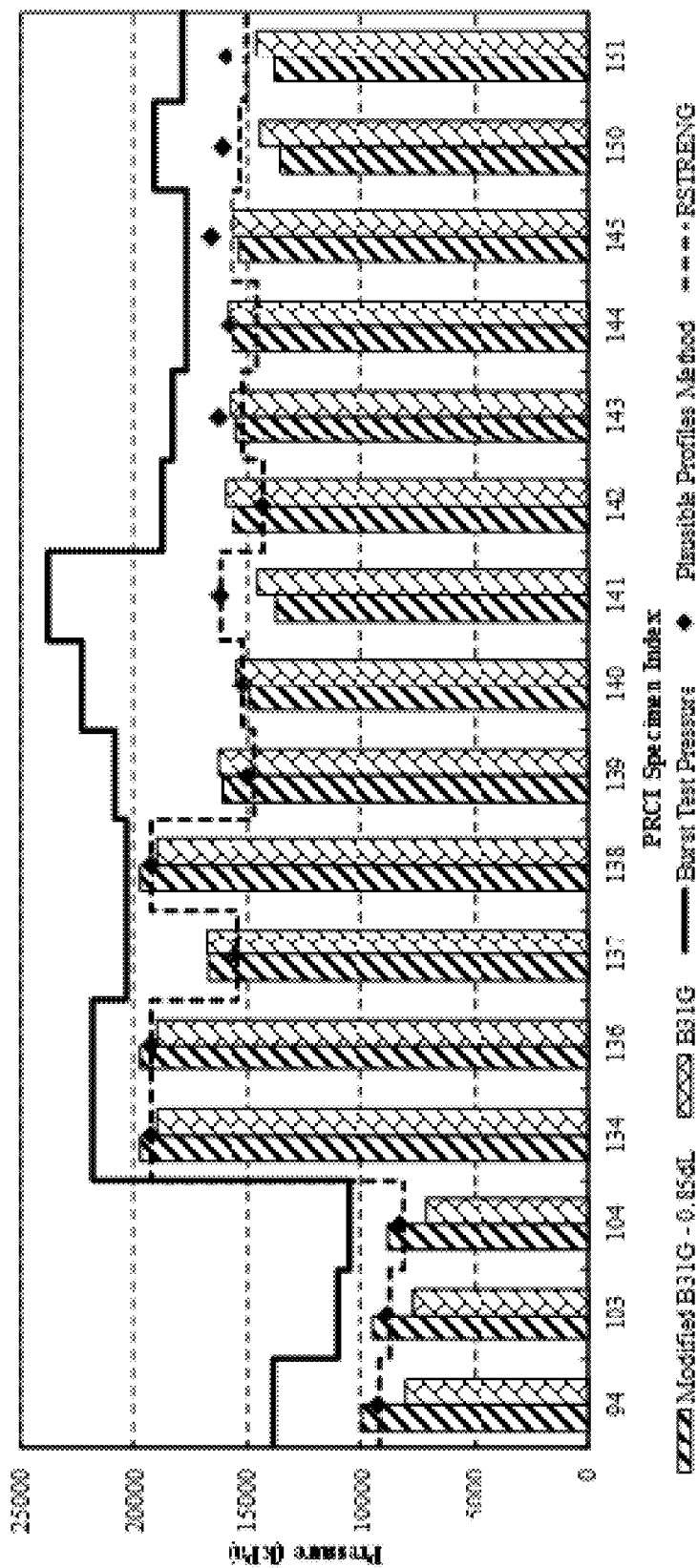
FIG. 30 is a plot of actual burst pressure, according to some embodiments.

The comparison of the burst pressures corresponding to the RSTRENG and Psqr model with the actual burst pressure is shown in FIG. 30. For comparison, the burst pressures corresponding to B31G and Modified B31G are also included in the chart. As shown in FIG. 30, the Psqr method provides same or similar results as the RSTRENG model for Pipes #94 through #142, which is expected because those features consist of one or two flat-bottom slots or three flat-bottom pits. For Pipes #143 through #151, the pressure given by the Psqr method on average is approximately 7% higher than that given by the RSTRENG model. The results of the 16 tests shown in FIG. 30 demonstrate that Psqr method is identical to or less conservative than RSTRENG model, and always safe.

It can also be seen that Modified B31G is less conservative than RSTRENG particularly for the flat-bottom features, which makes sense because the former model uses 0.85 times length and depth to calculate the metal loss area. This analysis also shows that the model error is highly morphology dependent. Consequently, the machined metal-loss features that do not represent actual corrosion morphologies are used to validate the safety of the model but are not used to derive the model error.

Pilot Study

To demonstrate the impact of the Psqr method on corrosion assessment decisions, a pilot study was carried out in this report. Two sets of data were analyzed in this pilot study:

170 features with field measurements 154 critical corrosion features reported by ILI tool that require immediate remediation actions The information of the features and results of analysis are described in the following sections.

Field Measurement-based Assessment

A total of 170 ILI-reported features in Applicant's pipeline systems that were excavated were collected for this pilot study. Those features are from 27 different pipelines. The associated pipe attributes are summarized in Table 5.1.

TABLE 5.1

Summary of Pipelines Attributes with the Excavated Features

| OD (mm) | WT (mm) | SMYS (MPa) | Number of Features |
|---|---|---|---|
| 356 | 5.33 | 359 | 1 |
| 406 | 5.88 | 359 | 3 |
|  | 5.99 | 359 | 14 |
| 457 | 5.56 | 414 | 1 |
| 508 | 5.56 | 359 | 10 |
|  | 6.35 | 359 | 1 |
|  |  | 414 | 9 |
| 610 | 6.6 | 414 | 1 |
|  | 6.68 | 483 | 92 |
| 762 | 8.3 | 483 | 1 |
|  | 8.34 | 483 | 18 |
|  | 9.53 | 359 | 2 |
| 864 | 9.53 | 359 | 1 |
| 914 | 8.08 | 448 | 1 |
|  | 9.14 | 448 | 5 |
| 1067 | 9.42 | 448 | 1 |
|  | 10.27 | 448 | 9 |

Figure 31:
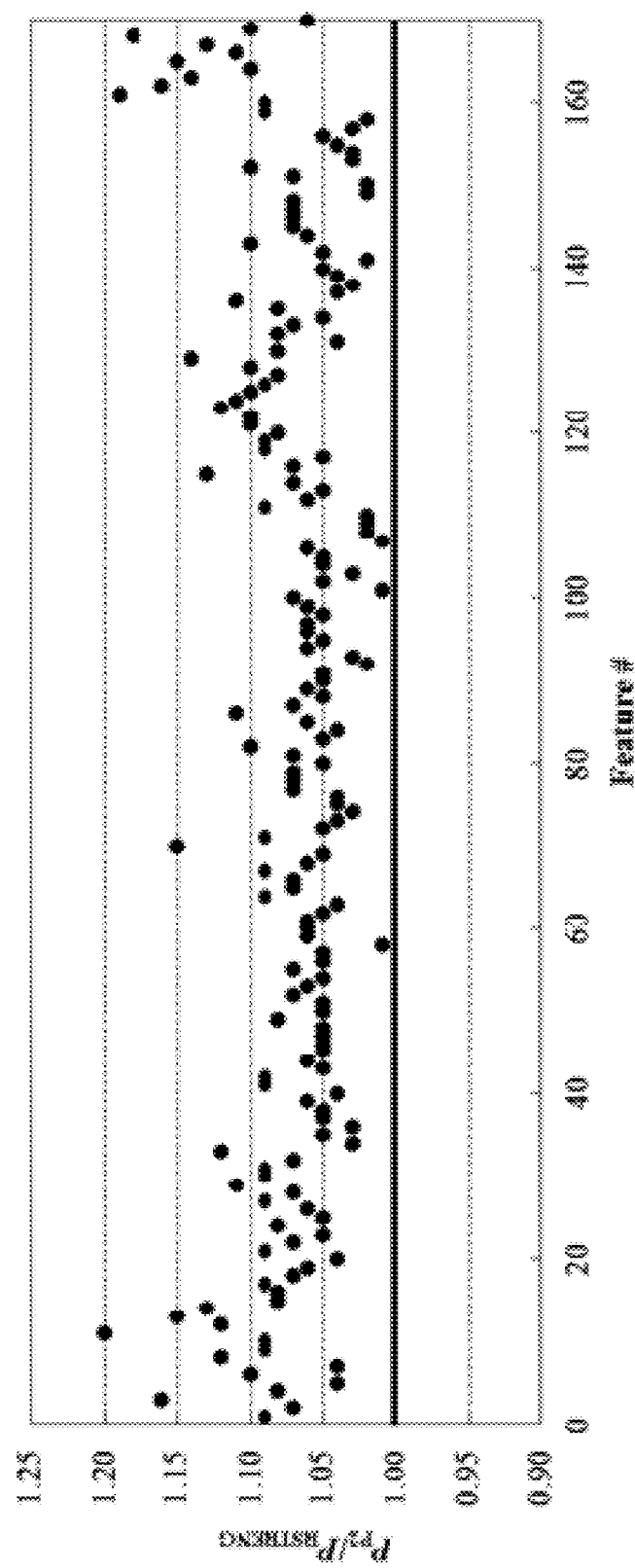
FIG. 31 is a plot of Pp2/PStreng, organized by feature #, according to some embodiments.

To compare the pressure corresponding to Psqr method and RSTRENG, the ratios of Psqr-based pressure to the RSTRENG-based pressure for the 170 features are shown in FIG. 31. It can be seen from FIG. 31 that the Psqr method provides approximately one to twenty percent higher pressure than RSTRENG; that is, the Psqr method is less conservative than the RSTRENG model. It should be noted that the level of conservatism reduction varies depending on the corrosion morphology. Based on the results of the 170 features, the average and standard deviation of the ratio is approximately 1.07 and 0.035, respectively.

Figure 32:
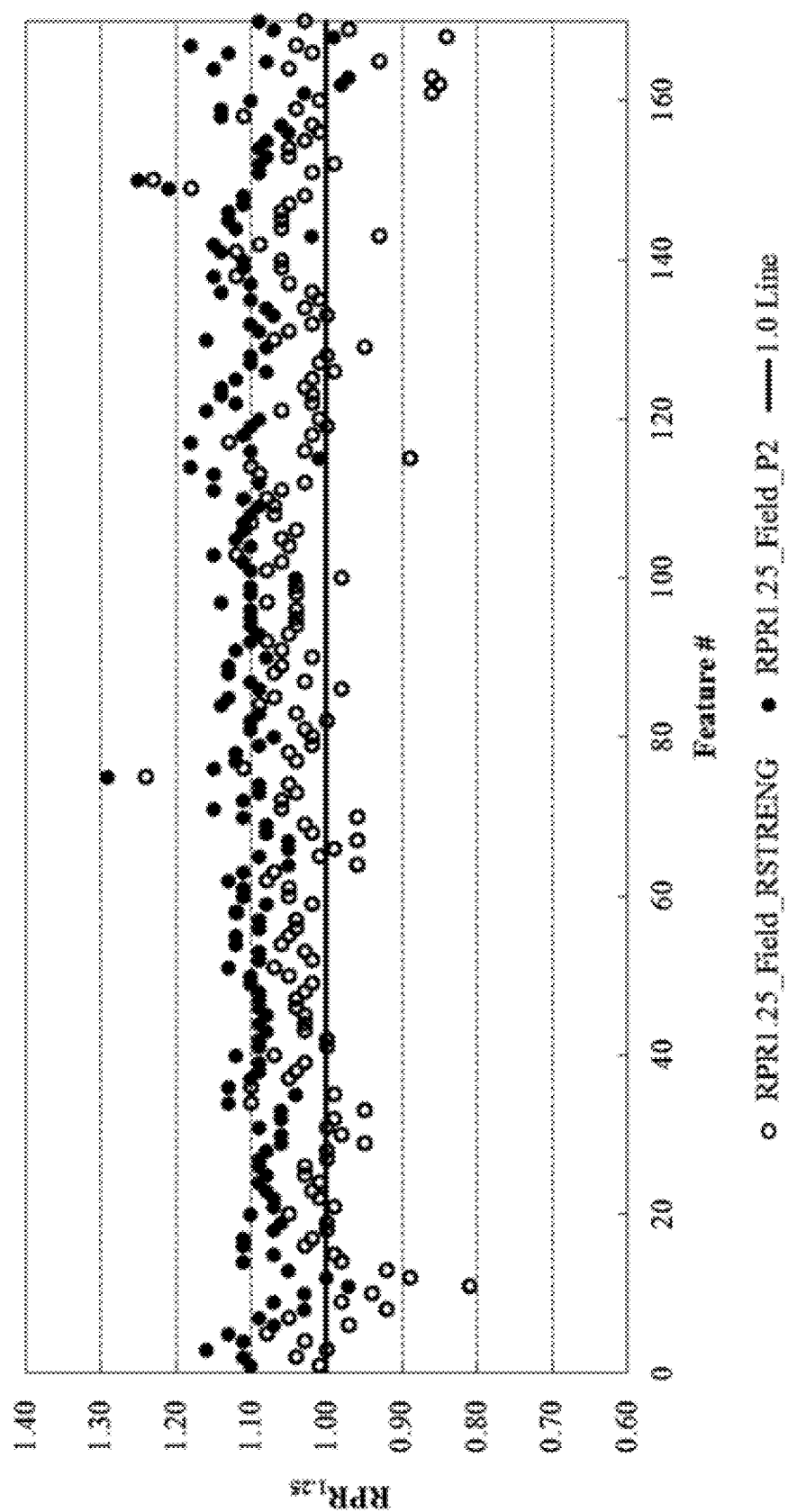
FIG. 32 is a plot compares the RPR1.25 (defined as predicted burst pressure/MOP/1.25) values of the 170 features corresponding to the Psqr and RSTRENG models, according to some embodiments.

FIG. 32 compares the $RPR_{1.25}$ (defined as predicted burst pressure/MOP/1.25) values of the 170 features corresponding to the Psqr and RSTRENG models. The $RPR_{1.25}$ values corresponding to the Psqr method are higher than those corresponding to RSTRENG. The number of features with $RPR_{1.25} \le 1.0$ corresponding to the two models are summarized in Table 5.2, which shows that the use of the Psqr method reduces more than 80% of features that require repair (e.g. 44 features for RSTRENG vs. 5 features for Psqr method in this case).

TABLE 5.2

Comparison of Number of Corrosion Features Requiring Repairs based on the Two Models

| Model | Number of Features with $RPR_{1.25} \le 1.0$ | Number of Features with $RPR_{1.25} > 1.0$ |
|---|---|---|
| RSTRENG | 44 | 126 |
| Psqr | 5 | 165 |

ILI-Based Assessment

In this study, a total of 154 critical corrosion features (i.e. $RPR_{1.25} \le 1.0$) that require immediate remediation actions were selected from one pipeline section. Those features were reported by the ILI run performed by ILI vendor in 2013. The 5×5 grid output for each cluster was used in the analysis.

Figure 33:
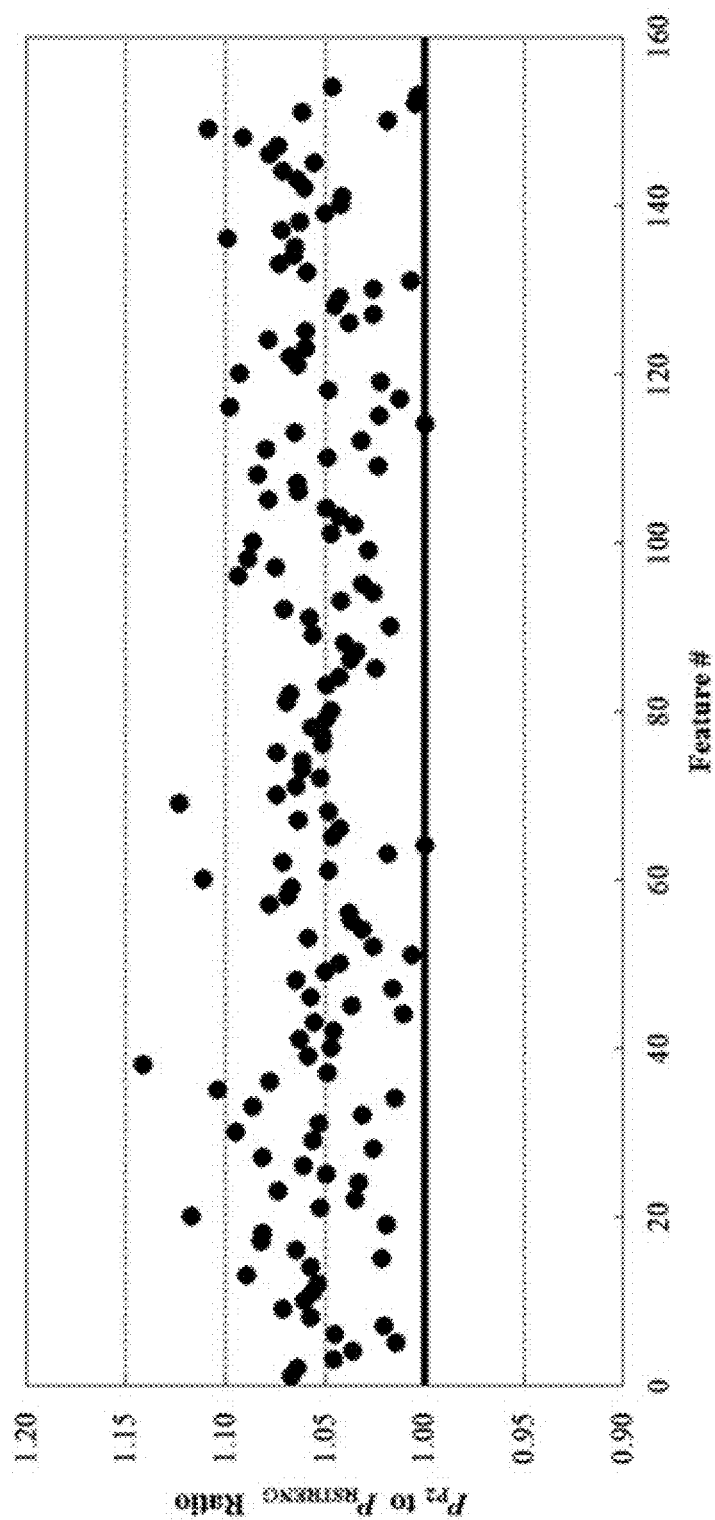
FIG. 33 and FIG. 34 are plots showing a similar comparison as that were shown in FIG. 31 and FIG. 32, based on a different assessment type, according to some embodiments.
Figure 34:
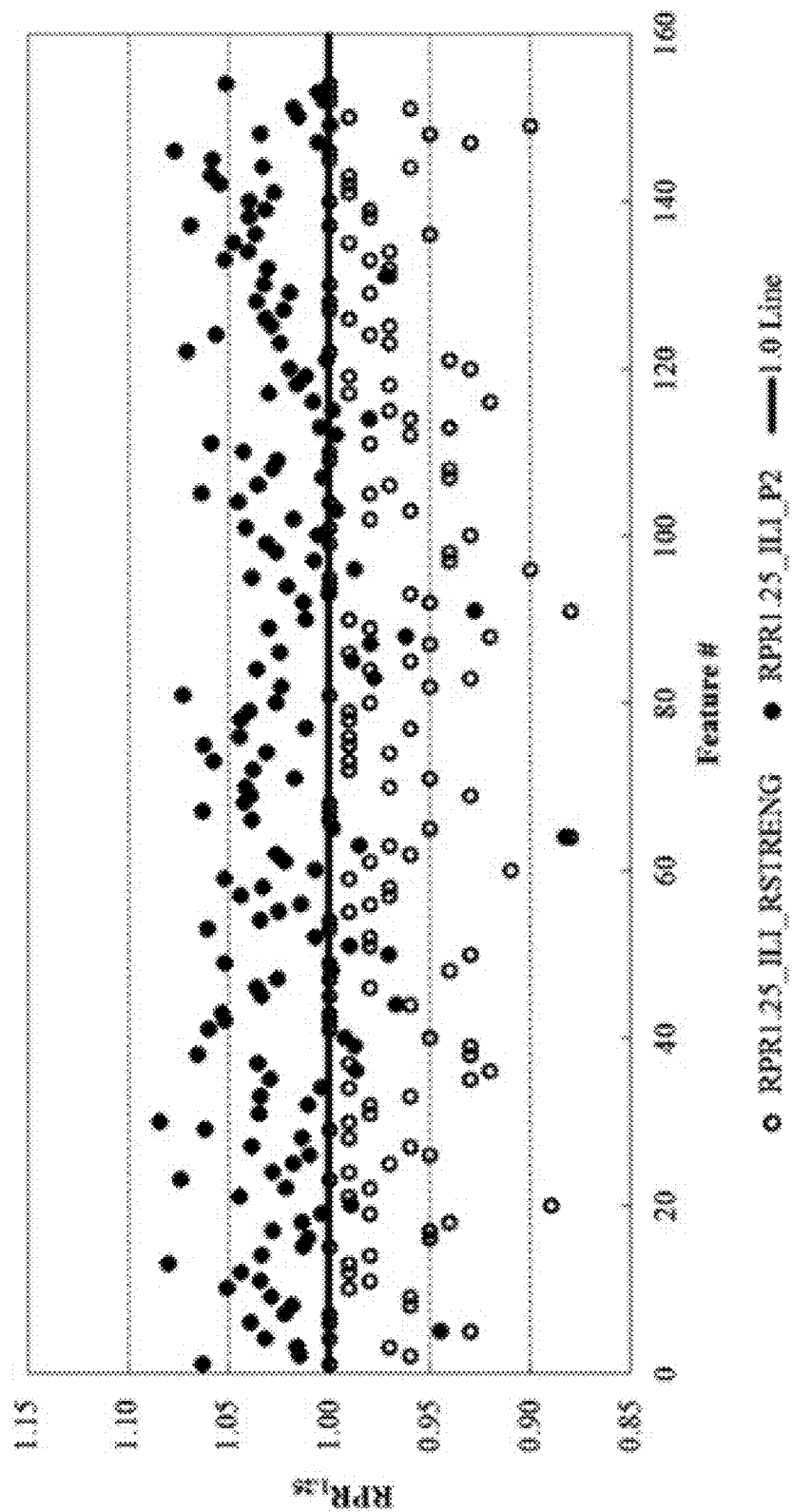

FIG. 33 and FIG. 34 show the similar comparison as that were shown in FIG. 31 and FIG. 32, respectively, and demonstrate similar observations. Based on the results of the 154 features, the pressure ratio is also dependent on the corrosion morphology with an average of 1.05 and a standard deviation of 0.025.

It can be seen from the results shown in Table 5.3 that the number of corrosion features that require excavation reduces from 154 to 31 (i.e. approximately 80% reduction) if the Psqr method is used in the assessment instead of RSTRENG.

TABLE 5.3

Comparison of Number of Corrosion Features Requiring Excavation based on the Two Models

| Model | Number of Features with $RPR_{1.25} \le 1.0$ | Number of Features with $RPR_{1.25} > 1.0$ |
|---|---|---|
| RSTRENG | 154 | 0 |
| Psqr | 31 | 123 |

Figure 35:
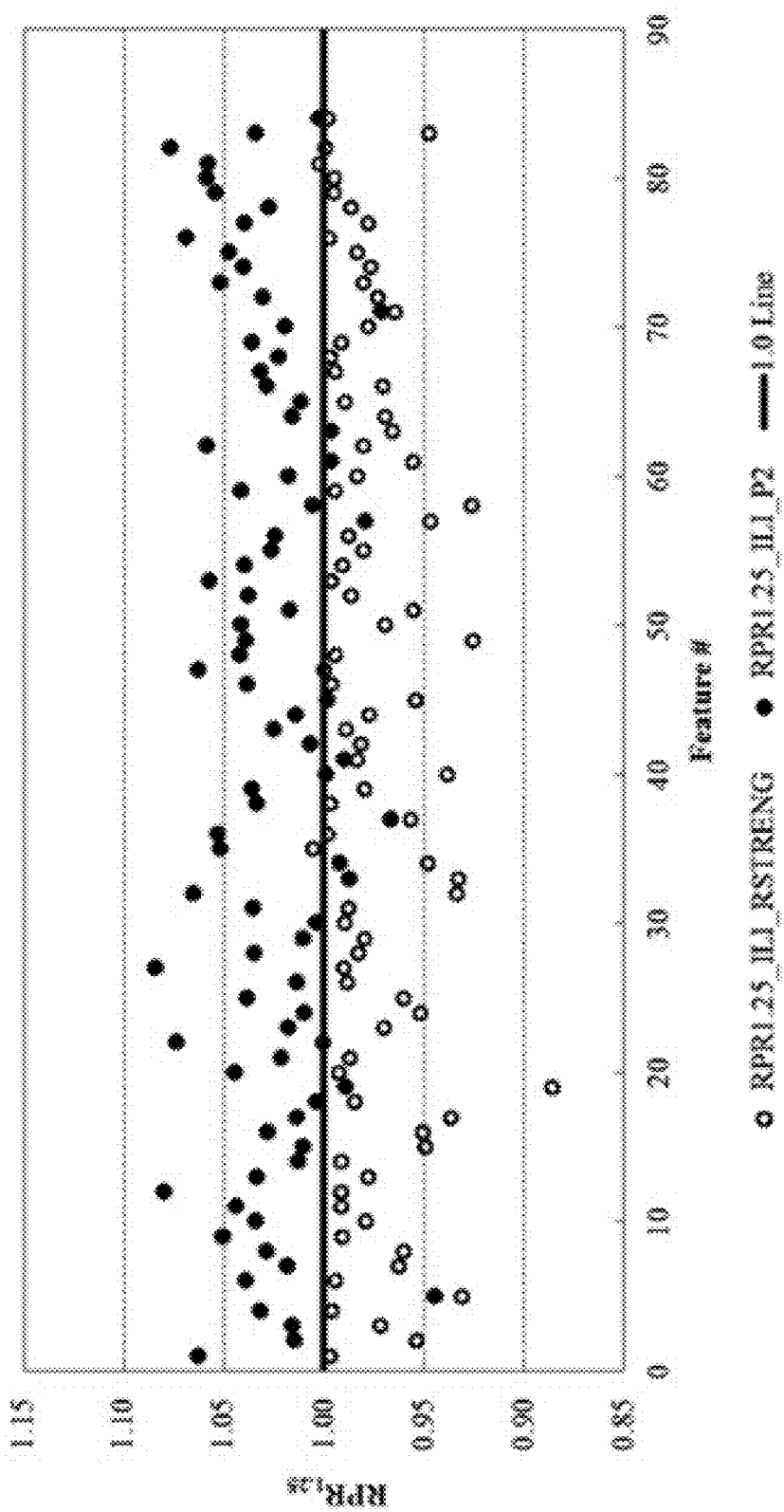
FIG. 35 is a plot showing a RPR1.25 comparison, according to some embodiments.
Figure 36:
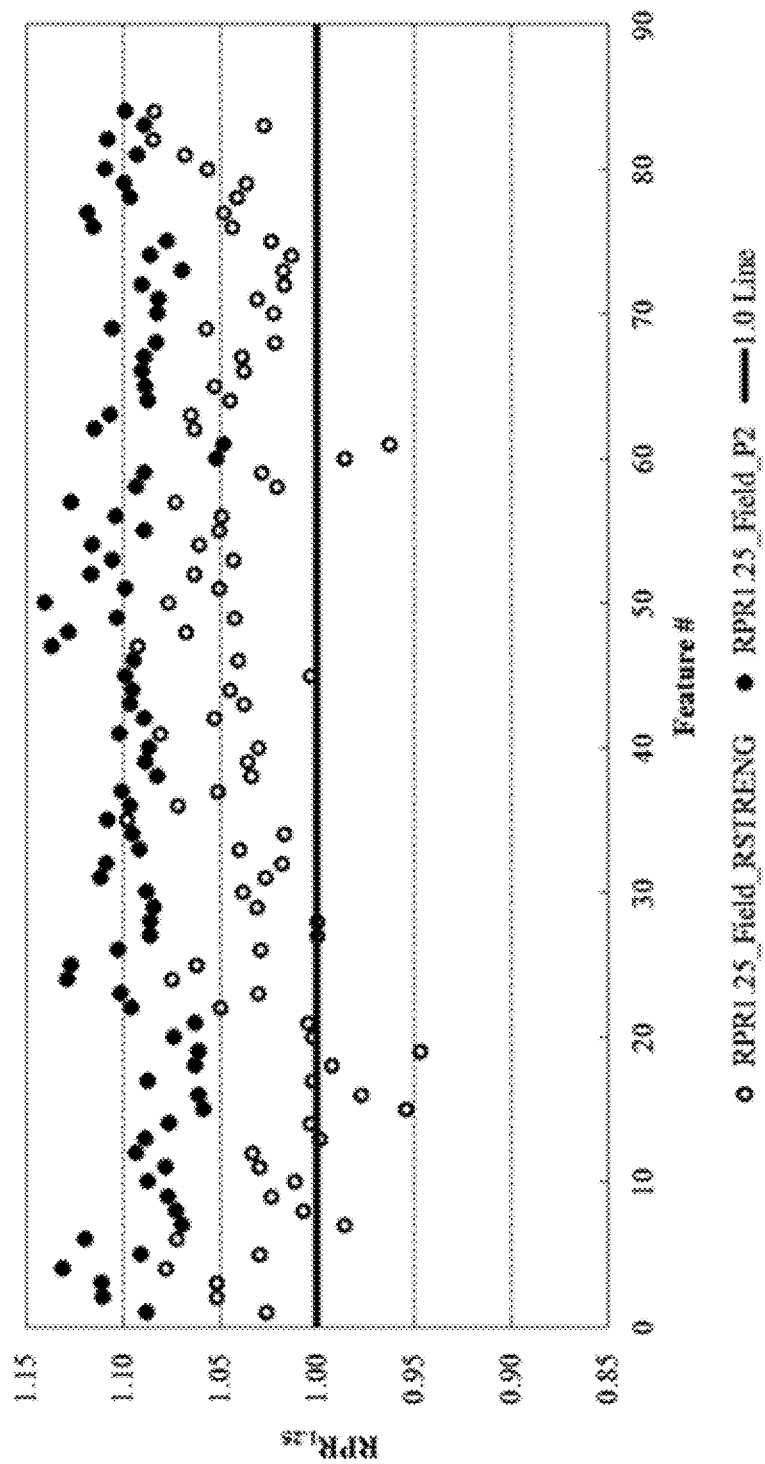
FIG. 36 is a plot of field measurement-based assessments, according to some embodiments.

Applicant further compared 84 features that are included in the 154 features and have been excavated and measured in the ditch. The $RPR_{1.25}$ comparison is shown in FIG. 35 for the ILI-based assessment, and in FIG. 36 for the field measurement-based assessment. The number of features with $RPR_{1.25} \le 1.0$ corresponding to the two models is shown in Table 5.4, which shows the use of the Psqr method is less conservative for both ILI assessment and in-ditch assessment as expected.

TABLE 5.4

Comparison of Number of Corrosion Features Requiring Excavation based on ILI or Repair based on Laser Measurement Using the Two Models

| | ILI-based Results | | Laser-based Results (Repair) | |
|---|---|---|---|---|
| Model | Number of Features with $RPR_{1.25} \le 1.0$ | Number of Features with $RPR_{1.25} > 1.0$ | Number of Features with $RPR_{1.25} \le 1.0$ | Number of Features with $RPR_{1.25} > 1.0$ |
| RSTRENG | 84 | 0 | 15 | 69 |
| Psqr | 15 | 69 | 0 | 84 |

TCAT Development

Figure 37:
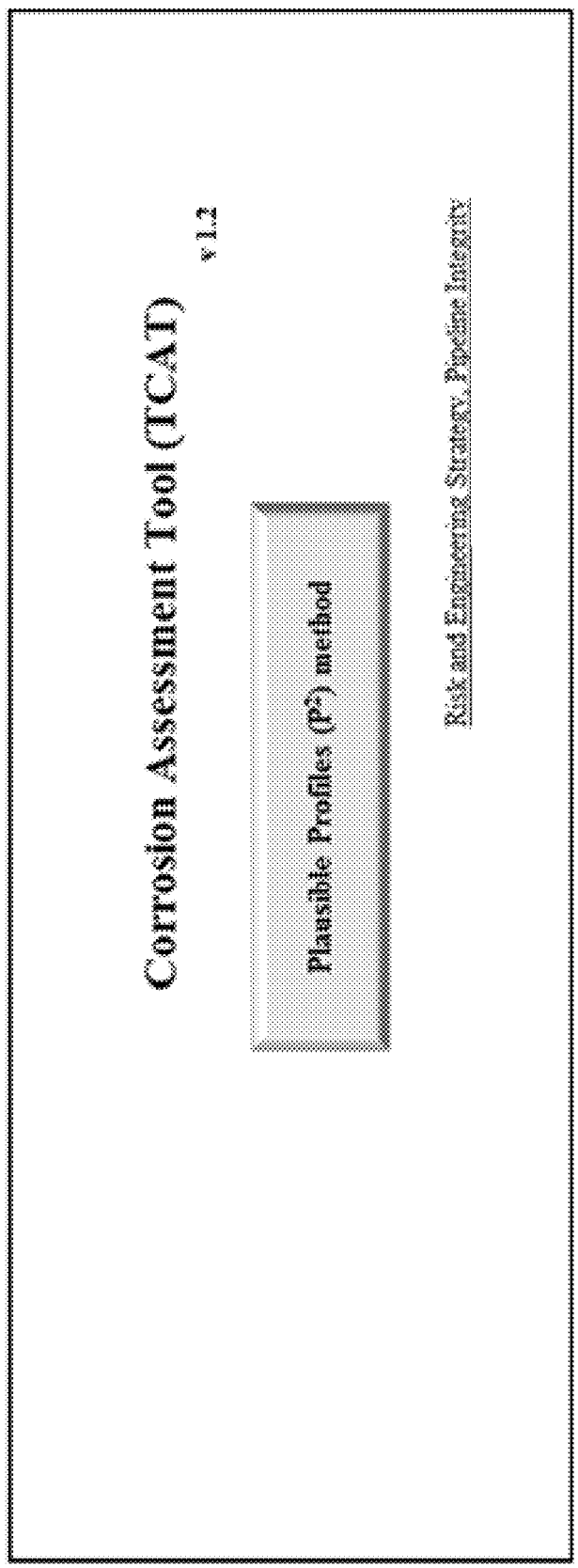
FIG. 37 is a graphical user interface showing the main console of TCAT rendered on a display, according to some embodiments.

A Corrosion Assessment Tool, called TCAT, was developed in Microsoft Excel using VBA-based application. FIG. 37 shows the main console of TCAT.

Figure 38:
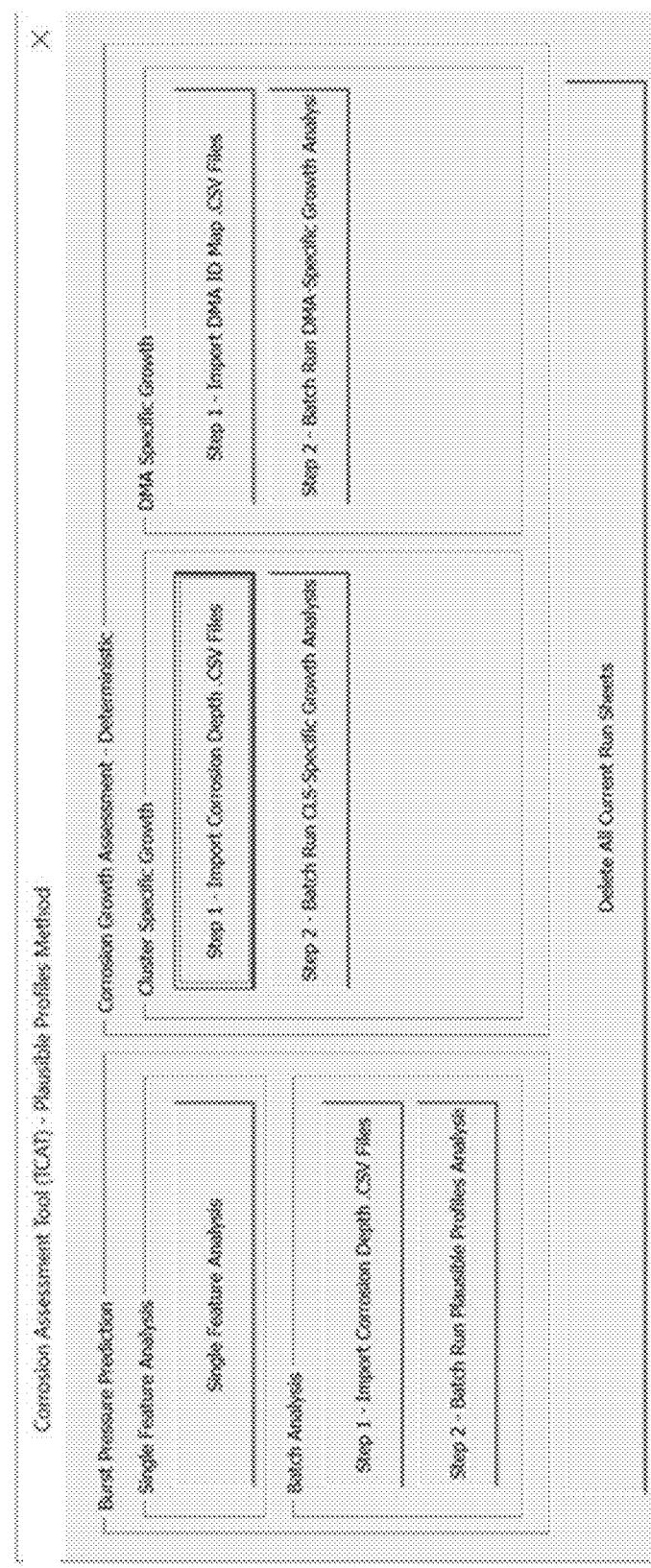
FIG. 38 is a graphical user interface showing features available on the tool, according to some embodiments.

The tool has four different analysis functionalities: single feature analysis, batch feature analysis (multiple feature analysis), cluster-specific growth analysis, and anomaly-specific growth analysis as shown in FIG. 38. Note that cluster-specific analysis allows users to run the model to evaluate the failure pressure considering growth of corrosion, where an identical growth rate for all corrosion anomalies within the cluster is assumed.

The anomaly-specific analysis allows users to run the model to evaluate the failure pressure considering growth of corrosion, where an anomaly-specific growth rate is used for the cluster.

Summary

The Psqr method was developed in this project for assessing large corrosion features. The model considers multiple plausible profiles instead of single river bottom profile to evaluate the burst pressure. Extensive sensitivity analyses have been performed and used to determine the optimized values of model parameters in order to assure safety. A total of thirty (30) burst test data and sixteen (16) PRCI data points were used to validate the model. The validation results are summarized as follows:

The Psqr method is less conservative (lower bias) than the RSTRENG model

The Psqr method is more precise (less scatter) than the RSTRENG model

The magnitude of reduction in conservatism is dependent on the corrosion morphology. On average, the Psqr method achieves 14% reduction in model bias and 30% reduction in scatter than RSTRENG based on the 30 burst test results.

All the testing results demonstrate the Psqr method is safe.

The pilot study shows the Psqr method is less conservative then the RSTRENG model. The use of the Psqr model can achieve approximately 80% reduction in the number of features requiring excavation for the ILI data analysis and over 80% reduction in the number of features requiring repair for in-ditch analysis in extensively corroded pipelines.

The Psqr method is applicable to all clusters regardless of number of anomalies.

A Microsoft Excel VBA-based software, called TCAT, was developed using the Psqr method.

Figure 39:
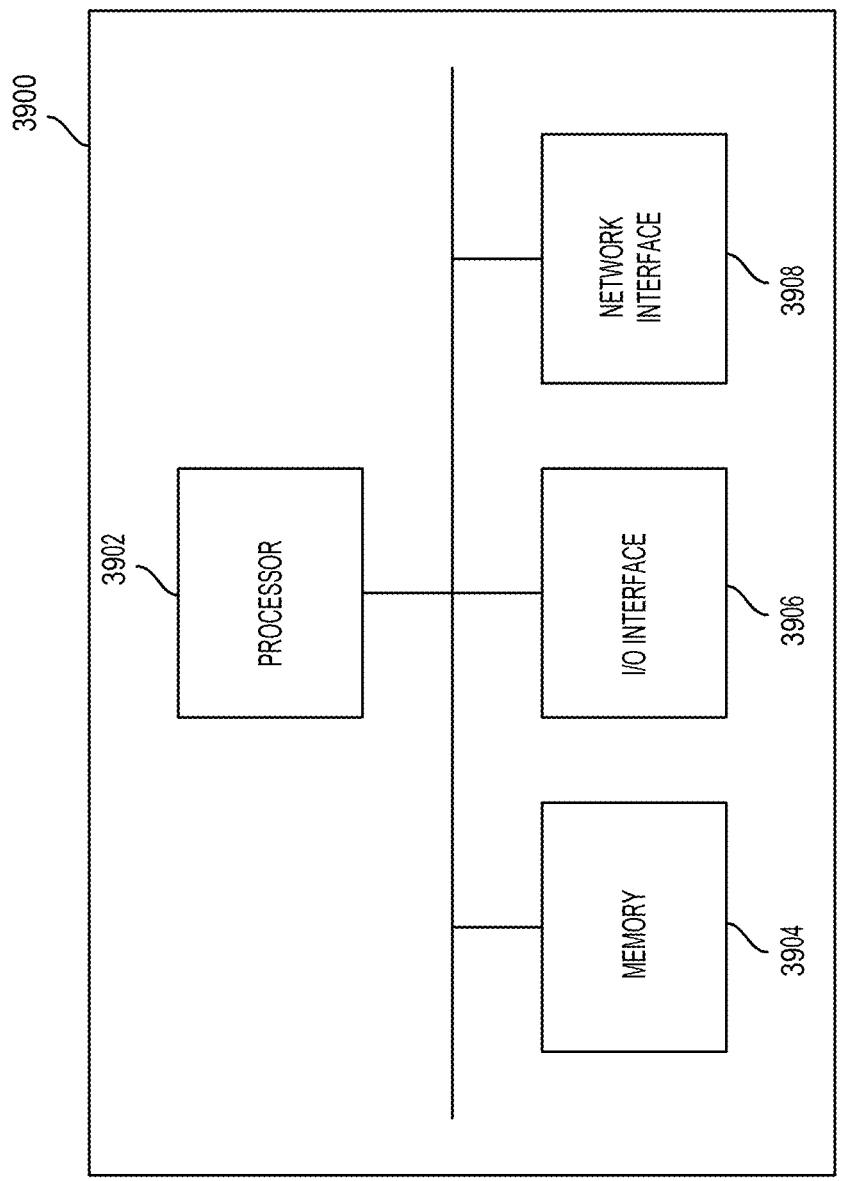
FIG. 39 is an example drawing of a computing device, according to some embodiments.

FIG. 39 is a schematic diagram of a computing device 3900 such as a server. As depicted, the computing device includes at least one processor 3902, memory 3904, at least one I/O interface 3906, and at least one network interface 3908.

Processor 3902 may be an Intel or AMD x86 or x64, PowerPC, ARM processor, or the like. Memory 3904 may include a suitable combination of any type of computer memory that is located either internally or externally such as, for example, random-access memory (RAM), read-only memory (ROM), compact disc read-only memory (CDROM), or the like.

Each I/O interface 3906 enables computing device 3900 to interconnect with one or more input devices, such as a keyboard, mouse, camera, touch screen and a microphone, or with one or more output devices such as a display screen and a speaker.

Each network interface 3908 enables computing device 3900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing devices 3900 may serve one user or multiple users.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (e.g. personal computer, server, virtual environment, cloud computing system, network device) to execute the methods provided by the embodiments.

The embodiments described herein are implemented by physical electronic, mechanical, and computer hardware, including computing devices, servers, receivers, transmitters, processors, memory, displays, controllers, actuators, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer implemented method for estimating a failure pressure of a pipeline subject to structural degradation, the computer implemented method comprising:
receiving structural degradation features represented in an input data set indicative of the structural degradation at positions of the pipeline, the input data set providing a three-dimensional (3D) measurement of the structural degradation in a grid;
generating, based on the input data set, a plurality of potential failure paths due to the structural degradation of the pipeline, each path defining a different set of structural defects that interact with one another to reduce the failure pressure, each path sequentially connecting a series of potential points;
for each path of the plurality of paths, generate a corresponding failure pressure based at least on a simulated pipeline failure occurring due to the corresponding set of structural defects interacting with one another;

combining the corresponding failure pressures to generate a probabilistic distribution of the failure pressure; and selecting the estimated failure pressure based on the probabilistic distribution of the failure pressure at a threshold percentile.

2. The method of claim 1, wherein each point of the series of potential points is selected from a corresponding circumferential slice of the pipeline represented in the 3D measurement.

3. The method of claim 1, comprising:
controlling a physical pipeline flow controller operating in conjunction with a pipeline pressure sensor to ensure that a pressure of the flow through the pipeline does not exceed the estimated failure pressure of the pipeline.

4. The method of claim 3, wherein the controlling of the physical pipeline flow controller includes the activation of a pressure restriction valve.

5. The method of claim 3, wherein the controlling of the physical pipeline flow controller includes the operation of a valve regulator to ensure that the pressure of the flow through the pipeline does not exceed the estimated failure pressure of the pipeline.

6. The method of claim 1, comprising:
determining one or more locations indicative of where to excavate the pipeline based the estimated failure pressure of the pipeline in conjunction with the input data set.

7. The method of claim 6, wherein the excavation is conducted to remediate structural degradation in the pipeline before the actual pressure in the pipeline exceeds the estimated failure pressure of the pipeline.

8. The method of claim 1, comprising:
determining an excavated feature require repair based on the estimated failure pressure of the pipeline in conjunction with the input data set.

9. The method of claim 8, wherein the repair is conducted to remediate structural degradation in the pipeline before the actual pressure in the pipeline exceeds the estimated failure pressure of the pipeline.

10. The method of claim 1, wherein given the three-dimensional (3D) measurement of the structural degradation in a grid form, control parameters are applied to assess the corresponding set of structural defects and the interactions between the structural defects.

11. The method of claim 10, wherein the control parameters include a start point, an interaction window width, and a likelihood of interaction.

12. The method of claim 11, comprising:
generating a depth-weighted start point;
given the start point, identifying two points in adjacent slices on either side of the start point;
generating interaction windows based on the interaction window width for each of the two points, the interaction windows defining potential points within the interaction window width that are selectable as a next point of the model at least based on a likelihood of interaction with at least one of the two points; and
iteratively repeating identifying of additional points until potential points are identified throughout every circumferential slice of the grid.

13. The method of claim 12, wherein the probability distribution is provided by the relation:

$$P_{ij} = \frac{d_{ij}}{\sum_{k=1}^{M}\sum_{l=1}^{N} d_{kl}}$$

where $P_{ij}$ denotes a likelihood of a start point $d_{ij}$ being selected as the depth-weighted start point and $d_{kl}$ denotes the depth corresponding to a $k^{th}$ row and a $l^{th}$ column of the grid.

14. The method of claim 12, wherein the probability distribution is applied to determine the depth-weighted start point where a tool has identified a specific corrosion morphology type.

15. The method of claim 14, wherein the pinhole is deeper than a general corrosion or wherein the pinhole is not proximate to a general corrosion.

16. The method of claim 1, wherein the structural degradation of the pipeline is estimated to include wide complex corrosion clusters.

17. The method of claim 1 wherein an area of each path of the plurality of paths is less than or equal to that of a river bottom path of the corrosion feature.

18. The method of claim 17, wherein the depth-weighted start point is selected at least through applying a probability distribution to a plurality of candidate start points wherein a depth of a candidate start point is proportional to a corresponding probability that the candidate start point is selected as the depth-weighted start point, and wherein at least two paths have different corresponding depth-weighted start points.

19. The method of claim 17, wherein the depth-weighted start point is selected as a deepest point on the grid.

20. The method of claim 19, wherein the specific corrosion morphology type includes a pinhole with general corrosion morphology.

21. A system for estimating a failure pressure of a pipeline subject to structural degradation, the system comprising a processor configured to:
receive structural degradation features represented in an input data set indicative of the structural degradation of the pipeline, the input data set providing three-dimensional (3D) measurement of the structural degradation in a grid;
generate, based on the input data set, a plurality of potential failure paths due to the structural degradation of the pipeline, each path defining a different set of structural defects based on the corrosion features that interact with one another to reduce the failure pressure, each path sequentially connecting a series of potential points;
for each path of the plurality of paths,
generate a corresponding failure pressure based at least on a simulated pipeline failure occurring due to the corresponding set of structural defects interacting with one another;
combine the corresponding failure pressures to generate a probabilistic distribution of the failure pressure; and
select the estimated failure pressure based on the probabilistic distribution of the failure pressure at a threshold percentile.

22. The system of claim 21, further comprising a physical pipeline flow controller controlled by the processor and operating in conjunction with a pipeline pressure sensor adapted to ensure that a pressure of the flow through the pipeline does not exceed the estimated failure pressure of the pipeline.

23. The system of claim 22, wherein the controlling of the physical pipeline flow controller includes the activation of a pressure restriction valve.

24. The system of claim 22, wherein the controlling of the physical pipeline flow controller includes the operation of a valve regulator to ensure that the pressure of the flow through the pipeline does not exceed the estimated failure pressure of the pipeline.

25. The system of claim 21, wherein the processor is configured to determine one or more locations indicative of where to excavate the pipeline based the estimated failure pressure of the pipeline in conjunction with the input data set.

26. The system of claim 25, wherein the excavation is conducted to remediate structural degradation in the pipeline before the actual pressure in the pipeline exceeds the estimated failure pressure of the pipeline.

27. The system of claim 21, wherein the processor is configured to determine an excavated feature require repair based on the estimated failure pressure of the pipeline in conjunction with the input data set.

28. The system of claim 27, wherein the repair is conducted to remediate structural degradation in the pipeline before the actual pressure in the pipeline exceeds the estimated failure pressure of the pipeline.

29. The system of claim 21, wherein given the three-dimensional (3D) measurement of the structural degradation in a grid form, control parameters are applied to assess the corresponding set of structural defects and the interactions between the structural defects.

30. The system of claim 29, wherein the control parameters include a start point, an interaction window width, and a likelihood of interaction.

31. The system of claim 21, comprising a display controller configured for rendering one or more visual interface elements that include at least a rendering of the pipeline or a portion of the pipeline overlaid with graphical representations of the plurality of potential paths.

32. The system of claim 21, wherein the one or more visual interface elements include at least a rendering of the probabilistic distribution and the estimated failure pressure.

33. A non-transitory computer readable medium storing machine interpretable instructions, which when executed by a processor, perform steps of a method for estimating a failure pressure of a pipeline subject to structural degradation, the method comprising:
  receiving structural degradation features represented in an input data set indicative of the structural degradation at positions of the pipeline, the input data set providing a three-dimensional (3D) measurement of the structural degradation in a grid;
  generating, based on the input data set, a plurality of potential failure paths due to the structural degradation of the pipeline, each path defining a different set of structural defects that interact with one another to reduce the failure pressure, each path sequentially connecting a series of potential points;
  for each path of the plurality of paths, generate a corresponding failure pressure based at least on a simulated pipeline failure occurring due to the corresponding set of structural defects interacting with one another;
  combining the corresponding failure pressures to generate a probabilistic distribution of the failure pressure; and
  selecting the estimated failure pressure based on the probabilistic distribution of the failure pressure at a threshold percentile.

\* \* \* \* \*